United States Patent
Dharamshi et al.

(10) Patent No.: US 10,036,147 B1
(45) Date of Patent: Jul. 31, 2018

(54) DUAL-LEVER WATER-SAVING FAUCET

(71) Applicants: Hitesh Dharamshi, Naperville, IL (US); Deepesh Dharamshi, Mumbai (IN); Rajul Dharamshi, Naperville, IL (US); Dolly Dharamshi, Mumbai (IN)

(72) Inventors: Hitesh Dharamshi, Naperville, IL (US); Deepesh Dharamshi, Mumbai (IN); Rajul Dharamshi, Naperville, IL (US); Dolly Dharamshi, Mumbai (IN)

( * ) Notice: Subject to any disclaimer, the term of this patent is extended or adjusted under 35 U.S.C. 154(b) by 0 days.

(21) Appl. No.: 15/418,755

(22) Filed: Jan. 29, 2017

(51) Int. Cl.
  *E03C 1/04* (2006.01)
  *F16K 11/22* (2006.01)

(52) U.S. Cl.
  CPC ............ *E03C 1/0412* (2013.01); *F16K 11/22* (2013.01); *Y10T 137/6014* (2015.04); *Y10T 137/86549* (2015.04); *Y10T 137/87611* (2015.04); *Y10T 137/87619* (2015.04)

(58) Field of Classification Search
  CPC .................. E03C 1/0412; F16K 11/22; Y10T 137/86549; Y10T 137/6014; Y10T 137/87611; Y10T 137/87619
  See application file for complete search history.

(56) References Cited

U.S. PATENT DOCUMENTS

| | | |
|---|---|---|
| 4,819,909 A | 4/1989 | Hart |
| 5,082,023 A | 1/1992 | D'Alayer |
| 5,342,018 A | 8/1994 | Wu |
| 5,363,880 A | 11/1994 | Hsieh |
| 5,494,077 A | 2/1996 | Enoki |
| 5,522,429 A | 6/1996 | Bechte |
| 5,967,184 A | 10/1999 | Chang |
| 6,170,523 B1 | 1/2001 | Chang |
| 6,390,128 B1 | 5/2002 | Tung |
| 6,796,544 B1 | 9/2004 | Chen |
| 7,093,615 B2 | 8/2006 | Shane |
| 7,219,696 B2 | 5/2007 | Cattaneo |
| 7,287,707 B2 | 10/2007 | Kempf |
| 7,556,061 B2 | 7/2009 | Morita |
| 8,109,292 B2 | 2/2012 | Bolgar |
| 8,347,905 B1 | 1/2013 | Stirtz |
| 8,434,513 B2 | 5/2013 | Kacik |
| 9,103,102 B1 | 8/2015 | Prabhakar |
| 2009/0090884 A1* | 4/2009 | Jarvis ................ F16K 31/602 251/231 |
| 2009/0200388 A1* | 8/2009 | Jarvis ................ F16K 11/074 236/12.13 |

* cited by examiner

*Primary Examiner* — Craig Schneider
*Assistant Examiner* — Kevin Barss

(57) ABSTRACT

A dual-levered faucet assembly which allows user to reduce water usage by 50% when needed while operating the faucet in habitual preferred manner of using swift single motion of hand. When any one lever is operated in this manner, the water outflow is 50% of a conventional single-levered faucet. When both levers are operated in this manner, water outflow is same as that of a conventional single-levered faucet.

14 Claims, 49 Drawing Sheets

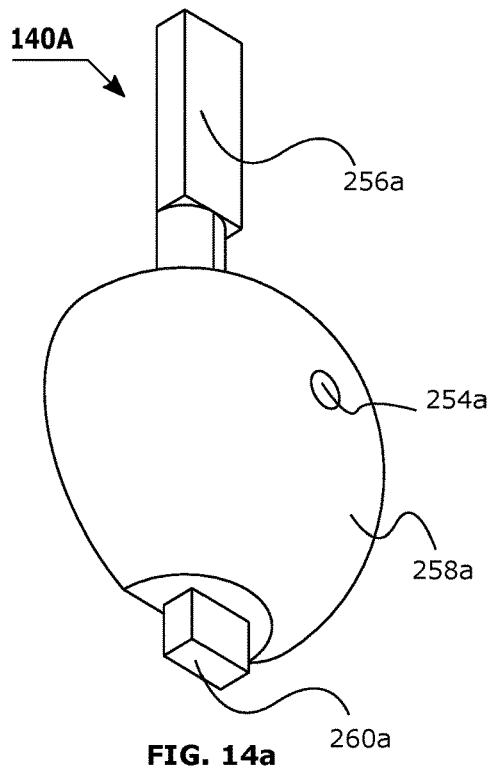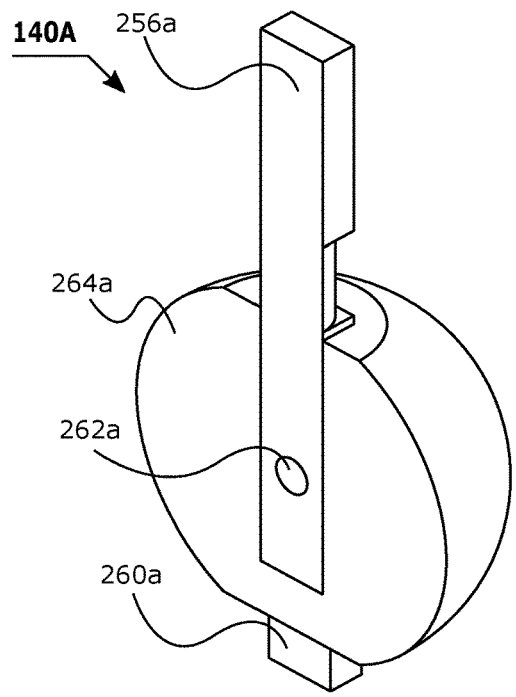
FIG. 14a    FIG. 14b
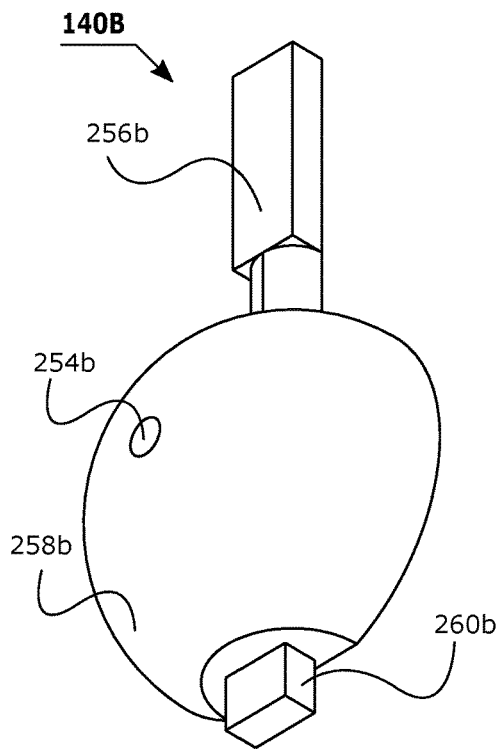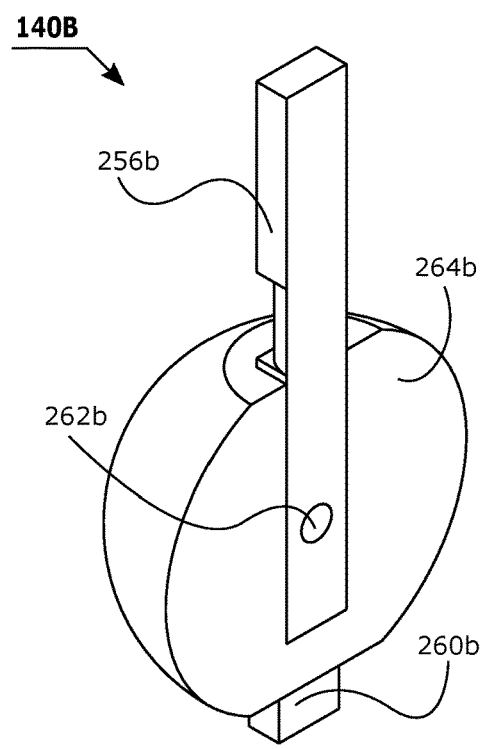
FIG. 14c    FIG. 14d

DUAL-LEVER WATER-SAVING FAUCET

BACKGROUND OF INVENTION

A faucet, also referred to as a tap, is a valve used to control flow of fluid, usually water. There are many types of faucet designs and single-lever faucet design is amongst most commonly used. Single-lever faucets are popular because of convenience of control, ease of use by one hand and aesthetics, aside from manufacturing efficiencies when compared with many other faucet designs. Such single-lever faucets essentially have a lever which controls two basic functions:
  a) Temperature of water flowing out of faucet.
  b) Amount of water flowing out of faucet.

The faucet generally has two inlets—one for hot water and one for cold water. The user of single-lever faucet turns the lever sideways along a horizontal arc to change the mixture of hot water and cold water from inlets which then controls the temperature of water flowing out of the spout.

The user of single-lever faucet controls the amount of water flowing out of faucet by turning the lever angularly up or down along a vertical arc. This design of single-lever faucet is widely available in prior art.

The vertical arc motion of the lever is smooth, requiring even force along the entire vertical angular motion. Usually, user turns the lever to its largest-angle position to get maximum flow in one swift single motion of hand using momentum. However, for many purposes the amount of water needed from the faucet is often lesser than the maximum flow. For such purposes the lever has to be turned to an angle smaller than the largest-angle to get a flow of water which is lesser than maximum flow. This action of turning the lever to angle smaller than the largest-angle:
  a) Requires the user to exercise more control on the hand. Exercising control on the hand adds to inconvenience and requires thought. Exercising more control over hand is not convenient as it does not use momentum of the motion of hand. Very often, user does not consciously apply thought to exercise more control of hand, especially when user has the easier option of simply using the momentum of hand to move the lever to its largest-angle position in a swift single motion.
  b) Takes longer than the action of turning the lever to its largest-angle position with a swift single motion of hand.
  c) Requires user to sometimes adjust the angle multiple times to obtain the right flow suitable for the purpose which further raises the tendency to use the momentum of hand to move the lever to its largest-angle position in a single motion.
  d) May be difficult for very young children who lack necessary motor skills to have control over their hand.
  e) May be difficult for very elderly people who may not have necessary strength in arm to have control over their hand.

User thus has habitual preference of using swift single motion of hand to operate the faucet to raise the lever to its largest-angle position for maximum water-flow even when less water is needed for certain purposes. This habitual preference results in significant wastage of water. Further, more flow of water than necessary can also cause drops of water splashing around to make a mess on objects nearby, like clothes, documents or food, which then has to be cleaned, taking resources like time, effort and cleaning tools. There is thus a need for faucet with simple mechanism to provide less than maximum-flow of water when needed while maintaining the habitual preference of operating with swift single motion of hand.

| RELEVANT PRIOR ART | | |
| --- | --- | --- |
| U. S. Pat. # | Date | Inventor (any one) |
| 4,819,909 | April 1989 | Hart |
| 5,082,023 | January 1992 | D'Alayer |
| 5,342,018 | August 1994 | Wu |
| 5,363,880 | November 1994 | Hsieh |
| 5,494,077 | February 1996 | Enoki |
| 5,522,429 | June 1996 | Bechte |
| 5,967,184 | October 1999 | Chang |
| 6,170,523 | January 2001 | Chang |
| 6,390,128 | May 2002 | Tung |
| 6,796,544 | September 2004 | Chen |
| 7,093,615 | August 2006 | Shane |
| 7,219,696 | May 2007 | Cattaneo |
| 7,287,707 | October 2007 | Kempf |
| 7,556,061 | July 2009 | Morita |
| 8,109,292 | February 2012 | Bolgar |
| 8,347,905 | January 2013 | Stirtz |
| 8,434,513 | May 2013 | Kacik |
| 9,103,102 | August 2015 | Prabhakar |

U.S. Pat. No. 8,434,513 to Kacik in May 2013 is one type of cartridge used in conventional single-lever mixing faucets which has the problem described earlier of water wastage. This problem with conventional single-lever mixing faucets has been addressed in prior art with several different ways. U.S. Pat. No. 5,967,184 to Chang in October 1999 provides mechanism to place limits on the range of motion of the lever, which may compromise user experience and prevent more flow of water when situation deems so. Other methods have better temperature control and thus save on hot water and in turn energy, like U.S. Pat. No. 5,494,077 to Enoki in February 1996 and U.S. Pat. No. 5,363,880 to Hsieh in November 1994. These methods focus on energy saving by reducing wastage of hot water, and do not necessarily address wastage of cold water. U.S. Pat. No. 8,347,905 to Stirtz in January 2013 ensures that operation of faucet starts from cold water position, thereby by reducing wastage of hot water and thus energy. This method saves hot water/energy only in the initial phase of operation of faucet when appropriate temperature is being set, but not during continued usage of the faucet. U.S. Pat. No. 5,082,023 to D'Alayer in January 1992 provides a step between no-flow and maximum-flow position of the lever which the user can just push through if needed. In this mechanism there is tendency on part of user to simply use momentum of hand to operate at maximum flow step, skipping the intermediate step. More granular mechanism is offered in U.S. Pat. No. 9,103,102 to Prabhakar in August 2016, where user can increase the flow in multiple steps. U.S. Pat. No. 6,796,544 to Chen in September 2004 also takes the multi-step approach in a different way. Both latter prior art have complex mechanisms. Methods which use multiple steps approach save hot and cold water, and work during continued usage of faucet. However, these methods rely on user to change their way of operating a faucet. User behavior is habitual and thus difficult to change, especially in inconsequential matter of operating a faucet. Users continue to prefer the single swift motion of hand to operate the faucet.

There is thus a need for faucet which makes it convenient to reduce water usage while allowing user to continue to use their habitual preferred method of operation.

BRIEF SUMMARY OF INVENTION

Main objective of the present invention is to save water by making it convenient for user to reduce water usage while retaining the habitual preference of operating a faucet in single swift motion of hand. The present invention is a dual-lever faucet which can provide 50% of conventional single-lever faucet's water flow when less water is needed and 100% of conventional single-lever faucet's water flow when more water is needed, while preserving the habitual preference of the user for operating the faucet by swift single motion of hand.

Faucet has two identical levers set adjacent to each other. When user wants less water, user simply turns any one lever angularly upwards to its maximum position in a swift single motion of hand to get 50% of water flow of conventional single-lever faucet in maximum-flow position. User is conveniently able to save water since present invention adapts to user's habitual preference of operating. When user wants more water, user turns both levers angularly upwards to their maximum positions, simultaneously or sequentially, in a swift single motion of hand to get 100% of water flow of conventional single-lever faucet in maximum-flow position.

In two embodiments, identified here as Mixing-Type, the present invention provides such a faucet which is suitable for controlling flow and temperature of two fluids, in most cases hot water and cold water. Assume C is the rate of inflow of cold water, H is the rate of inflow of hot water. In a typical usage of a conventional single-lever mixing faucet, the rate of mixed water outflow is 50% C+50% H in a maximum-flow position. In the present invention, when just one lever is used for operation, the rate of mixed water outflow in a similar maximum-flow position is 25% C+25% H. By using any one lever of present invention, user can reduce water usage by 50% when compared with the conventional single-lever mixing faucet operated with same habitual preferred manner. In the present invention, when both levers are used for operation, the rate of mixed water outflow in maximum-flow position is (25% C+25% H)+(25% C+25% H)=50% C+50% H. By operating both levers of present invention as needed, user can get same amount of water flow as conventional single-lever mixing faucet.

In two related embodiments, identified here as Non-Mixing-Type, the present invention provides such a faucet which is suitable for controlling the flow of single fluid, in most cases water. Assume C is the rate of inflow of water. In a typical usage of a conventional single-lever non-mixing faucet, the rate of water outflow is 100% C in maximum-flow position. In the present invention, when just one lever is used for operation, the rate of water outflow in maximum-flow position is 50% C. By using any one lever of present invention, user can reduce water usage by 50% when compared with the conventional single-lever non-mixing faucet operated with same habitual preferred manner. In the present invention, when both levers are used for operation, the rate of water outflow in maximum-flow position is 50% C+50% C=100% C. By operating both levers of present invention as needed, user can get same amount of water flow and with same convenience as conventional single-lever non-mixing faucet.

BRIEF DESCRIPTION OF DRAWINGS

The foregoing summary as well as the following detailed description of preferred embodiments of the invention will be better understood when read in conjunction with the appended drawings. For the purpose of illustrating the invention, there is shown in the drawings embodiments which are presently preferred. It should be understood, however, that the invention is not limited to the precise arrangements, shapes, dimensions and instrumentalities shown. In the drawings:

| Sheet # | FIG. # | Brief description |
|---|---|---|
| 1 | 1 | Perspective exterior view of the exemplary Dual-Lever Water-Saving Faucet assembly 100 in accordance with first preferred embodiment of present invention. |
| 2 | 2 | Exploded view of faucet assembly 100. Various parts of faucet assembly 100 are depicted in this view in general order of arrangement. |
| 3 | 3 | Perspective views of inlet pipe 124, inlet pipe 128 and outlet pipe 132 of faucet assembly 100. |
| 3 | 4 | Perspective view of spout 116 of faucet assembly 100. |
| 3 | 5 | Perspective view of base-plate 120 of faucet assembly 100. |
| 4 | 6 | Perspective view of casing 104 of faucet assembly 100. |
| 4 | 7 | Perspective view of dome 108 of faucet assembly of 100. |
| 5 | 8a | Perspective view of lever 112A of faucet assembly 100. |
| 5 | 8b | Perspective view of lever 112B of faucet assembly 100. |
| 6 | 9 | Perspective view of sub-assembly of two levers 112A, 112B, dome 108 and dual-stem-cartridge 136 of faucet assembly 100, without other parts for clarity. |
| 7 | 10, 11 | Two perspective views of dual-stem-cartridge 136 of faucet assembly 100. |
| 8 | 12a, 12b | Two exploded perspective views of dual-stem-cartridge 136 of faucet assembly 100, depicting various members in general order of arrangement. |
| 9 | 13a, 13b | Two perspective views of housing 172 of dual-stem-cartridge 136. |
| 10 | 14a, 14b | Two perspective views of hemi-ball-stem 140A of dual-stem-cartridge 136. |
| 10 | 14c, 14d | Two perspective views of hemi-ball-stem 140B of dual-stem-cartridge 136. |
| 11 | 15 | Perspective view of pin 144 of dual-stem-cartridge 136. |
| 11 | 16 | Perspective view of separator-disc 148 of dual-stem-cartridge 136. |
| 12 | 17 | Perspective view of some components of dual-stem-cartridge 136, without housing 172 for clarity. |
| 13 | 18 | Perspective view of spring 152 of dual-stem-cartridge 136. |
| 13 | 19a, 19b | Two perspective views of bushing 156 of dual-stem-cartridge 136. |
| 14 | 20a, 20b | Two perspective views of guide-plate 160 of dual-stem-cartridge 136. |
| 15 | 21a, 21b | Two perspective view of movable-plates 164A, 164B of dual-stem-cartridge 136. |
| 16 | 22a | Top view of movable-plate 164A of dual-stem-cartridge 136. |

-continued

Figure 1:
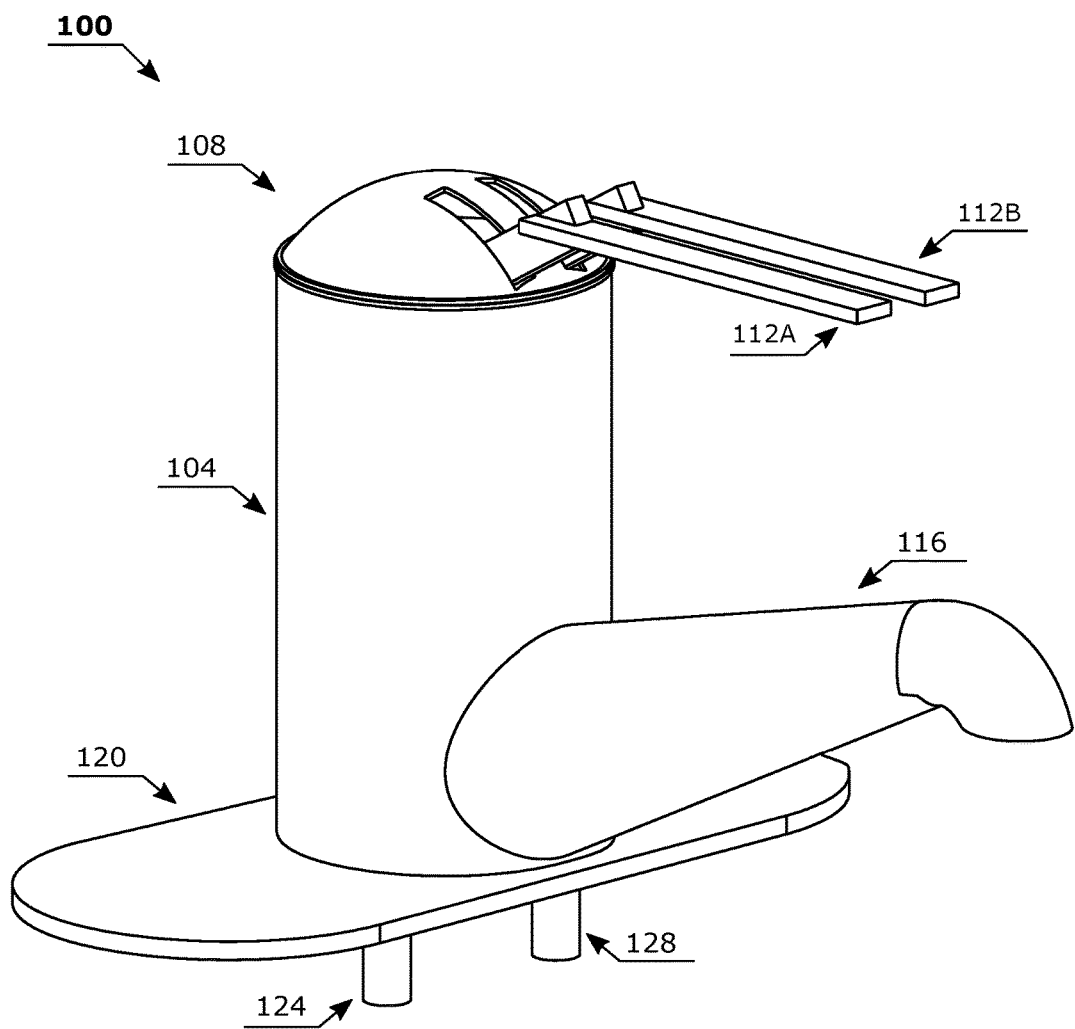

| Sheet # | FIG. # | Brief description |
| --- | --- | --- |
| 16 | 22b | Top view of movable-plate 164B of dual-stem-cartridge 136. |
| 17 | 23a, 23b | Two perspective views of sub-assembly of movable-plates 164A, 164B and guide-plate 160 of dual-stem-cartridge 136, without other parts for clarity. |
| 18 | 24a, 24b | Two perspective views of fixed-plate 168 of dual-stem-cartridge 136. |
| 19 | 25a | Schematic view of "Y" inlet passageways 176, 180 inside fixed-plate 168. |
| 19 | 25b | Schematic view of "Y" outlet passageway 184 inside fixed-plate 168. |
| 20 | 26 | Perspective view of sub-assembly of levers 112A, 112B, hem i-ball-stems 140A, 140B, pin 144, movable-plates 164A, 164B and fixed-plate 168, without other parts for clarity. |
| 21 | 27a | Perspective view of sub-assembly of movable-plates 164A, 164B and fixed-plate 168 of dual-stem-cartridge 136, without other parts for clarity. |
| 21 | 27b | Top view of sub-assembly of movable-plates 164A, 164B and fixed-plate 168 of dual-stem-cartridge 136, without other parts for clarity. |
|  | 28a to 28j | Schematic views of some important positions of two movable-plates 164A, 164B relative to fixed-plate 168 during operation of faucet assembly 100. |
| 22 | 28a | Schematic view - No water outflow |
| 22 | 28b | Schematic view - 50% hot + 50% cold water outflow, mixed |
| 23 | 28c | Schematic view - 25% hot + 25% cold water outflow, mixed, using one lever |
| 23 | 28d | Schematic view - 25%% hot + 25% cold water outflow, mixed, using one lever |
| 24 | 28e | Schematic view - 100% cold water outflow |
| 25 | 28f | Schematic view - 50% cold water outflow, using one lever |
| 25 | 28g | Schematic view - 50% cold water outflow, using one lever |
| 26 | 28h | Schematic view - 100% hot water outflow |
| 27 | 28i | Schematic view - 50% hot water outflow, using one lever |
| 27 | 28j | Schematic view - 50% hot water outflow, using one lever |
| 28 | 29 | Perspective exterior view of exemplary Dual-Lever Water-Saving Faucet assembly 400 in accordance with second preferred embodiment of present invention. |
| 29 | 30 | Exploded perspective view of faucet assembly 400. Various parts of faucet assembly 400 are depicted in this view in general order of arrangement. |
| 30 | 31 | Perspective view of casing 404 of faucet assembly 400. |
| 30 | 32 | Perspective view of pin 444 of faucet assembly 400. |
| 31 | 33a, 33b | Two perspective views of hemi-ball-lever 440A of faucet assembly 400. |
| 31 | 34a, 34b | Two perspective views of hemi-ball-lever 440B of faucet assembly 400. |
| 32 | 35 | Perspective view of spring 452 of faucet assembly 400. |
| 33 | 36a, 36b | Two exploded perspective views of cartridge 436 of faucet assembly 400, depicting various members in general order of arrangement. |
| 34 | 37a, 37b | Two perspective views of housing 472 of cartridge 436. |
| 35 | 38a, 38b | Two perspective views of bushing 456 of cartridge 436. |
| 36 | 39 | Perspective view of sub-assembly of hemi-ball-levers 440A, 440B, pin 444, movable-plates 164A, 164B, fixed-plate 168 of faucet assembly 400, without other parts for clarity. |
| 37 | 40 | Perspective exterior view of exemplary Dual-Lever Water-Saving Faucet assembly 600 in accordance with third preferred embodiment of present invention. |
| 38 | 41 | Exploded perspective view of faucet assembly 600. Various parts of faucet assembly 600 are depicted in this view in general order of arrangement. |
| 39 | 42 | Perspective view of casing 604 of faucet assembly 600. |
| 39 | 43 | Perspective view of dome 608 of faucet assembly 600. |
| 40 | 44a, 44b | Two perspective views of dual-stem-cartridge 636 of faucet assembly 600. |
| 41 | 45a, 45b | Two perspective views of housing 672 of cartridge 636. |
| 42 | 46a, 46b | Two perspective views of fixed-plate 668 of cartridge 636. |
|  | 47a to 47d | Schematic views of some important positions of two movable-plates 164A, 164B relative to fixed-plate 168 during operation of faucet assembly 100. |
| 43 | 47a | Schematic view - No water outflow |
| 43 | 47b | Schematic view - 50% water outflow |
| 44 | 47c | Schematic view - 50% water outflow |
| 44 | 47d | Schematic view - 100% water outflow |
| 45 | 48 | Perspective exterior view of exemplary Dual-Lever Water-Saving Faucet assembly 800 in accordance with fourth preferred embodiment of present invention. |
| 46 | 49 | Exploded perspective view of faucet assembly 800. Various parts of faucet assembly 800 are depicted in this view in general order of arrangement. |
| 47 | 50 | Perspective view of casing 804 of faucet assembly 800. |
| 48 | 51a, 51b | Two exploded perspective views of cartridge 836 of faucet assembly 800, depicting various members in general order of arrangement. |
| 49 | 52a, 52b | Perspective view of housing 872 of cartridge 836. |

DETAILED DESCRIPTION

First Preferred Embodiment—Mixing-Type

Figure 2:
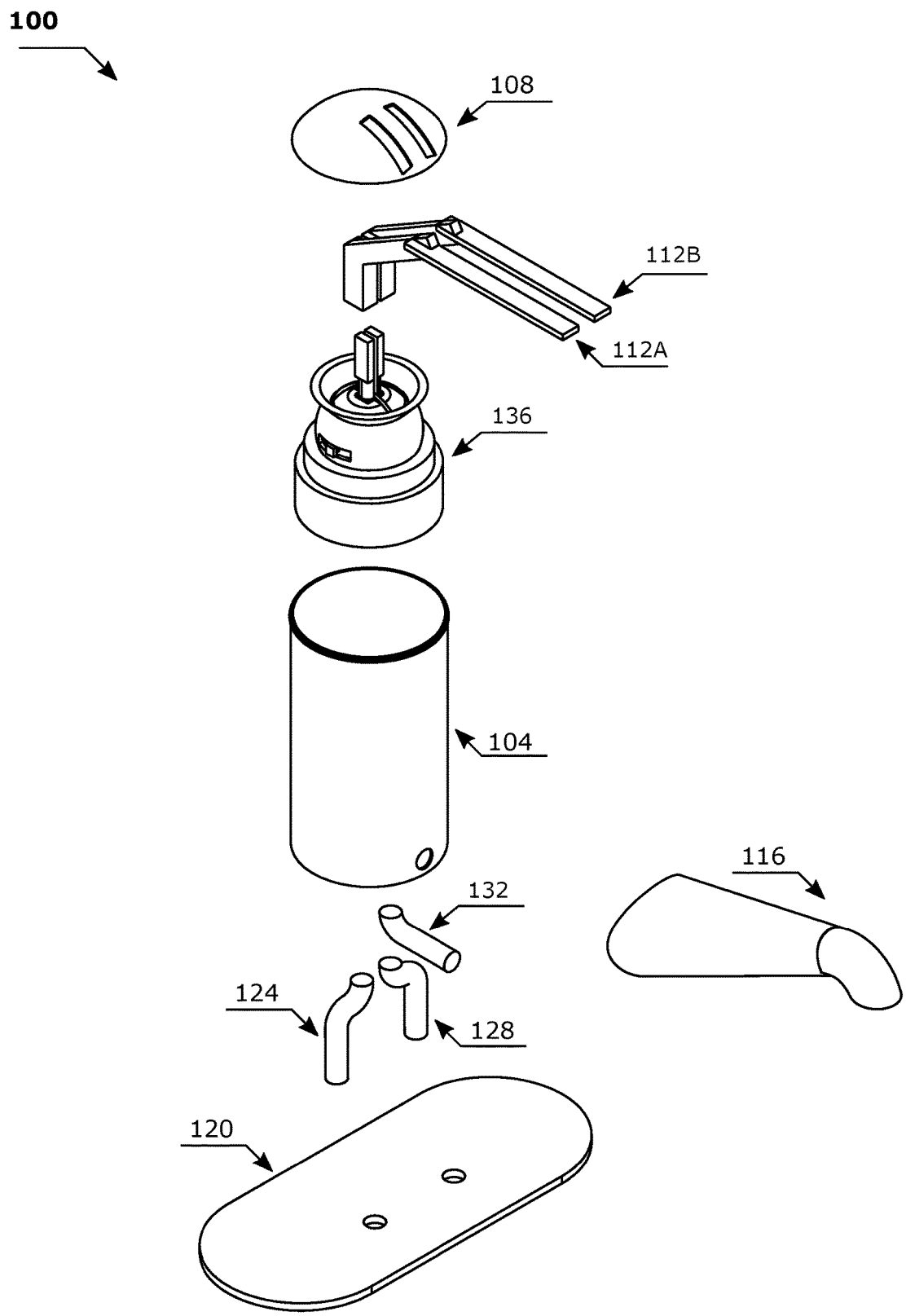

The Dual-Lever Water-Saving Faucet assembly 100, for mixing two fluids, usually cold and hot water, in accordance with the first preferred embodiment, is as seen in FIG. 1. The exploded view in FIG. 2 of faucet assembly 100 shows various components in general order of arrangement, including two inlet pipes 124,128, an outlet pipe 132, a dual-stem-cartridge 136, two levers 112A, 112B and a body comprising a casing 104, a dome 108, a base-plate 120, and a spout 116.

Figure 3:
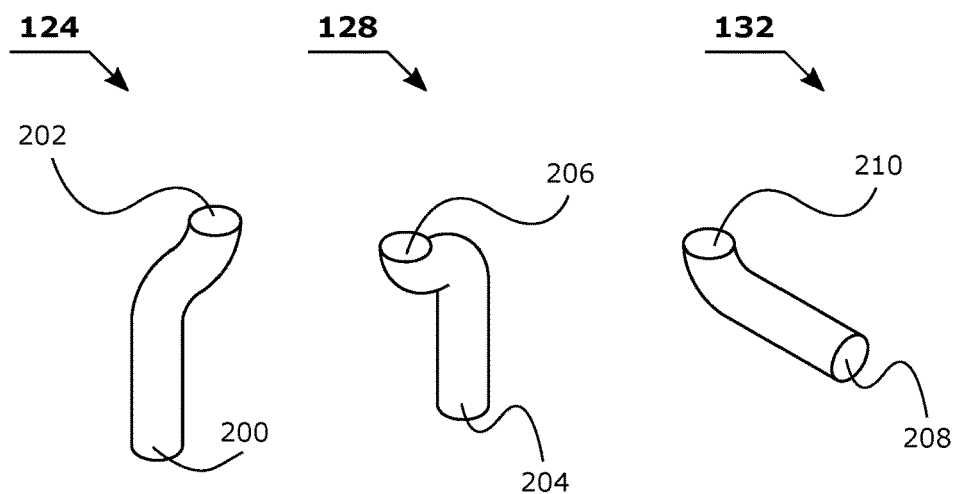
Figure 4:
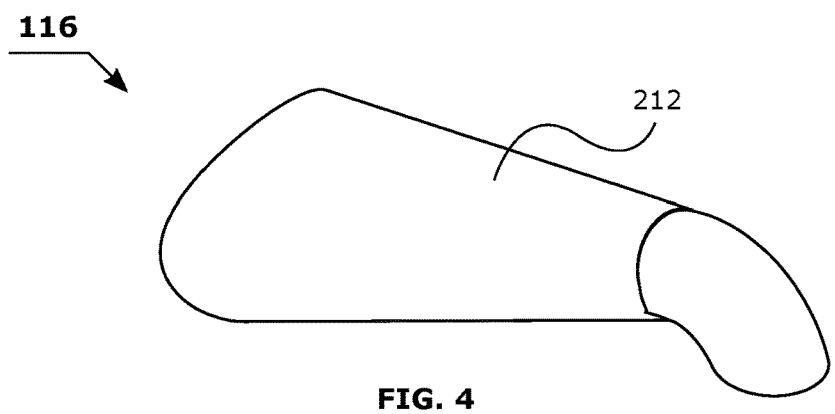
Figure 5:
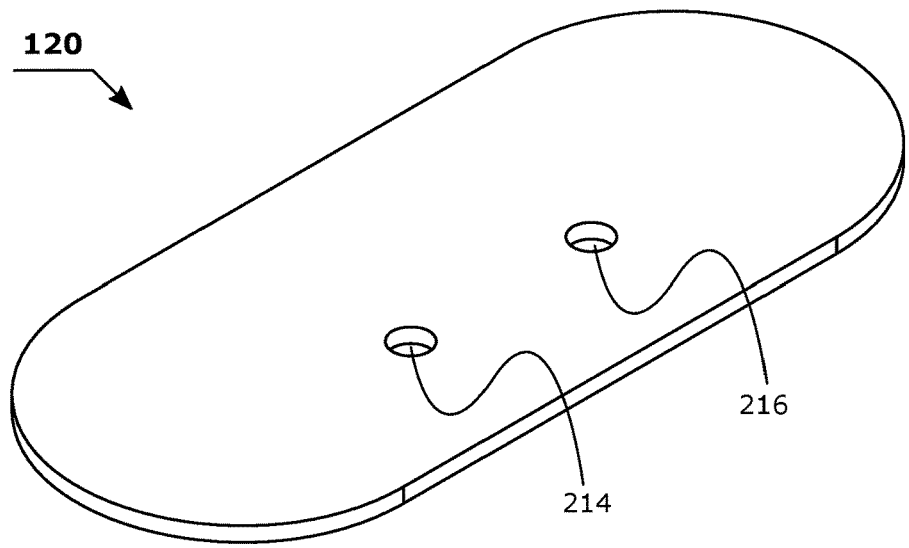

The two inlet pipes 124,128, as seen in FIG. 3 receive fluids, usually, cold and hot water, are respectively connected at ends 202, 206 to inlet holes at base of dual-stem-cartridge 136. The outlet pipe 132, also seen in FIG. 3, is for outflow of mixed fluid, usually mixed water, and is connected at end 210 to the outlet hole at base of dual-stem-cartridge 136. FIG. 4 shows spout 116, depicted here, as elongated tubular 212 in shape with an internal passageway (not shown) that conveys mixed water outside faucet assembly 100. The base-plate 120, as shown in FIG. 5, provides support when faucet assembly 100 is mounted on foundation, like a bathroom countertop. The base-plate 120 is attached to casing 104.

Figure 6:
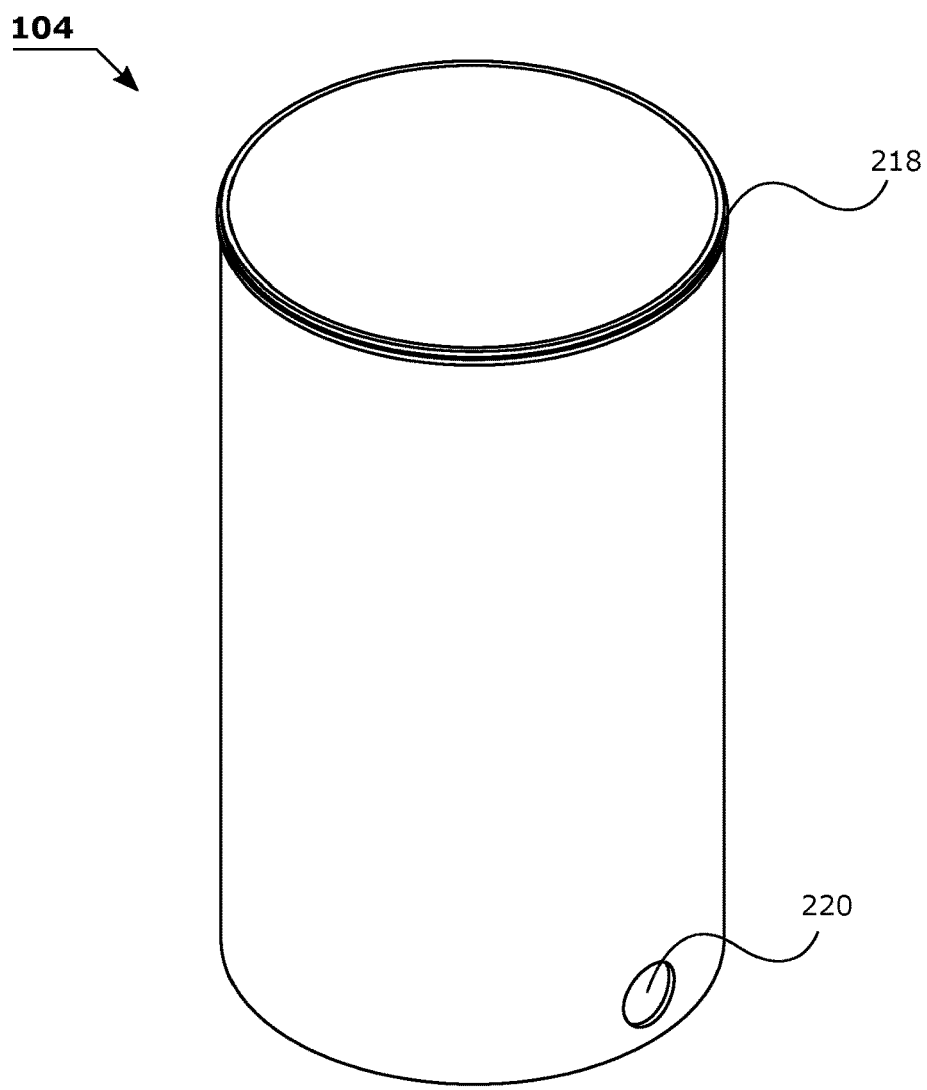

FIG. 6 shows casing 104, as depicted here, is hollow, generally cylindrical in shape and houses various components of faucet assembly 100. The casing 104 has a groove 218 near top portion and an orifice 220 in bottom portion. The spout 116 is connected to casing 104 at orifice 220, where end 208 of outlet pipe 132, orifice 220 and internal passageway of spout 116 are substantially aligned.

Figure 7:
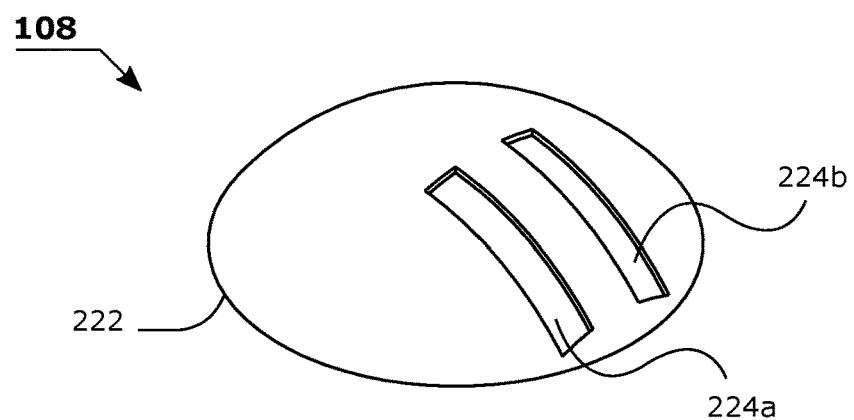

The dome 108, as seen in FIG. 7, is dome-shaped structure disposed at upper end of the casing 104, such that the dome-shape is extending outward from casing 104. The dome 108 has two parallel elongated slots 224a, 224b along surface sloping toward casing 104. The peripheral rim 222 of dome 108 is circular and has feature that coaxially mates with groove 218 in casing 104 in such a way that dome 108 can freely rotate about a central vertical axis, which is referenced for the first embodiment as second axis.

Figure 8A:
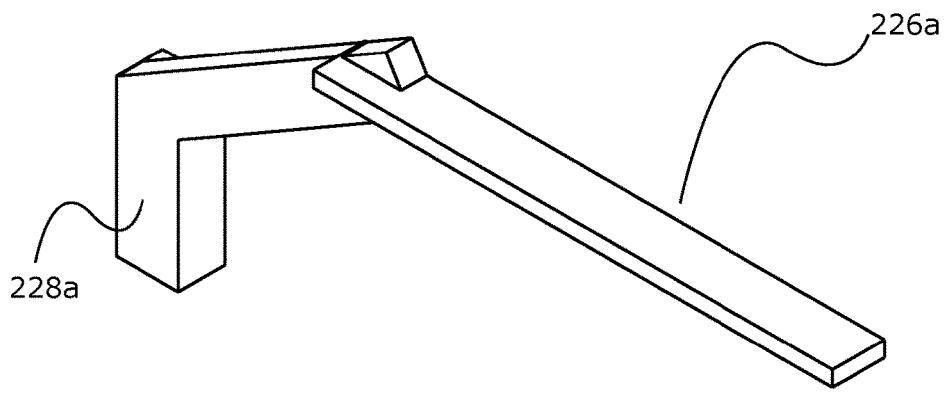
Figure 8B:
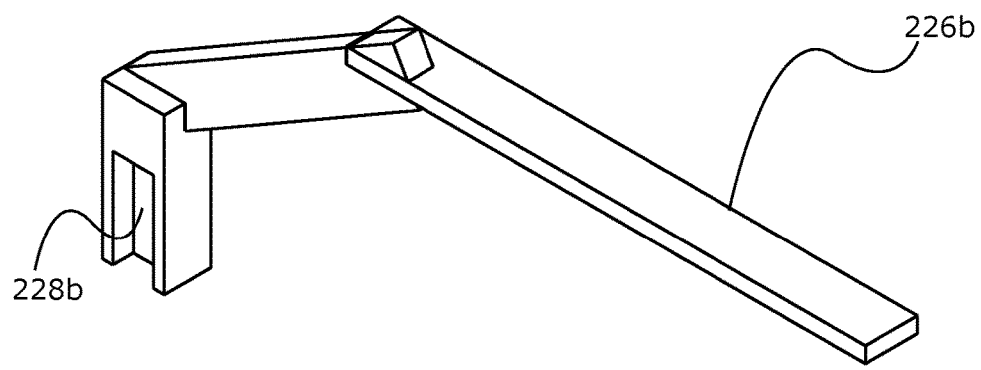
Figure 9:
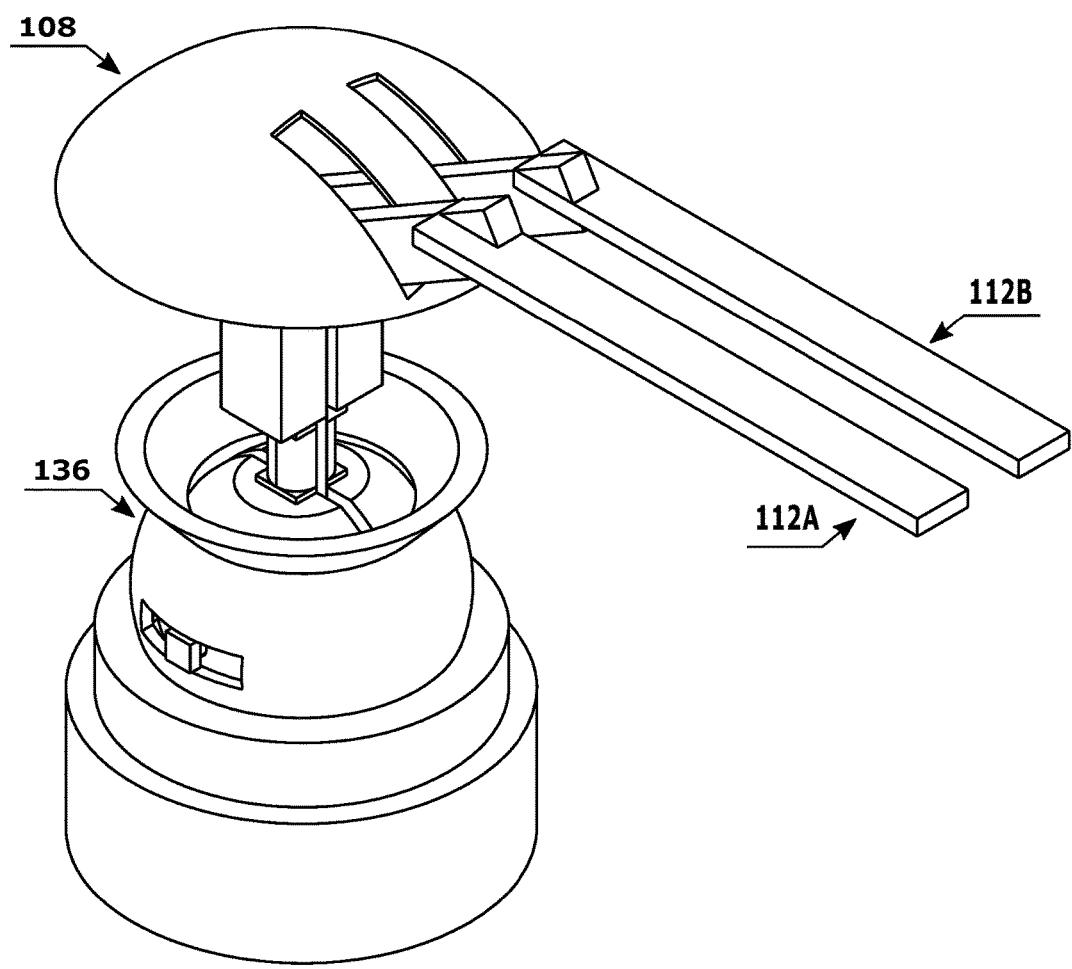

FIG. 8a shows lever 112A and FIG. 8b shows lever 112B, each a mirror symmetry of the other, which are devices used for operating faucet assembly 100. The levers 112A, 112B have connecting members 228a, 228b which are used to connect with stems of dual-stem-cartridge 136, as described later. The angled portions of connecting members 228a, 228b pass through slots 224a, 224b of dome 108 and emerge out as sections 226a, 226b respectively, for user to operate faucet assembly 100. FIG. 9 shows the sub-assembly of two levers 112A, 112B connected to stems of dual-stem-cartridge 136, and passing through slots 224a, 224b of dome 108, without other components for clarity.

Figure 10:
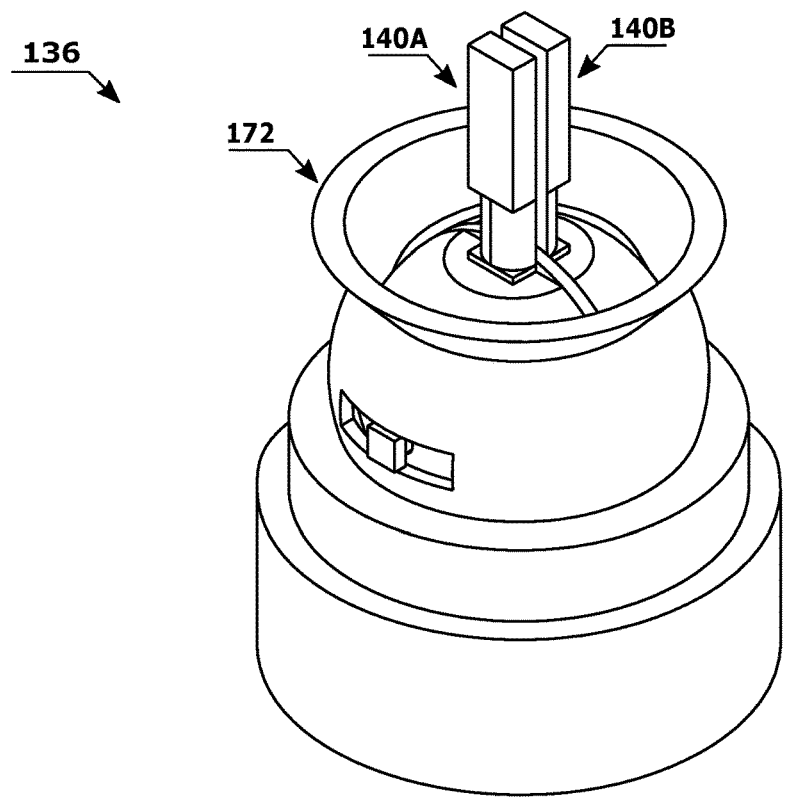
Figure 11:
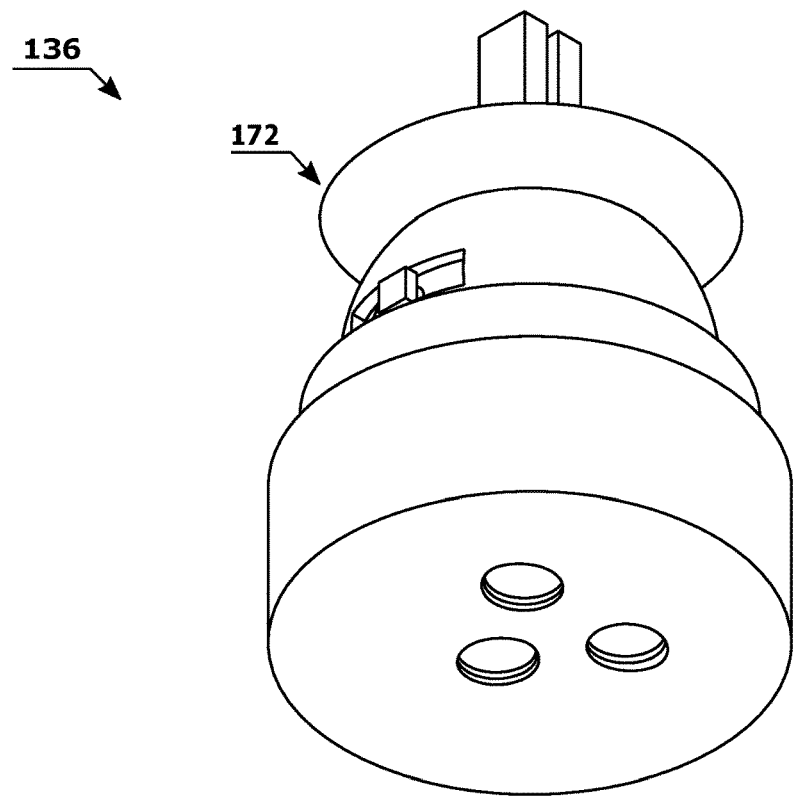
Figures 12A, 12B:
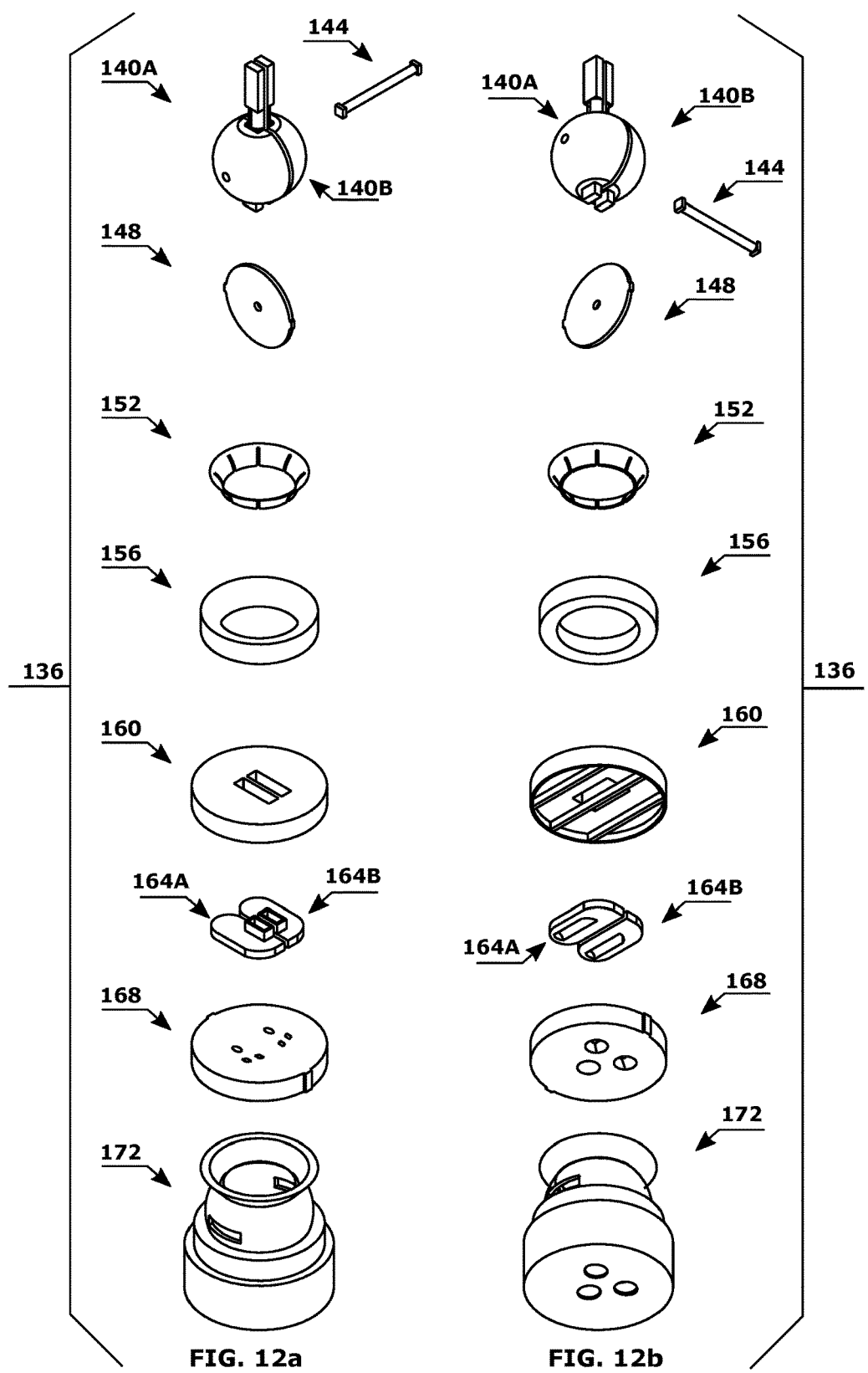

FIG. 10 and FIG. 11 show two perspective views of dual-stem-cartridge 136, in assembled form. Seen assembled in this figure are two hemi-ball-stems 140A, 140B and a housing 172. FIG. 12a and FIG. 12b show two exploded perspective views of dual-stem-cartridge 136, depicting various members in general order of arrangement, including two hemi-ball-stems 140A, 140B, a pin 144, a separator-disc 148, a spring 152, a bushing 156, a guide-plate 160, two movable-plates 164A, 164B, a fixed-plate 168 and housing 172.

Figure 13A:
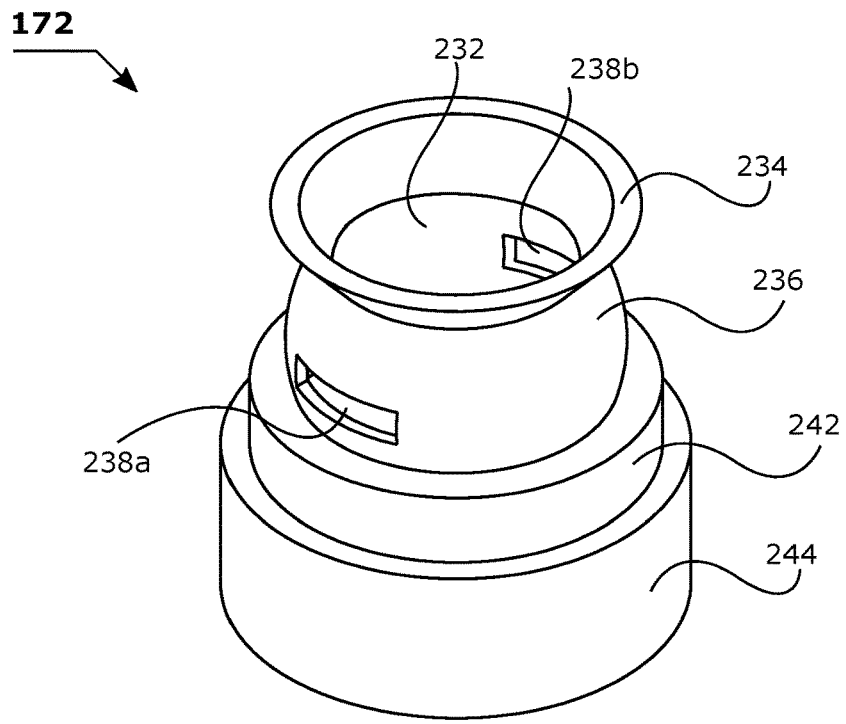
Figure 13B:
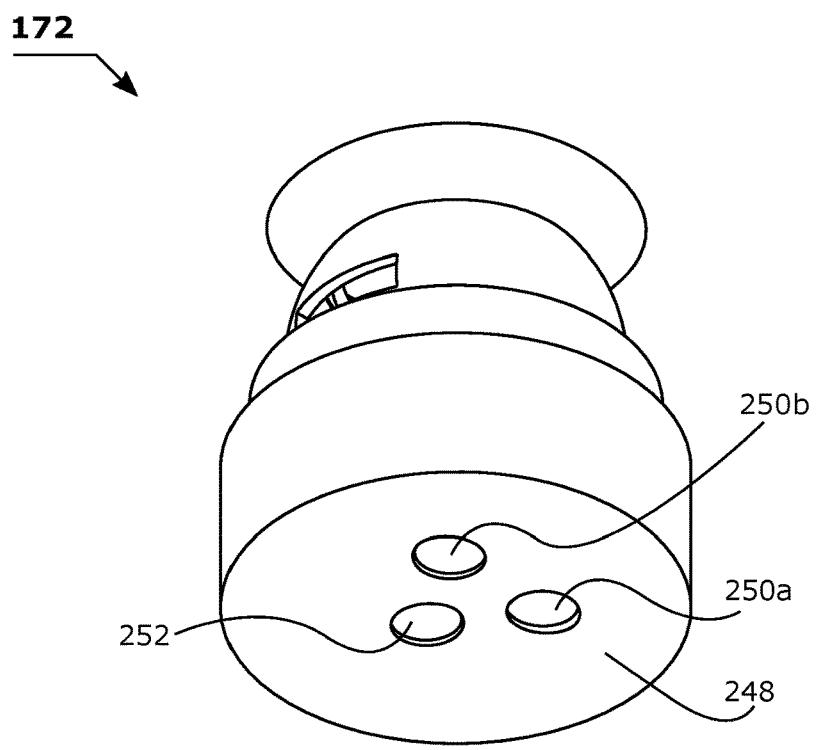

FIG. 13a and FIG. 13b show two perspective views of housing 172. The housing 172 has hollow cylindrical portions 242, 244 and a hollow dome-shaped portion 236 forming an enclosed area with a conical opening 234. A central chamber 232 formed in conical opening 234 extends through dome-shaped portion 236 into cylindrical portions 242, 244. The chamber 232 in dome-shaped portion is narrower toward conical opening 234 than toward cylindrical portion 242. The dome-shaped portion 236 has two slots 238a, 238b which are positioned diametrically opposite to each other and are of equal arc lengths. The dome-shaped portion 236 also has two grooves 239a, 239b (not shown) on its inner surface which are positioned diametrically opposite to each other, and coplanarly orthogonal to two slots 238a, 238b. The arc length of grooves 239a, 239b is at least same as arc length of slots 238a, 238b. The cylindrical portion 244 and cylindrical portion 242 can be separated to aid assembly of components within. The cylindrical portion 244 has three holes 250a, 250b, 252 in base 248.

The dual-stem-cartridge 136 has two identical hemi-ball-stems 140A, 140B. FIG. 14a, FIG. 14b show two perspective views of hemi-ball-stem 140A, and FIG. 14c and FIG. 14d show two perspective views of hemi-ball-stem 140B. The hemi-ball-stem 140A comprises a hemispherical portion 258a having an elongated rectangular cross-sectioned stem portion 256a and a projection 260a. The hemi-ball-stem 140B comprises a hemispherical portion 258b having an elongated rectangular cross-sectioned stem portion 256b and a projection 260b. The hemispherical portions 258a, 258b have flat circular surfaces 264a, 264b with rectangular slots longer than radius of flat circular surfaces 264a, 264b to fit shafts of stem portions 256a, 256b respectively. The stem portions 256a, 256b have holes 262a, 262b at centres of flat circular surfaces 264a, 264b continuing into hemispherical portions 258a, 258b as holes 254a, 254b respectively. As stem portions 256a, 256b radially emerge out of hemispherical portions 258a, 258b, parts of the stem portions have semi-circular cross-section, respectively. The projections 260a, 260b extend from hemispherical portions 258a, 258b in direction opposite to that of stem portions 256a, 256b respectively.

Figure 15:
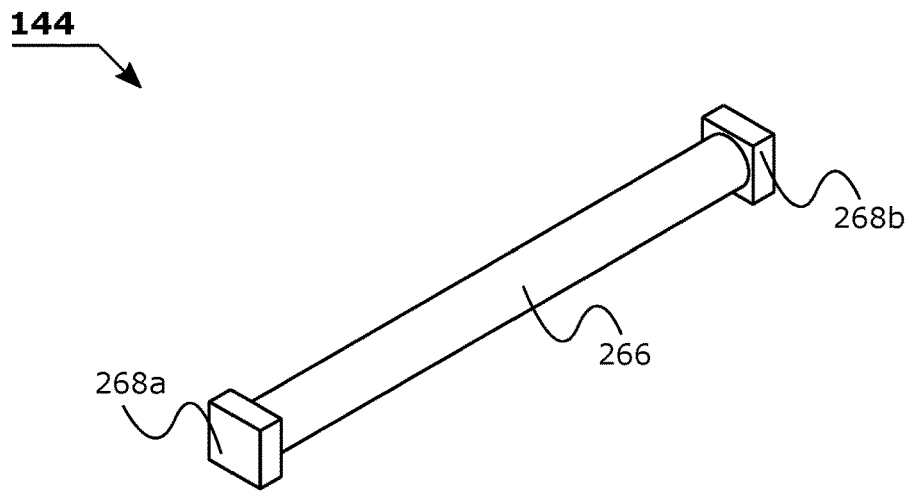

FIG. 15 shows perspective view of pin 144. The pin 144 has a cylindrical shaft portion 266, with square blocks 268a, 268b at its two ends. The cylindrical shaft portion 266 snugly fits holes 262a, 254a, 262b, 254b in hemi-ball-stems 140A, 140B. The square blocks 268a, 268b fit slots 238a, 238b in housing 172, respectively.

Figure 16:
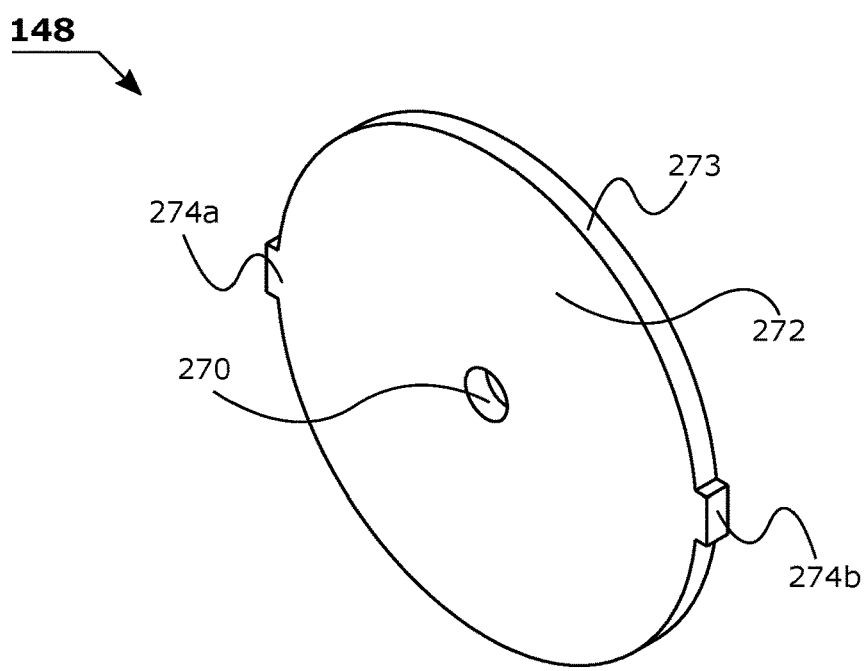

FIG. 16 shows perspective view of separator-disc 148. The separator-disc 148 is a flat circular disc with a hole 270 at centre, a flat circular face 272 and a rim 273, such that cylindrical shaft portion 266 of pin 144 can snugly fit in hole 270. The separator-disc 148 has two notches 274a, 274b on rim 273 at diametrically opposite ends of face 272.

Two hemi-ball-stems 140A, 140B are set adjacent with flat circular surfaces 264a, 264b respectively facing each other, and stem portions 256a, 256b aligned in same direction. The stem portions 256a, 256b are inserted into housing 172 with said stem portions extending from dome-shaped portion 236 and out of conical opening 234. The shape of hemispherical portions 258a, 258b of hemi-ball-stems 140A, 140B substantially matches dome-shaped portion 236 of housing 172. The separator-disc 148 is positioned between two flat-circular-surfaces 264a, 264b of two hemi-ball-stems 140A, 140B. The two notches 320 on separator-disc 148 mate with two grooves 239a, 239b in dome-shaped portion 236 of housing 172. The pin 144 is positioned through holes 262a, 254a, 262b, 254b in two hemi-ball-stems 140A, 140B and hole 270 in separator-disc 148. The square blocks 268a, 268b of pin 144 rest in two slots 238a, 238b of housing 172. Each hemi-ball-stem 140A, 140B is able to pivot around pin 144 and this axis of motion is referenced in first embodiment as first axis. The separator-disc 148 is prevented from moving along with hemi-ball-stems 140A, 140B about the first axis by notches 274a, 274b and grooves 239a, 239b. The hemi-ball-stems 140A, 140B along with separator-disc 148 and pin 144 are together able to rotate about the second axis.

Figure 17:
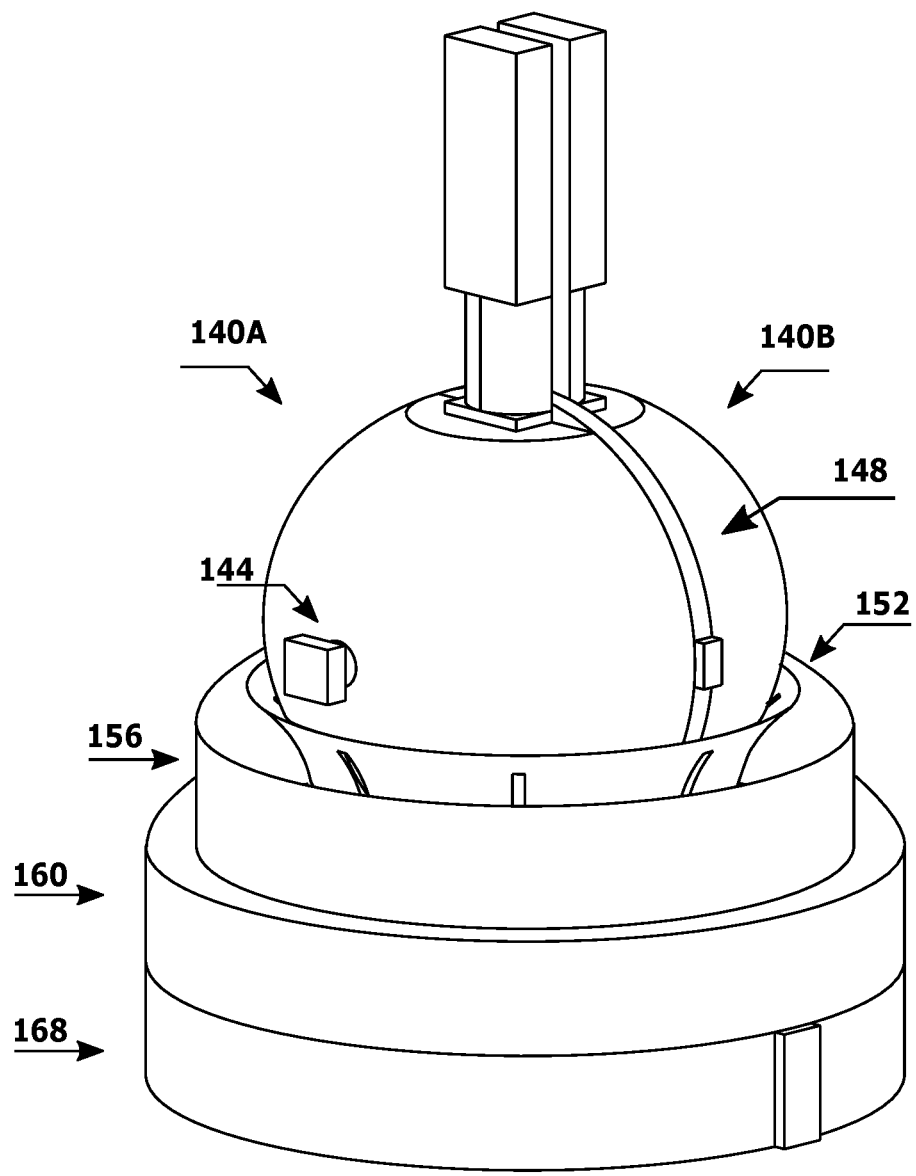

FIG. 17 shows perspective view of sub-assembly referenced in above paragraph along with other members of cartridge 136 but without housing 172 for clarity of arrangement. Seen in this figure is arrangement of two hemi-ball-stems 140A, 140B, pin 144, separator-disc 148. This figure will be referenced again.

Figure 18:
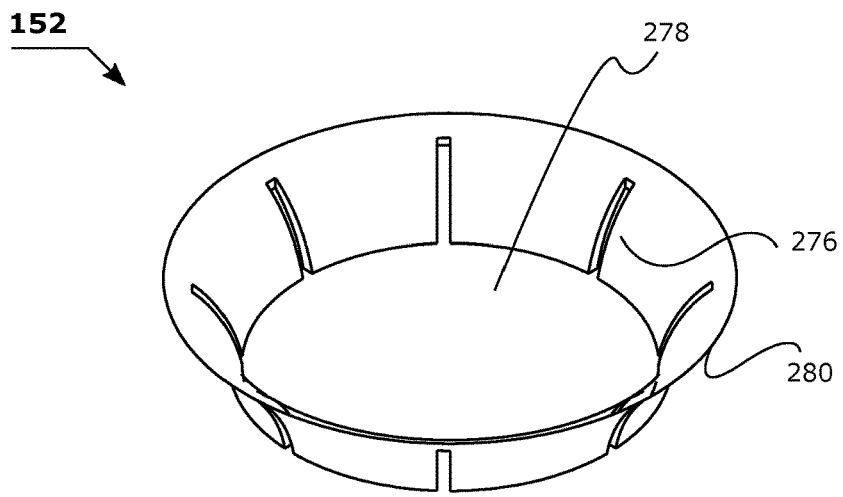

The spring 152, as seen in FIG. 18, is annular in shape with central opening 278 and multiple curved elastic flanges 276 along its annular periphery 280. The flanges 276 curve inward toward central opening 278. The spring 152 is securely fixed and supported inside housing 172 by elements (not shown) such as notch, ledge, etc.

Figure 19A:
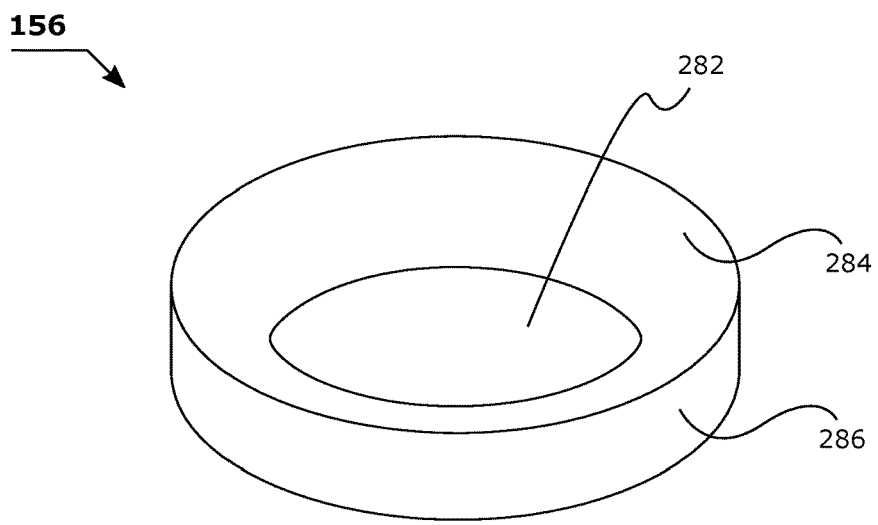
Figure 19B:
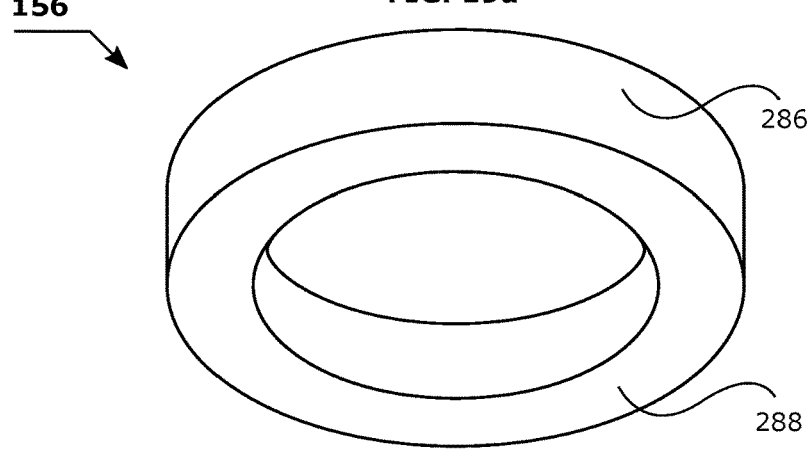

The bushing 156, as seen in two perspective views of FIG. 19a and FIG. 19b, has flat annular lower portion 288 and cylindrical outer periphery 286 with central opening 282. Inside surface portion 284 of bushing has curvature of a toroid-section that generally matches curvature of flanges 276 of spring 152. The bushing 156 is securely fixed and supported inside housing 172 by elements (not shown) such as notch, ledge, etc. and is positioned in cylindrical section 242 of housing 172. The spring 152 partly rests on bushing 156 such that central opening 278 in spring 152 coincides with central opening 282 of bushing 156. The bushing 156 is positioned concentrically on guide-plate 160.

The two projections 260a, 260b of two hemi-ball-stems 140A, 140B respectively extend through central opening 278 of spring 152 and central opening 282 of bushing 156. The two hemispherical portions 258a, 258b of two hemi-ball-stems 140A, 140B respectively also extend partly through central opening 278 of spring 152 and central opening 282 of bushing 156. The hemispherical portions 258a, 258b are in contact with dome-shaped portion 236 of housing 172. The spring 152 presses two hemispherical portions 258a, 258b against dome-shaped portion 236. When cylindrical section 242 of housing 172 is fastened to cylindrical portion 244 of housing 172, bushing 156 presses against guide-plate 160. Together, bushing 156 and spring 152 keeps the other members of cartridge 136 in tight fit.

Referring to FIG. 17 again, shows perspective view of this sub-assembly along with other members of cartridge 136 for clarity of arrangement. Seen in this figure is arrangement of spring 152, bushing 156 and guide-plate 160.

Figure 20A:
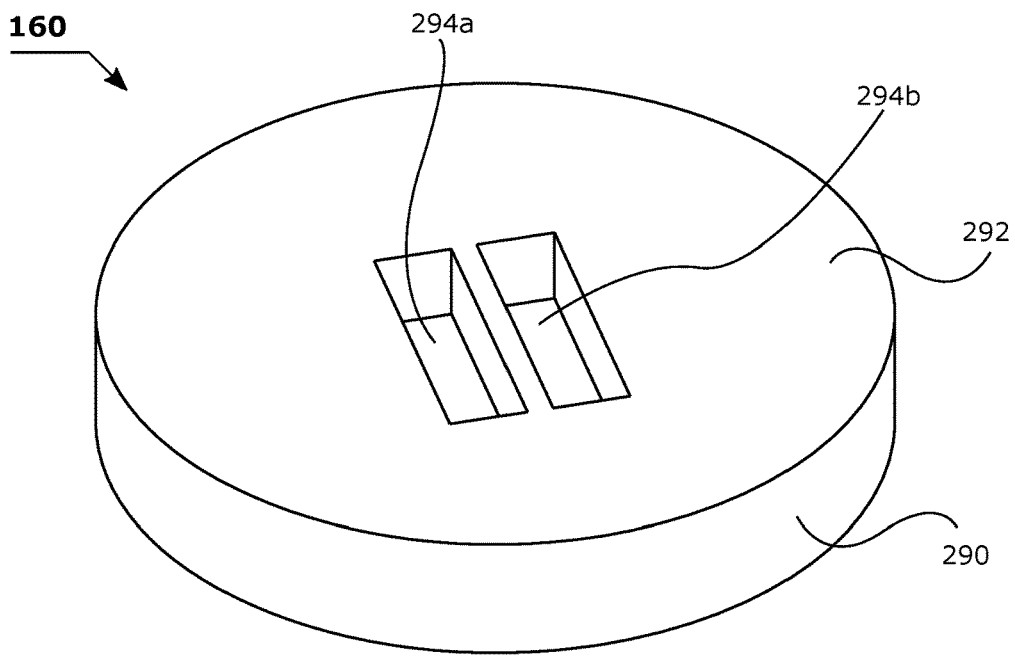
Figure 20B:
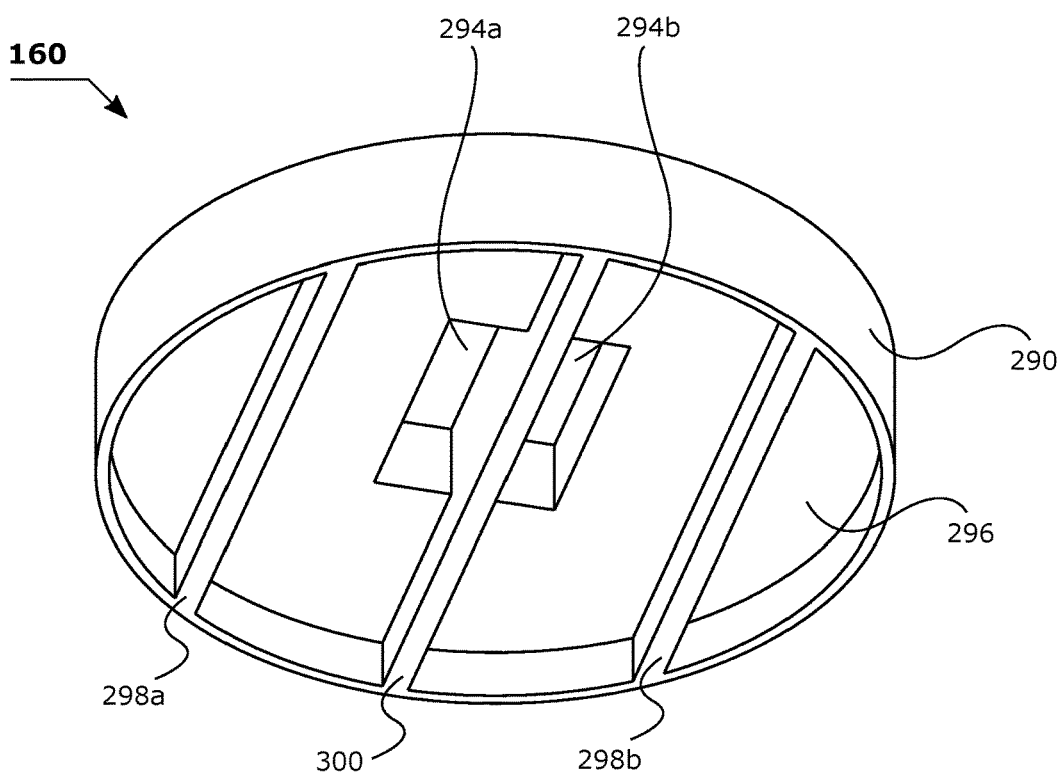

The guide-plate 160, as seen in FIGS. 20a, 20b is a hollow circular disc, positioned in cylindrical section 242 of housing 172, with one circular side open forming a circular chamber 296 surrounded by rim 290, and other circular side 292 having two rectangular slots 294a, 294b to access chamber 296. The two slots 294a, 294b are parallel to and equidistant from diameter of face 292. The chamber 296 has a central flange 300 along diameter and parallel to any long side of rectangular slots 294a, 294b. The flange 300 extends to side 292 to form a common wall between slots 294a, 294b. The circular chamber 296 has two flanges 298a, 298b parallel to, equidistant from and on opposite sides of flange 300. The guide-plate 160 is able to rotate about the second axis.

Figure 21A:
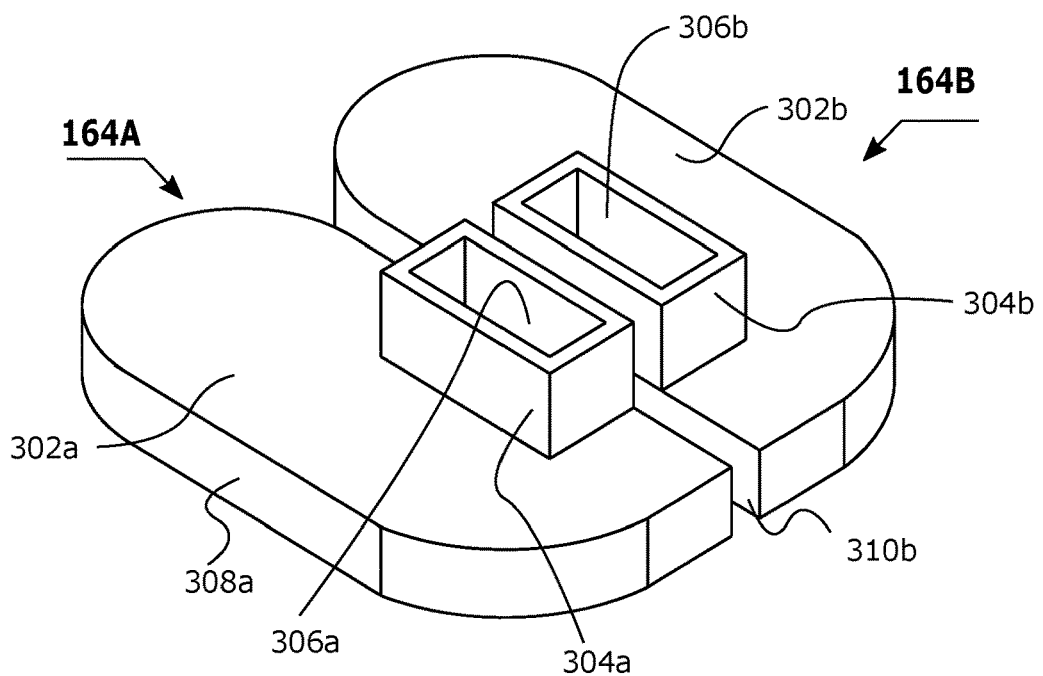
Figure 21B:
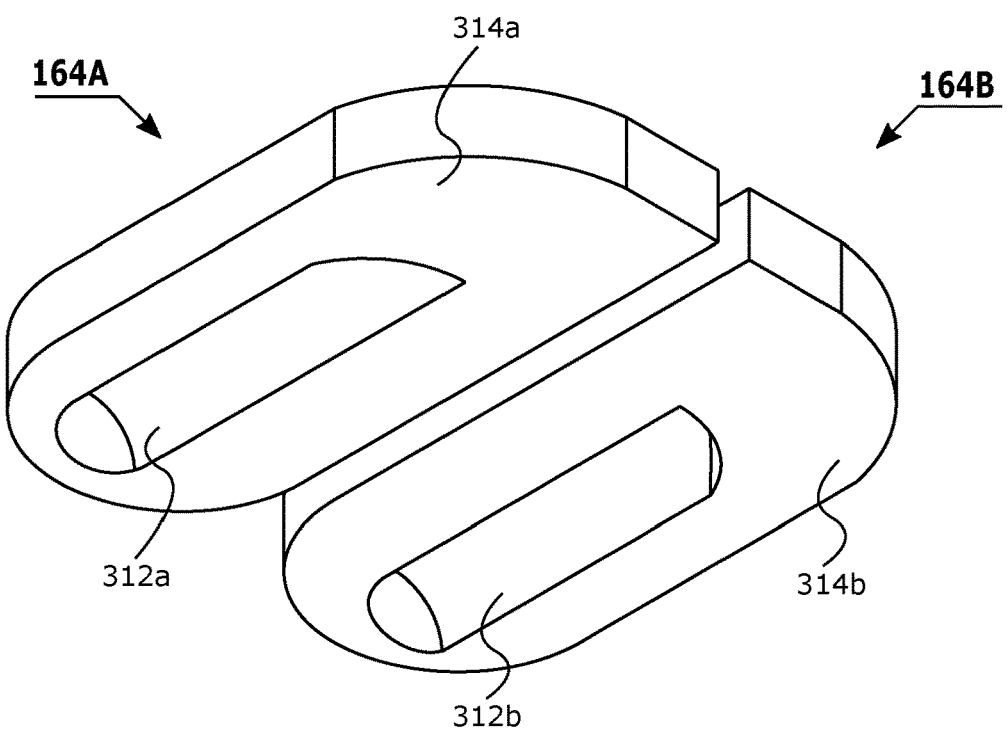
Figures 22A, 22B:
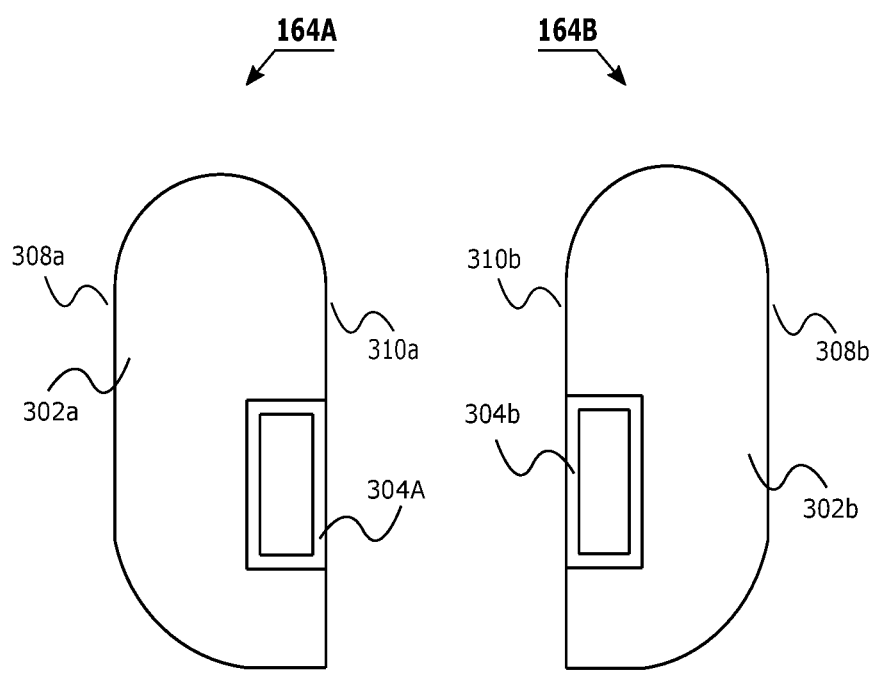

The cartridge 136 has two movable-plates 164A, 164B. The movable-plate 164A is mirror symmetry of movable-plate 164B. FIG. 21a and FIG. 21b show two perspective views of movable-plates 164A, 164B positioned adjacent to each other. The movable-plate 164A is flat with one side 302a having an appendage 304a forming a recess 306a, and other side having a chamber 312a which is a cavity surrounded by a flat lip 314a. The movable-plate 164B is flat with one side 302b having an appendage 304b forming a recess 306b, and other side having a chamber 312b which is a cavity surrounded by a flat lip 314b. The chambers 312a, 312b, as depicted here, are elongated, having curved surface. The chambers 312a, 312b serve as mixing chambers where two fluids are mixed and serve as fluid communication between inlet and outlet apertures, as described later. FIG. 22a and FIG. 22b show top view of moveable-plates 164A, 164B respectively. The moveable-plate 164A has at least two opposite side-faces 308a and 310a which are parallel and orthogonal to lip 314a. The moveable-plate 164B has at least two opposite side-faces 308b and 310b which are parallel and orthogonal to lip 314b.

Figure 23A:
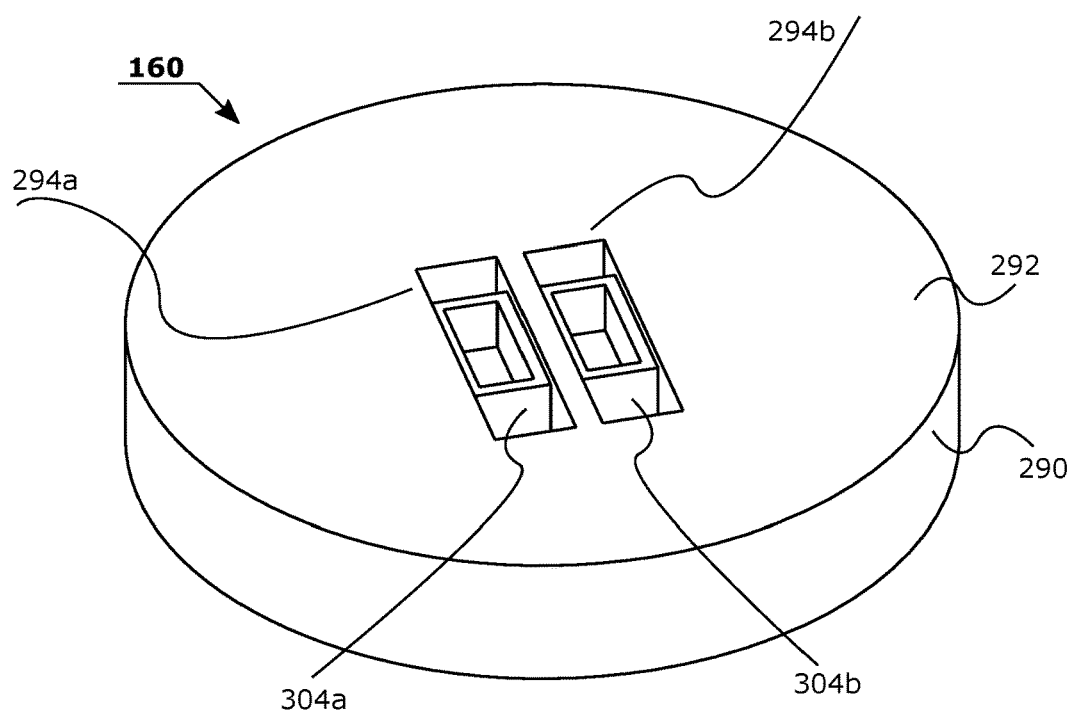
Figure 23B:
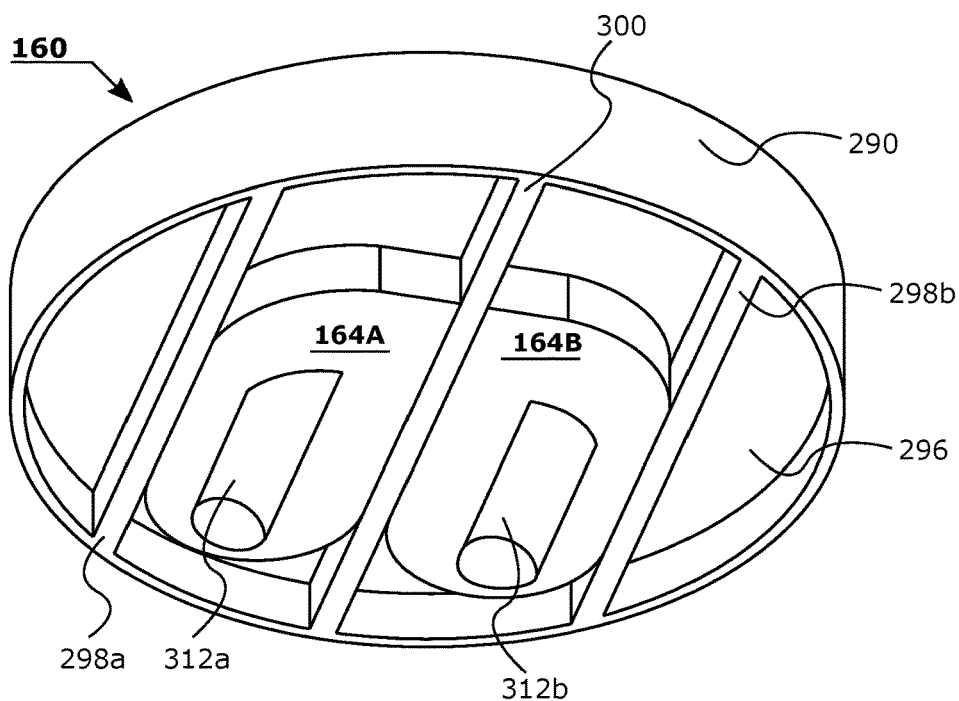

FIGS. 23a, 23b show sub-assembly of guide-plate 160 and movable-plates 164A, 164B. The movable-plate 164A is positioned between two flanges 298a, 300 of guide-plate 160 such that appendage 304a extends into slot 294a. The two flanges 298a, 300 form a channel or conduit in which movable-plate 164A can slide. Similarly, movable-plate 164B is placed between two flanges 300, 298b of guide-plate 160 such that appendage 304b extends into slot 294b. The two flanges 300, 298b form a channel or conduit in which movable-plate 164B can slide. Each movable-plate can rectilinearly slide independent of the other movable-plate. When subjected to rotational movement about the second axis, two movable-plates 164A, 164B rotate together along with guide-plate 160 about the second axis. The appendages 304a, 304b may or may not extend through slots 294a, 294b respectively, beyond flat circular face 292 of guide-plate 160.

The sub-assembly of guide-plate 160 and movable-plates 164A, 164B, as described above, is positioned over fixed-plate 168. Referring again to FIG. 17, guide-plate 160 is concentrically positioned over fixed-plate 168.

Figure 24A:
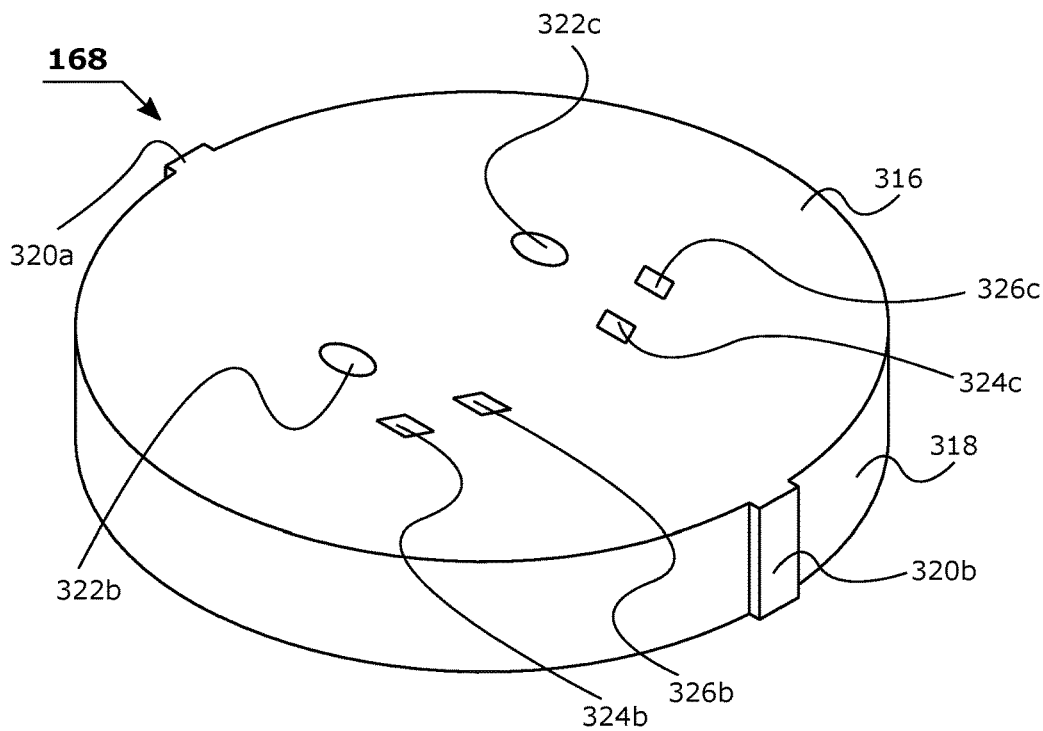
Figure 24B:
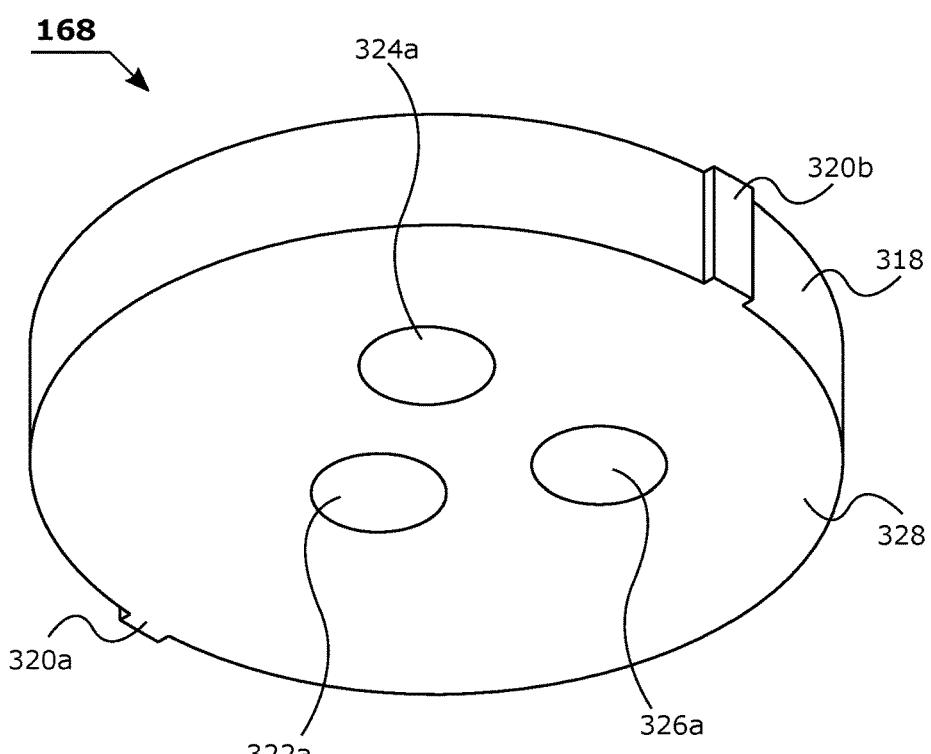

FIGS. 24a and 24b show two perspective views of fixed-plate 168. The fixed-plate 168 is a solid round disc, with two round sides 316, 328. The fixed-plate 168 is positioned in lower cylindrical section 244 of housing 172 and has notches 320a, 320b which have mating grooves (not shown) in housing 172 to prevent movement. The side 328 has inlet apertures 324a, 326a and outlet aperture 322a. The side 316 has inlet apertures 324b, 324c, 326b, 326c and outlet apertures 322b, 322c. The apertures on side 316 have fluid communication with apertures on side 328 by way of internal "Y" shaped passageways 176, 180, 184 as described below.

Figure 25A:
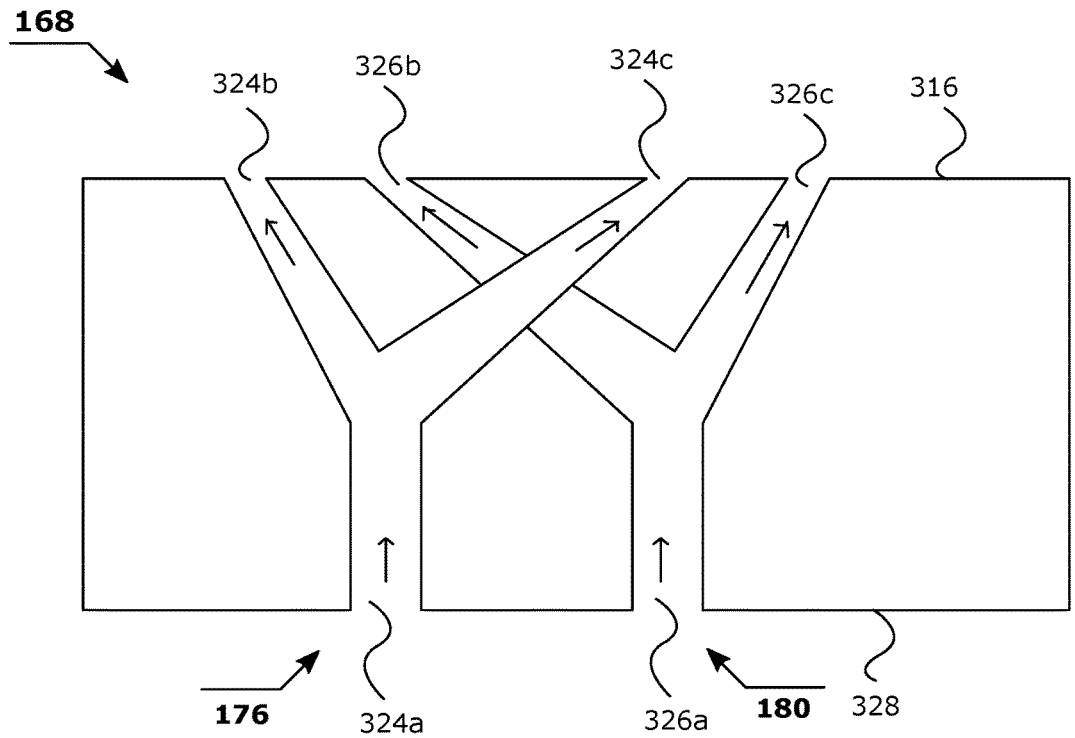
Figure 25B:
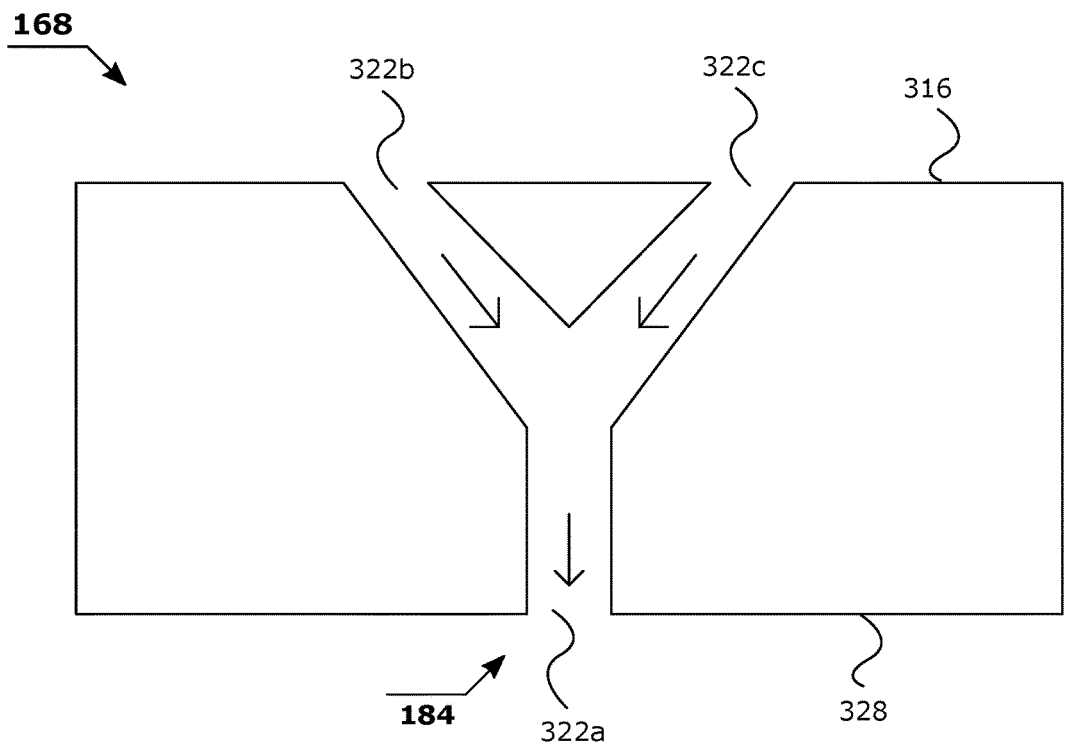

FIGS. 25a and 25b show the schematic of internal "Y" shaped passageways and have to be viewed alongside FIGS. 24a and 24b for clarity. The fixed-plate 168 has two "Y" shaped inlet passageways 176, 180 and one "Y" shaped outlet passageway 184 for fluid communication between apertures at two sides 316, 328. The inlet passageway bifurcates one water inflow stream into two streams and the outlet passageway converges two water outflow streams into one stream. Referring to FIG. 25a, water inflow aperture 324a at side 328 receives hot water and inlet passageway 176 bifurcates it into two streams of hot water that flow to apertures 324b and 324c at side 316. Each aperture 324b and 324c can thus have maximum 50% of the hot water inflow at aperture 324a. The water inflow aperture 326a on side 328 receives cold water and inlet passageway 180 bifurcates it into two streams of cold water that flow to apertures 326b and 326c at side 316. Each aperture 326b and 326c can thus have maximum 50% of the cold water inflow at aperture 326a. Referring to FIG. 25b, outlet apertures 322b, 322c at side 316 receive mixed water and outlet passageway 184 converges these flows into single stream of mixed water that flows to aperture 322a at side 328.

Aperture 326a of fixed-plate 168 substantially coincides with hole 250a in the base of housing 172. One end of inlet pipe 128 is attached to hole 250a in the base of housing 172 and other end passes through hole 214 in base-plate 120 and is connected by external plumbing to cold water source.

Aperture 324a of fixed-plate 168 substantially coincides with hole 250b in the base of housing 172. One end of inlet pipe 124 is attached to hole 250b in the base of housing 172 and other end passes through hole 218 in base-plate 120 and is connected by external plumbing to hot water source.

Aperture 322a of fixed-plate 168 substantially coincides with hole 252 in the base of housing 172. One end of outlet pipe 132 is attached to hole 252 in the base of housing 172. The outlet pipe 132 then passes through orifice 220 in casing 104 and its other end is connected to passageway in spout 116 for mixed water to flow out of faucet assembly 100.

Figure 27A:
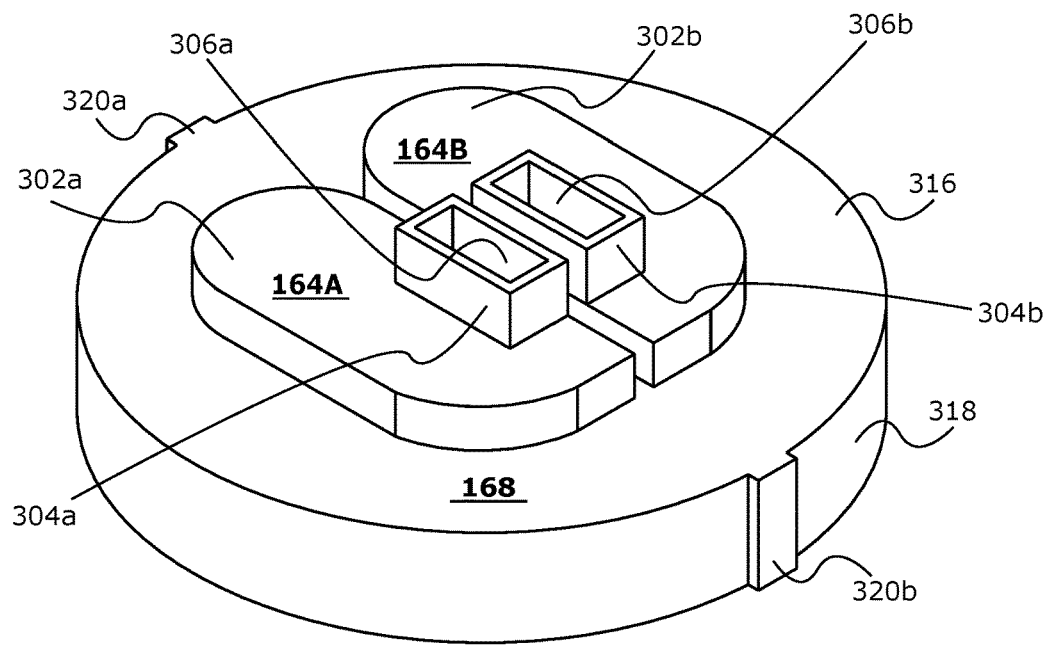
Figure 27B:
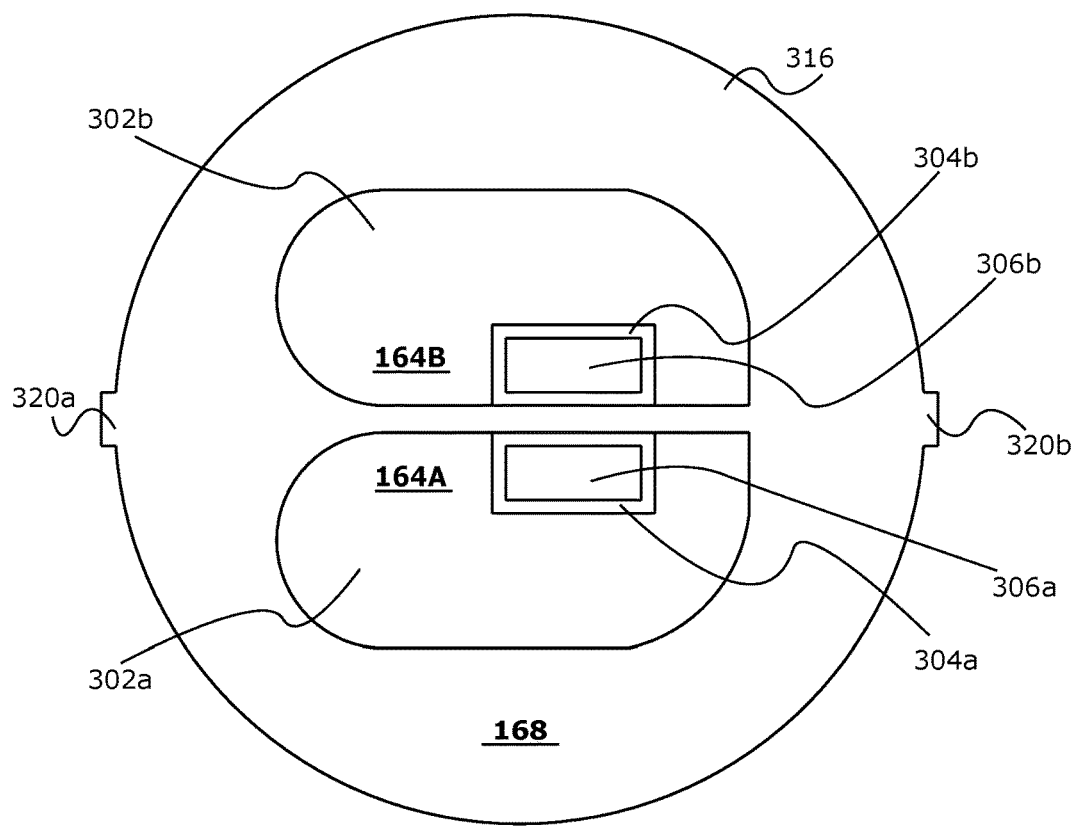
Figure 28A:
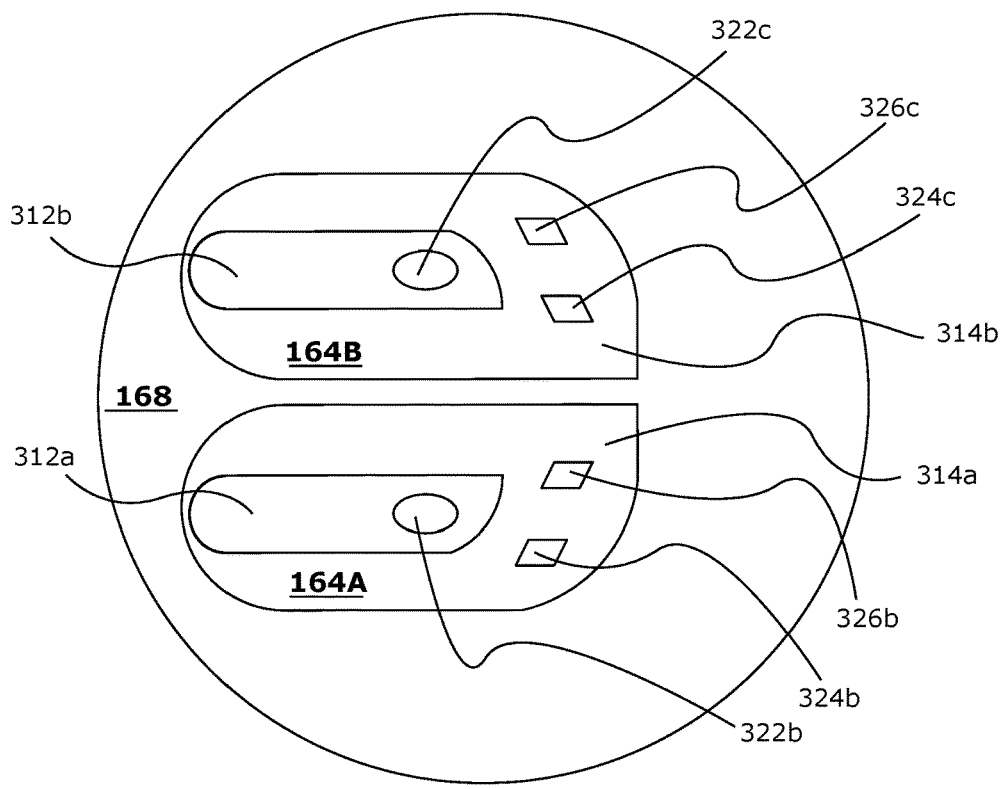

FIG. 27a shows the perspective view of sub-assembly of movable-plates 164A, 164B positioned over fixed-plate 168, and FIG. 27b shows top view of this sub-assembly. The movable-plates 164A, 164B are placed over side 316 of fixed-plate 168 such that appendages 304a, 304b are accessible from top side and movable-plates 164A, 164B cover all apertures on side 316. FIG. 28a is schematic view of FIG. 27b with apertures for clarity.

Referring to FIG. 28a, movable-plate 164A can slide over side 316 of fixed-plate 168 in such a way that portion of chamber 312a is always over outlet aperture 322b, and movable-plate 164A always either seals or unseals inlet apertures 324b, 326b. The movable-plate 164A can seal an inlet aperture by sliding in position to have lip 314a over the inlet aperture completely to form sealing surface which prevents water from flowing out of the inlet aperture. The movable-plate 164A can unseal an inlet aperture by sliding in position to have portion of chamber 312A over the inlet aperture, partially or fully covering said inlet aperture which allows water to flow from inlet aperture into chamber 312a and to outlet aperture 322b. The chamber 312a serves as the mixing chamber for inflows from inlet apertures 324b, 326b to mix, and allows fluid communication between inlet apertures 324b, 326b and outlet aperture 322b.

Referring again to FIG. 28a, movable-plate 164B can slide over side 316 of fixed-plate 168 in such a way that portion of chamber 312b is always over outlet aperture 322c, and movable-plate 164B always either seals or unseals inlet apertures 324c, 326c. The movable-plate 164B can seal an inlet aperture by sliding in position to have lip 314b over the inlet aperture completely to form sealing surface which prevents water from flowing out of the inlet aperture. The movable-plate 164B can unseal an inlet aperture by sliding in position to have portion of chamber 312b over the inlet aperture, partially or fully covering said inlet aperture which allows water to flow from inlet aperture into chamber 312b and to outlet aperture 322c. The chamber 312b serves as the mixing chamber for inflows from inlet apertures 324c, 326c to mix, and allows fluid communication between inlet apertures 324c, 326c and outlet aperture 322c.

Operation of the First Embodiment to Control Flow Rate of Water

Figure 26:
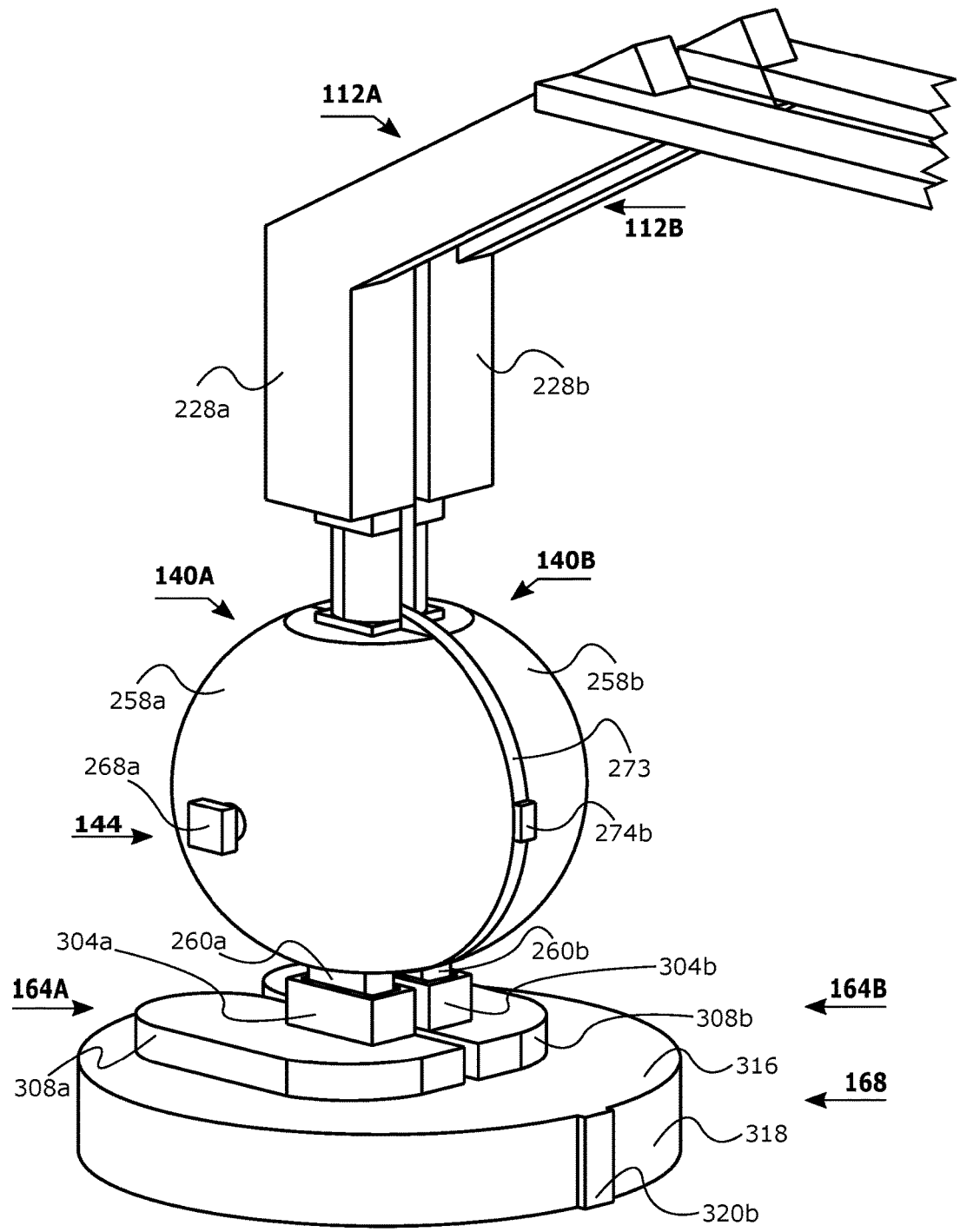

The sub-assembly in FIG. 26 shows arrangement of some parts of faucet 100 for clarity. The appendages 304a, 304b of movable-plates 164A, 164B form recesses 306a, 306b (not labelled) which receive projections 260a, 260b of hemi-ball-stem 140A, 140B, respectively. The projections 260a, 260b do not contact bottom of recesses 306a, 306b, respectively.

User can operate faucet 100 by manipulating levers 112A, 112B. Each lever 112A or 112B can be independently turned angularly upwards or downwards along a vertical arc, about the first axis. The levers 112A, 112B move along slots 224a, 224b in dome 108 (not shown in FIG. 26, see FIG. 9 instead) and in this manner dome facilitates movement of levers about the first axis. The hemi-ball-stems act as coupling mechanism which connects with levers and engages the movable-plates. As lever 112A is turned angularly upwards along a vertical arc about the first axis, lever 112A activates hemi-ball-stem 140A to pivot around pin 144, and projection 260a pushes appendage 304a which slides movable-plate 164A rectilinearly over fixed-plate 168. In this way, coupling mechanism conveys the movement of lever about first axis to corresponding movable plate as rectilinear movement. The movable-plate 164A moves rectilinearly over fixed-plate 168 to have chamber 312a unseal more area of inlet apertures 324b, 326b, and thereby chamber 312a receives more water from said inlet apertures, thus more mixed water flows to outlet aperture 322b and via internal outlet passageway 184 to outlet aperture 322a and eventually to spout 116 out of faucet assembly 100, more mixed water flows out of outlet aperture 322a. In this manner, upward angular movement of lever along first axis results in increasing flow rate of water. The aperture 324b carries 50% of hot water inflow and aperture 326b carries 50% of cold water inflow. When lever 112A is at highest upward angular position, referenced here at maximum-flow position, chamber 312a unseals 50% of aperture 324b and unseals 50% of aperture 326b. Thus, chamber 312a receives 25% of hot water inflow from aperture 324b and 25% of cold water inflow from aperture 326b. Reference schematic in FIG. 28c for this position. In this way, operating one lever, the mixed water flowing out of aperture 322a is 25% hot water inflow+25% cold water inflow. Referencing the comparison mentioned earlier, the mixed water outflow of conventional single-lever mixing faucet in maximum-flow position is 50% hot water inflow+50% cold water inflow. Herein lies the significance of present invention, that the user can reduce 50% water usage by operating any one lever in habitual preferred manner of single swift motion of hand.

When lever 112A is turned angularly downwards along a vertical arc about the first axis, the coupling mechanism conveys rectilinear movement to movable-plate 164A in such a way that chamber 312a unseals lesser area of inlet apertures 324b, 326b which reduces the flow of mixed water to outlet aperture 322b. When lever 112A is at lowest downward angular position, referenced here as no-flow position, the position of movable-plate 164A is such that inlet apertures 324b and 326b are sealed and water does not flow to outflow aperture 322b. Reference schematic in FIG. 28a.

Similarly, again referring to FIG. 26, as lever 112B is turned angularly upwards or downwards along vertical arc about the first axis, lever 112B activates hemi-ball-stem 140B to pivot around pin 144, and projection 260b pushes appendage 304b which slides movable-plate 164B rectilinearly over fixed-plate 168. In this manner, coupling mechanism conveys the movement of lever about first axis to corresponding movable plate as rectilinear movement. The movable-plate 164B moves rectilinearly over fixed-plate 168 to have chamber 312b unseal more area of inlet apertures 324c, 326c, thereby chamber 312b receives more water which to outlet aperture 322c and via internal outlet passageway 184 to outlet aperture 322a. When lever 112B is at maximum upward angular position, referenced here as maximum-flow position, chamber 312b unseals 50% of aperture 324c and 50% of aperture 326c. Thus, chamber 312b receives 25% of hot water inflow from inlet aperture 324c and 25% of cold water inflow from inlet aperture 326c, which flows from outflow aperture 322c to the outflow aperture 322a. Reference schematic in FIG. 28d for this position.

When lever 112B is turned angularly downwards about the first axis, coupling mechanism conveys rectilinear movement to movable-plate 164B in such a way that chamber 312b unseals lesser area of inlet apertures 324c, 326c which reduces the flow of mixed water to outlet aperture 322c. When lever 112B is at lowest downward angular position, referenced here as no-flow position, the position of movable-plate 164B is such that inlet apertures 324c and 326c are sealed and water does not flow to outflow aperture 322c. Reference schematic in FIG. 28a.

When both levers 112A and 112B are turned upwards about first axis to maximum-flow position, sequentially or simultaneously, the coupling mechanism conveys rectilinear movement to movable-plates 164A, 164B respectively. Chamber 312a unseals 50% of aperture 324b and 50% of aperture 326b, and chamber 312b unseals 50% of aperture 324c and 50% of aperture 326c. Mixed water flowing out of outlet aperture 322b is 25% hot water inflow+25% cold water inflow, and mixed water flowing out of outlet aperture 322c is 25% hot water inflow+25% cold water inflow, which then converges in internal outlet passageway 184 to flow out of outlet aperture 322a as 50% hot water inflow+50% cold water inflow. Reference schematic in FIG. 28b. Again referencing the comparison mentioned earlier, the mixed water outflow in conventional single-lever mixing faucet at maximum-flow position is 50% hot water inflow+50% cold water inflow. In this manner, user can choose to have more water when needed by using both levers operated with habitual preferred manner.

We thus note that each lever can be operated about the first axis independently or both levers can be operated simultaneously or both levers can be operated sequentially to control flow rate of water.

The positions of hemi-ball-stem 140A when stem 256a touches conical opening 234 of housing 172 limit the rectilinear motion of movable-plate 164A. The positions of hemi-ball-stem 140B when stem 256a touches conical opening 234 of housing 172 limit the rectilinear motion of movable-plate 164B. As hemi-ball-stems 140A, 140B rotate around pin 144, about the first axis, separator-disc 148 is prevented from getting frictionally drawn into rotation around pin 144 by combination of two notches 274a, 274b in separator-disc 148 and two grooves (not shown) in housing 172. Further, as hemi-ball-stems 140A, 140B rotate around pin 144, pin 144 itself is prevented from getting frictionally drawn into rotation by combination of two square blocks 268a, 268b of pin 144 and two slots 238a, 238b in housing 172. This arrangement allows resistance in movement of the hemi-ball-stems and holds position of the levers.

Operation of the First Embodiment to Control Temperature of Water

As noted earlier, levers 112A, 112B pass through slots 224a, 224b of dome 108 to connect with stem portions 256a, 256b of hemi-ball-stems 140A, 140B respectively. Further noted earlier that dome 108 is freely rotatable about the second axis. Levers 112A, 112B can be rotated angularly sideways clockwise or anticlockwise along a horizontal arc, about the second axis to control temperature of mixed water flowing out. This angular movement of levers 112A, 112B about the second axis is constrained by rotatable dome 108 in such a way that when any one lever is rotated about the second axis, dome 108 rotates about second axis and dome 108 constrains the other lever to rotate about the second axis in same direction. Note that several members of faucet 100 rotate together about the second axis by same angular distance to form a rotating group. This rotating group comprises levers 112A, 112B, dome 108, hemi-ball-stems 140A, 140B, separator-disc 148, pin 144, guide-plate 160 and two movable-plates 164A, 164B. The separator-disc 148 rotates about the second axis with its notches 274a, 274b moving along the grooves (not shown) in housing 172. The pin 144 rotates about second axis with its square blocks 268a, 268b moving along the arc of slots 238a, 238b in housing 172. Both levers 112A, 112B can be turned together simultaneously about the second axis in any direction. The coupling mechanism of hemi-ball-stems 140A, 140B conveys such movement of levers 112A, 112B about second axis to guide-plate 160 and to movable-plates 164A, 164B as rotational movement about second axis.

For example, consider the situation wherein lever 112A is at maximum-flow position and lever 112B is in no-flow position. Reference schematic in FIG. 28c where cavity 312a unseals 50% hot inlet aperture 324b and 50% cold inlet aperture 326b, mixed water flowing out of faucet 100 is 25% of hot inflow and 25% of cold inflow. The inlet apertures 324c, 326c are sealed by lip 314b. When lever 112A is rotated angularly sideways clockwise about second axis, all members of the rotating group rotate clockwise together by same angular distance. Reference schematic in FIG. 28f, as movable-plate 164A rotates clockwise, chamber 312a unseals more area of hot water inlet aperture 324b and less area of cold water inlet aperture 326b, and mixing chamber 312a receives more hot water than cold water, which raises the temperature of mixed water flowing out of outlet aperture 322b. Even as movable plate 164B rotates clockwise, inlet apertures 324c, 326c remain sealed. In the maximum clockwise position, depicted in FIG. 28f, chamber 312a completely unseals hot water inlet aperture 324b, and lip 314a completely seals cold water inlet aperture 326b. The mixing chamber 312a receives 50% of hot water inflow from inlet aperture 324b, that flows out of aperture 322b. In this manner, by turning the levers about second axis, user can control temperature of water flowing out. Further, constrained movement of levers about the second axis is independent of their positions along first axis. This means as both the levers move about the second axis, their respective positions about first axis are retained. Thus, turning the levers about the second axis only changes the temperature of water flowing out and does not change the amount of water flowing. Such a constrained motion makes it is easier for user to judge the angle of horizontal turning needed for desired temperature and thus helps in controlling the temperature of water. The sideways angular movement of the levers 112A, 112B is limited by the arc length of the slots 238a, 238b in housing 172.

FIGS. 28a to 28j show schematic of some positions of movable-plates 164A, 164B relative to fixed-plate 168. Positions of movable-plates 164A, 164B are based on operation of levers 112A, 112B respectively, as described above. Each of these positions is independent and assumes starting from a no-water-outflow position (FIG. 28a). The aperture 324b and aperture 324c carry hot water inflow; aperture 326b and aperture 326c carry cold water inflow.

FIG. 28a—The levers 112A, 112B are in no-flow position. The apertures 324b, 326b, 324c, 326c are sealed by lips 314a and 314b of movable-plates 164A, 164B respectively. There is no water outflow.

Figure 28B:
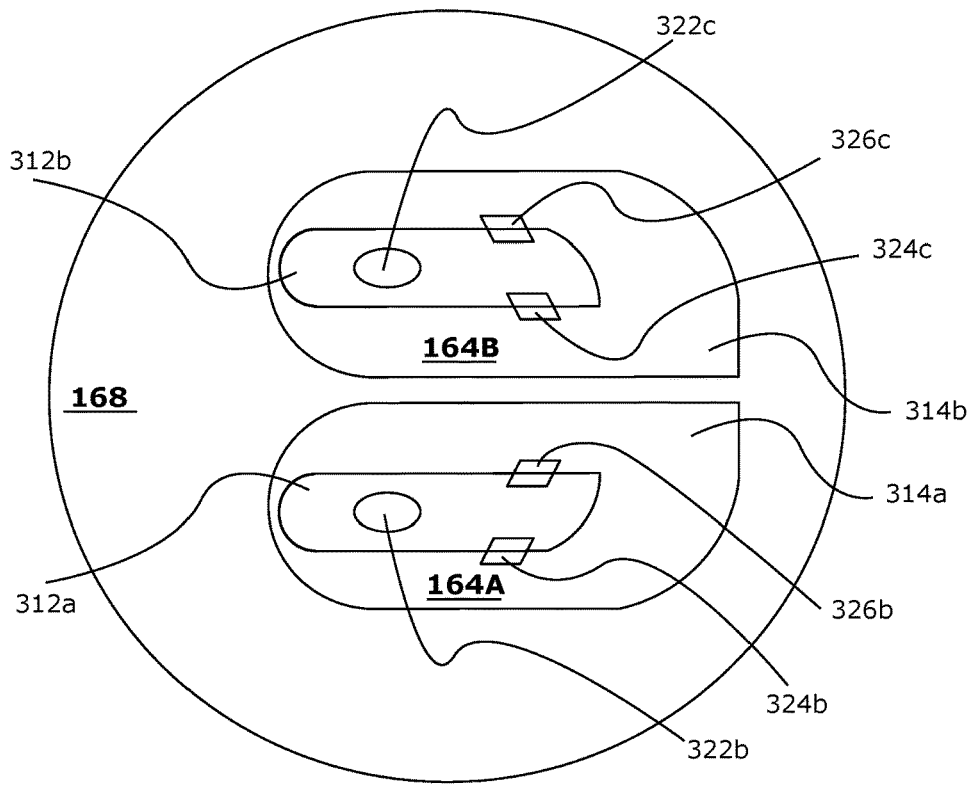

FIG. 28b—The lever 112A and lever 112B raised to maximum-flow position. The movable-plate 164A to unseal 50% of aperture 324b, 50% of aperture 326b. The movable-plate 164B to unseal 50% of aperture 324c, 50% of aperture 326c. The water outflow is mixture of 50% of hot inflow and 50% of cold inflow.

Figure 28C:
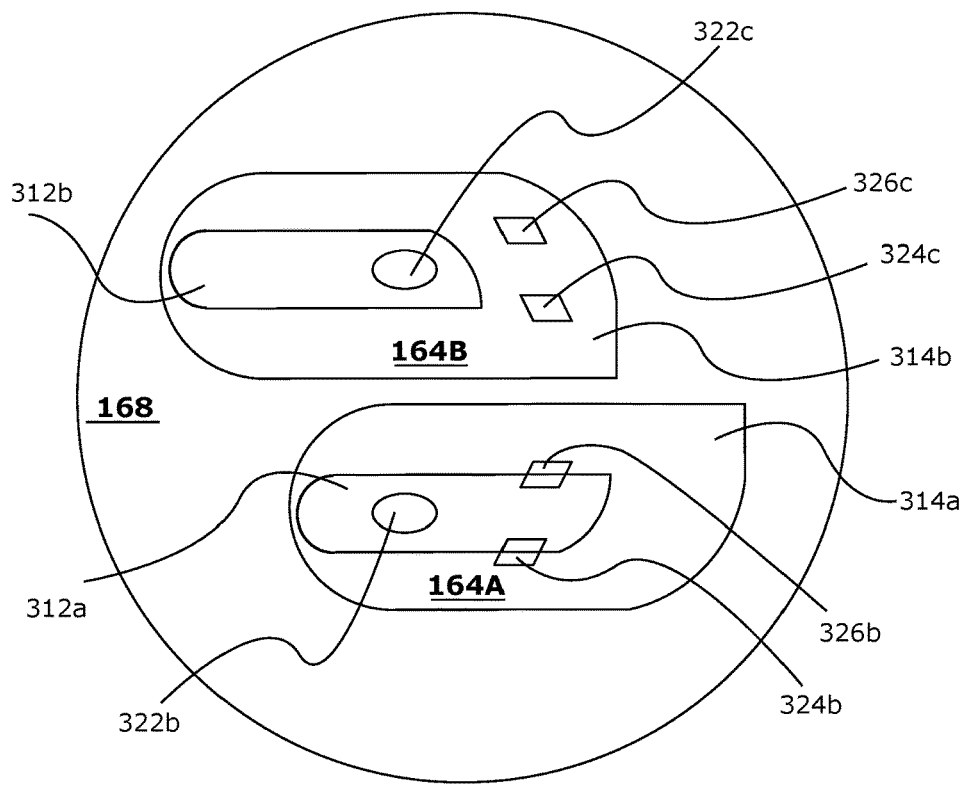

FIG. 28c—The lever 112A is raised to maximum-flow position. The movable-plate 164A unseals 50% of aperture 324b and unseals 50% of aperture 326b. The lever 112B is in no-flow position and movable-plate 164B seals aperture 324c completely and seals aperture 326c completely. The water outflow is mixture of 25% of hot inflow and 25% of cold inflow.

Figure 28D:
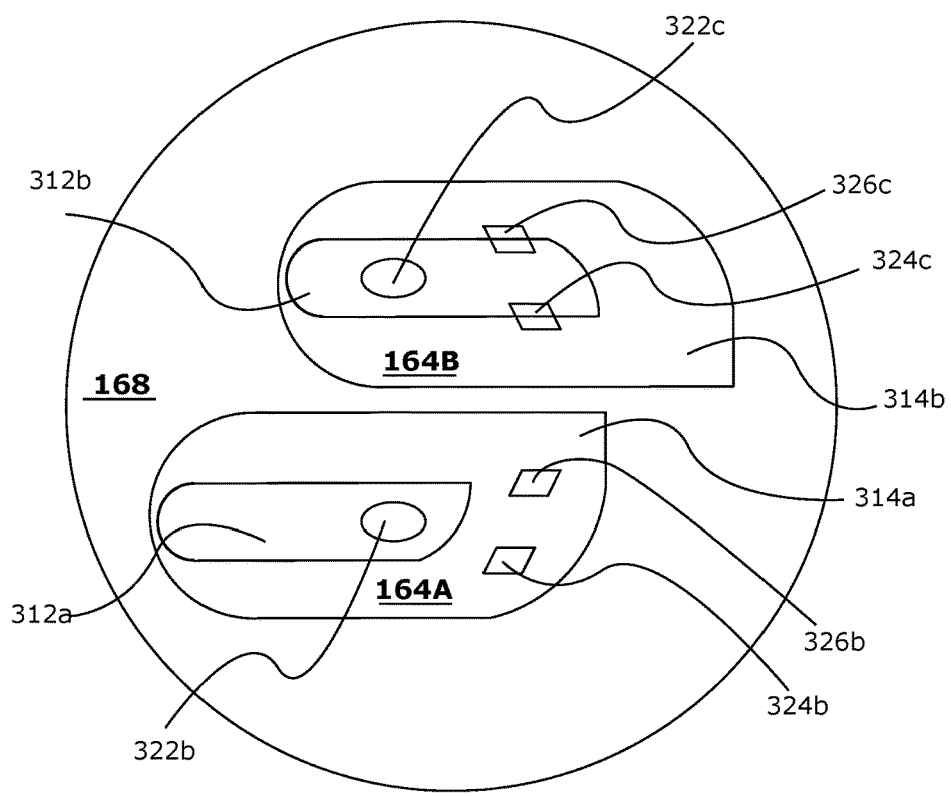

FIG. 28d—The lever 112B is raised to maximum-flow position. The movable-plate 164B unseals 50% of aperture 324c and unseals 50% of aperture 326c. The lever 112A is in no-flow position and movable-plate 164A seals aperture 324b completely and seals aperture 326b completely. The water outflow is mixture of 25% of hot inflow and 25% of cold inflow.

Figure 28E:
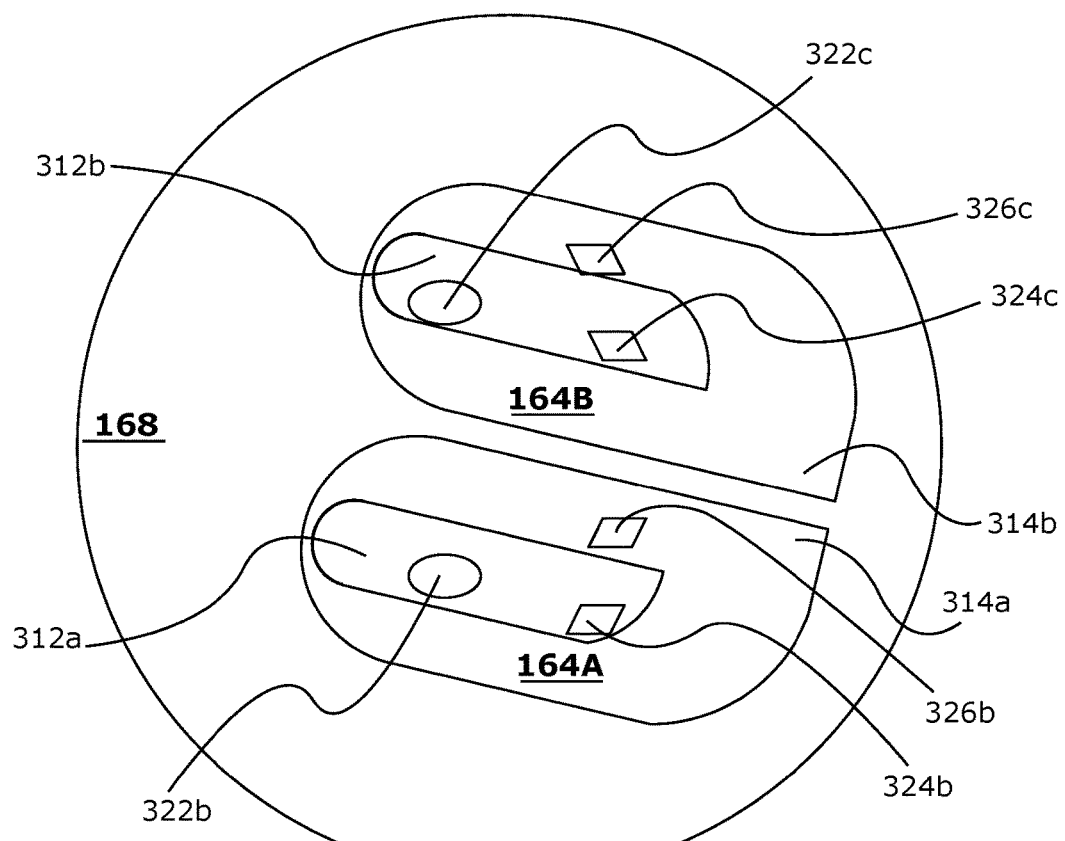

FIG. 28e—The lever 112A and lever 112B are raised to maximum-flow position and also turned angularly clockwise. The movable-plate 164A unseals aperture 324b completely and seals aperture 326b completely. The movable-plate 164B unseals aperture 324c completely and seals aperture 326c completely. The water outflow is 100% of hot inflow.

Figure 28F:
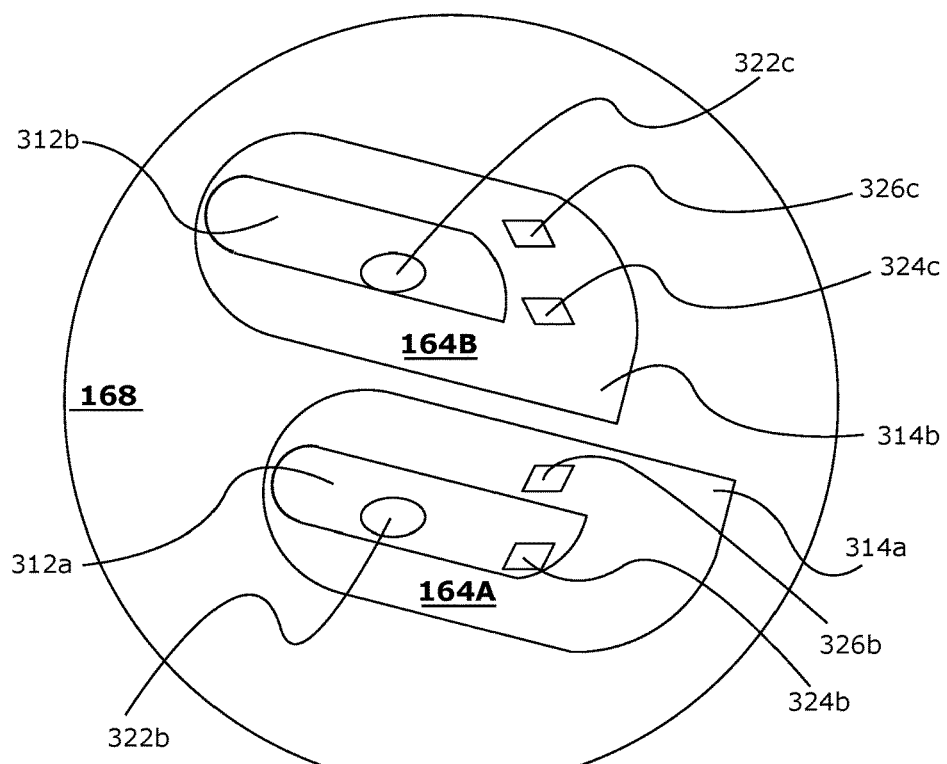

FIG. 28f—The lever 112A is raised to maximum-flow position and also turned clockwise. The movable-plate 164A unseals aperture 324b completely and seals aperture 326b completely. The lever 112B is in no-flow position and turns clockwise. The movable-plate 164B seals aperture 324c completely and seals aperture 326c completely. The water outflow is 50% of hot inflow.

Figure 28G:
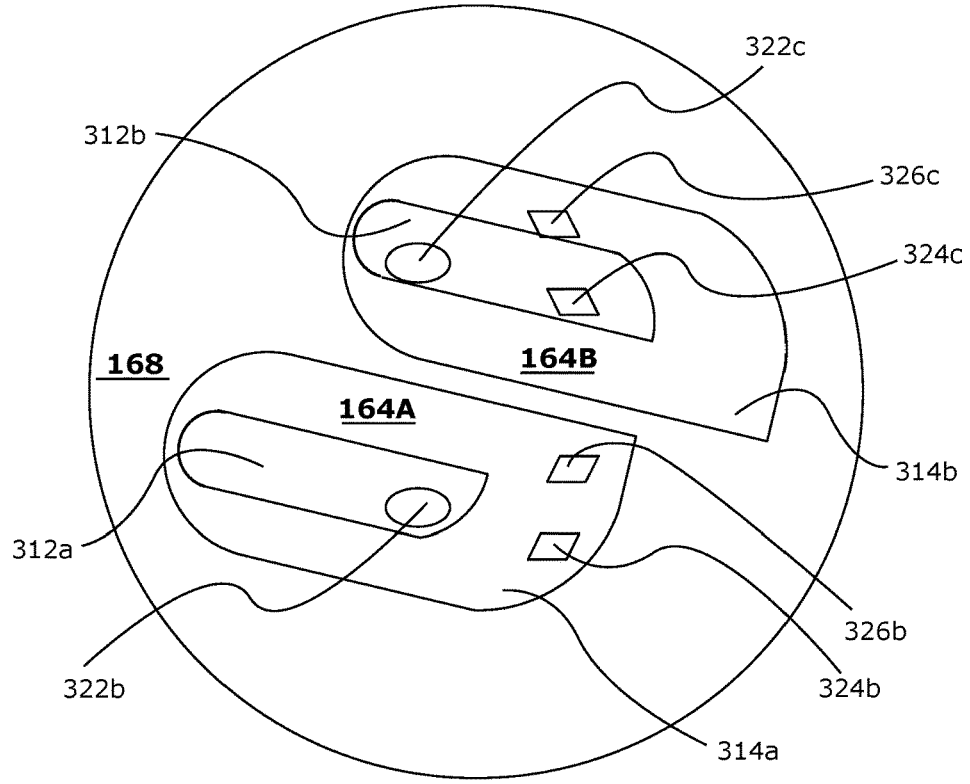

FIG. 28g—The lever 112B is raised to maximum-flow position and also turned angularly clockwise. The movable-plate 164B unseals aperture 324c completely and seals aperture 326c completely. The lever 112A is in no-flow position and turns clockwise. The movable-plate 164A seals aperture 324b completely and seals aperture 326b completely. The water outflow is 50% of hot inflow.

Figure 28H:
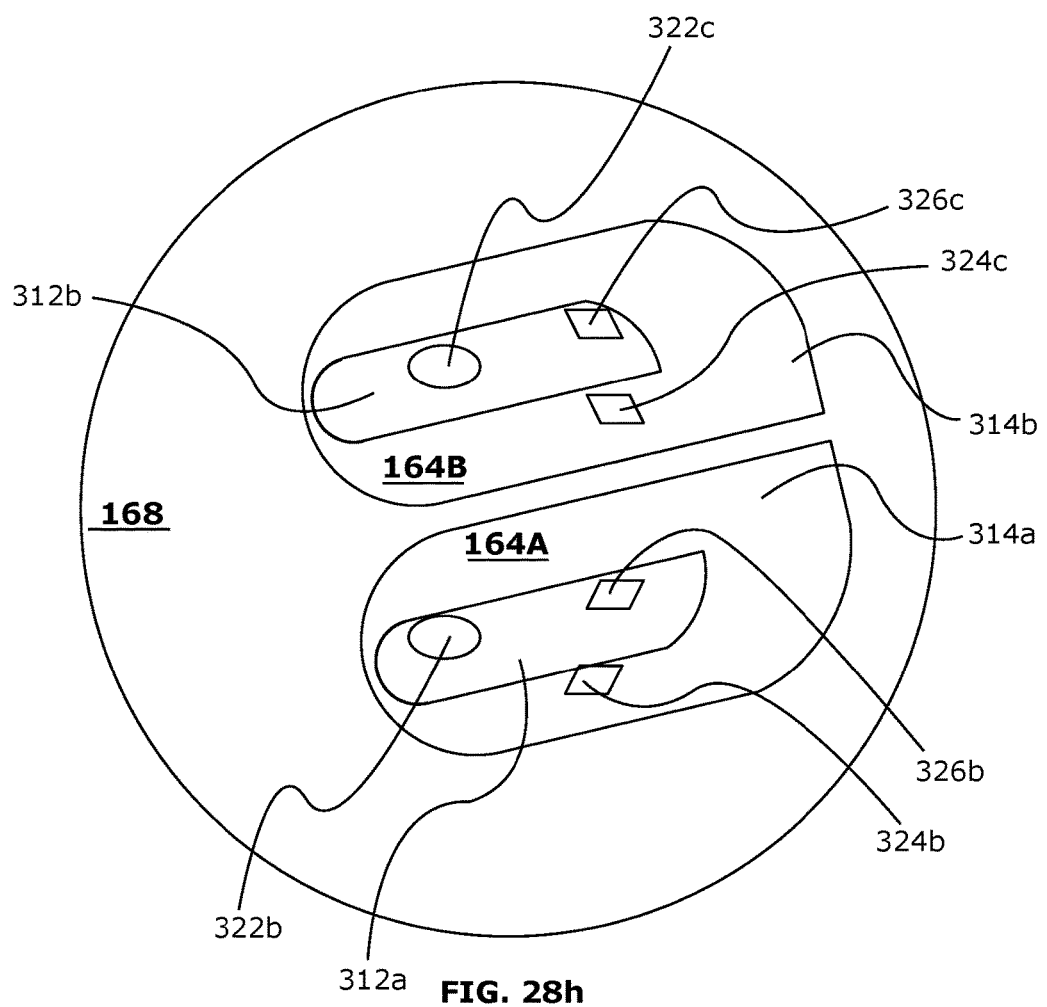

FIG. 28h—The lever 112A and lever 112B are raised to maximum-flow position and also turned angularly anti-clockwise. The movable-plate 164A unseals aperture 326b completely and seals aperture 324b completely. The movable-plate 164B unseals aperture 326c completely and seals aperture 324c completely. The water outflow is 50% of cold inflow.

Figure 28I:
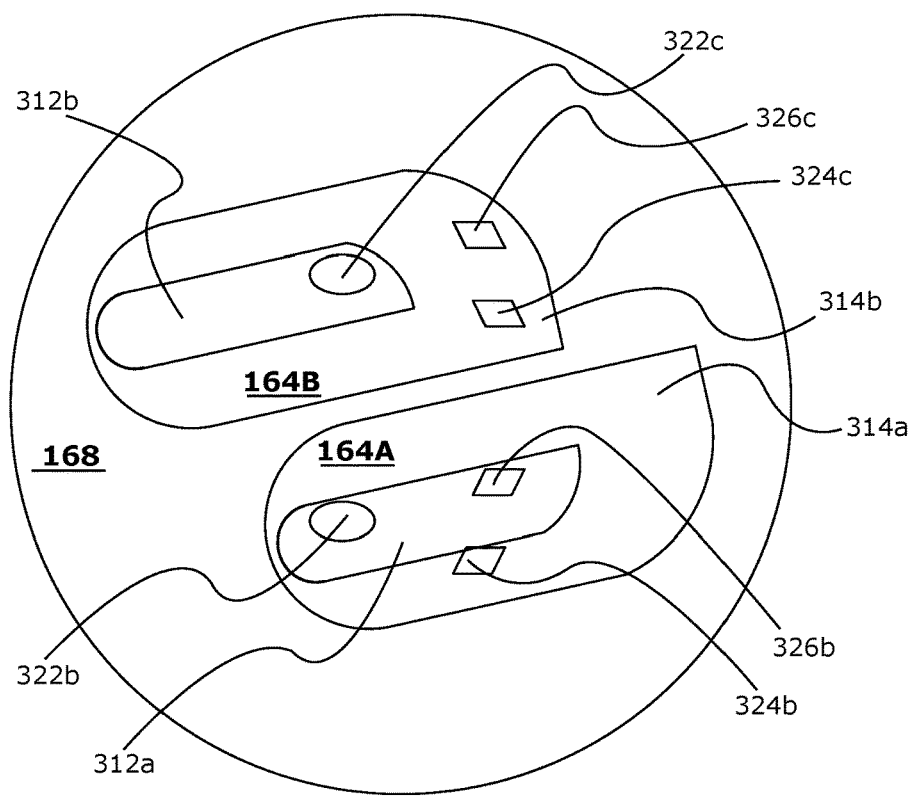

FIG. 28i—The lever 112A is raised to maximum-flow position and also turned anti-clockwise. The movable-plate 164A unseals aperture 326b completely and seal aperture 324b completely. The lever 112B is in no-flow position and turns anti-clockwise. The movable-plate 164B seals aperture 324c completely and seals aperture 326c completely. The water outflow is 50% of cold inflow.

Figure 28J:
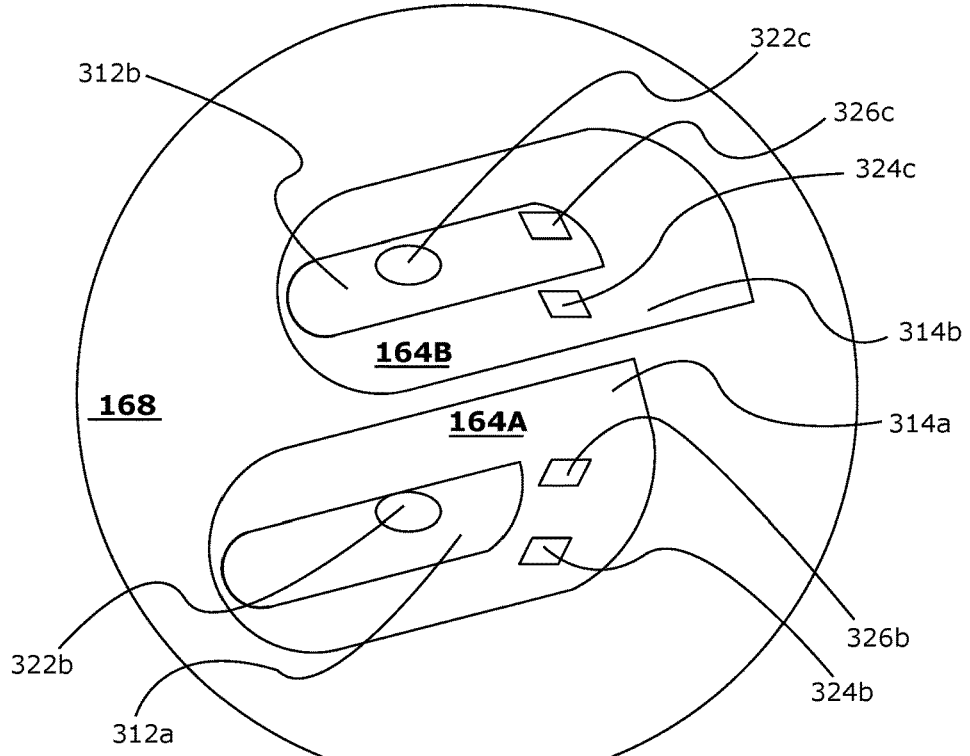

FIG. 28j—The lever 112B is raised to maximum-flow position and also turned anti-clockwise. The movable-plate 164B unseals aperture 326c completely and seals aperture 324c completely. The lever 112A is in no-flow position and turns anti-clockwise. The movable-plate 164A seals aperture 324b completely and seals aperture 326b completely. The water outflow is 50% of cold inflow.

While the above-mentioned positions are important in regular usage, especially from water-saving perspective, these positions are by no means the only positions available to the user. User can choose to move any lever to any position between its limits of motion about first axis and about second axis to obtain proportionate flow and temperature results.

The first embodiment of present invention allows user to save water by making it convenient to reduce water usage by 50% while operating the faucet in preferred habitual manner of using single swift motion of hand. It will be appreciated that notwithstanding the exemplary embodiment described herein, two hemi-ball-stems 140A, 140B can be respectively connected to two movable-plates 164A, 164B in any suitable manner that allows hemi-ball-stems 140A, 140B to impart rectilinear movement and rotational movement to movable-plates 164A, 164B.

Second Preferred Embodiment—Mixing-Type

Figure 29:
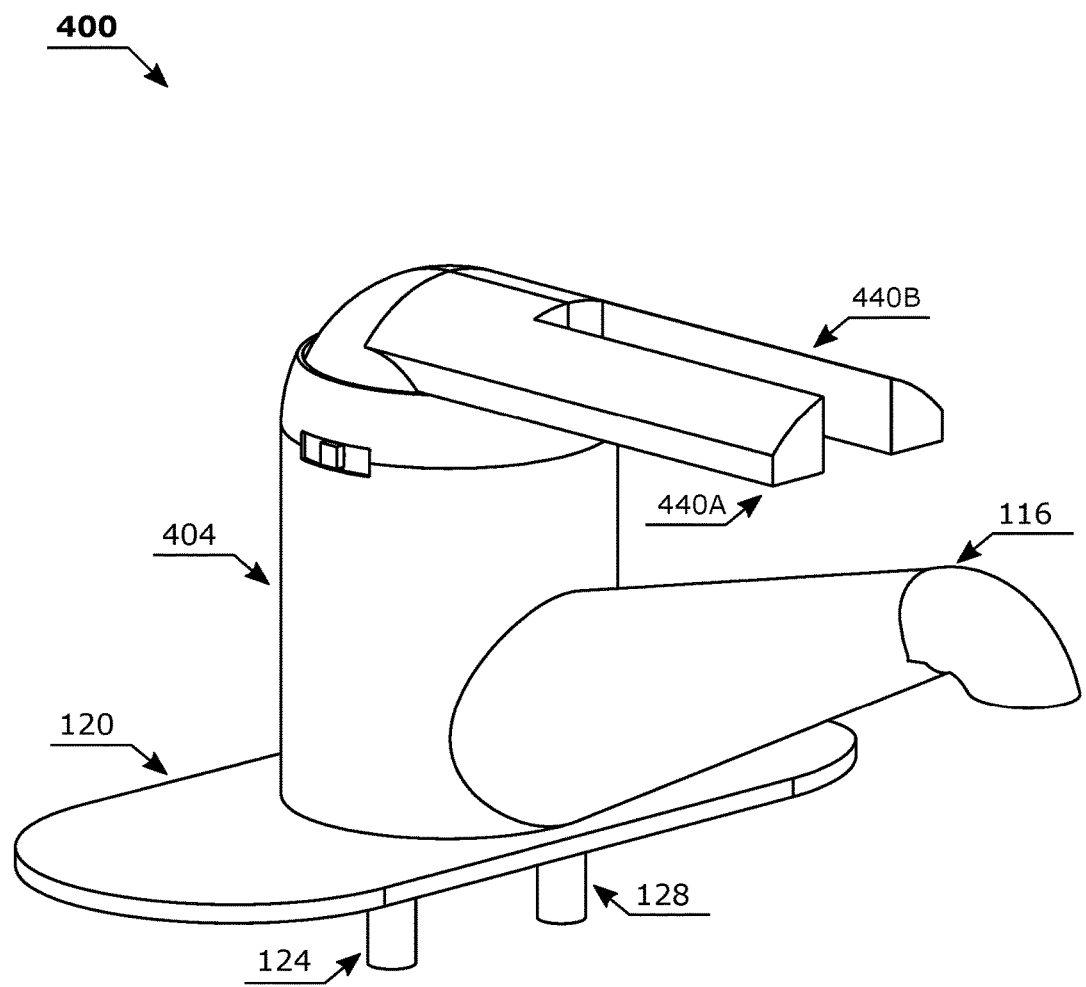

FIG. 29 shows exterior view of faucet assembly 400 for mixing two fluids, usually hot and cold water, as second preferred embodiment of present invention with same objective to save water by making it convenient for user to reduce water usage while retaining the habitual preference of operating in single swift motion of hand. The second embodiment thus bears similar operating characteristics as the first embodiment. Many members of second embodiment are identical to those of the first embodiment in form, arrangement and function, and thus will be referenced in foregoing section and thereby associated drawing and description for brevity.

Figure 30:
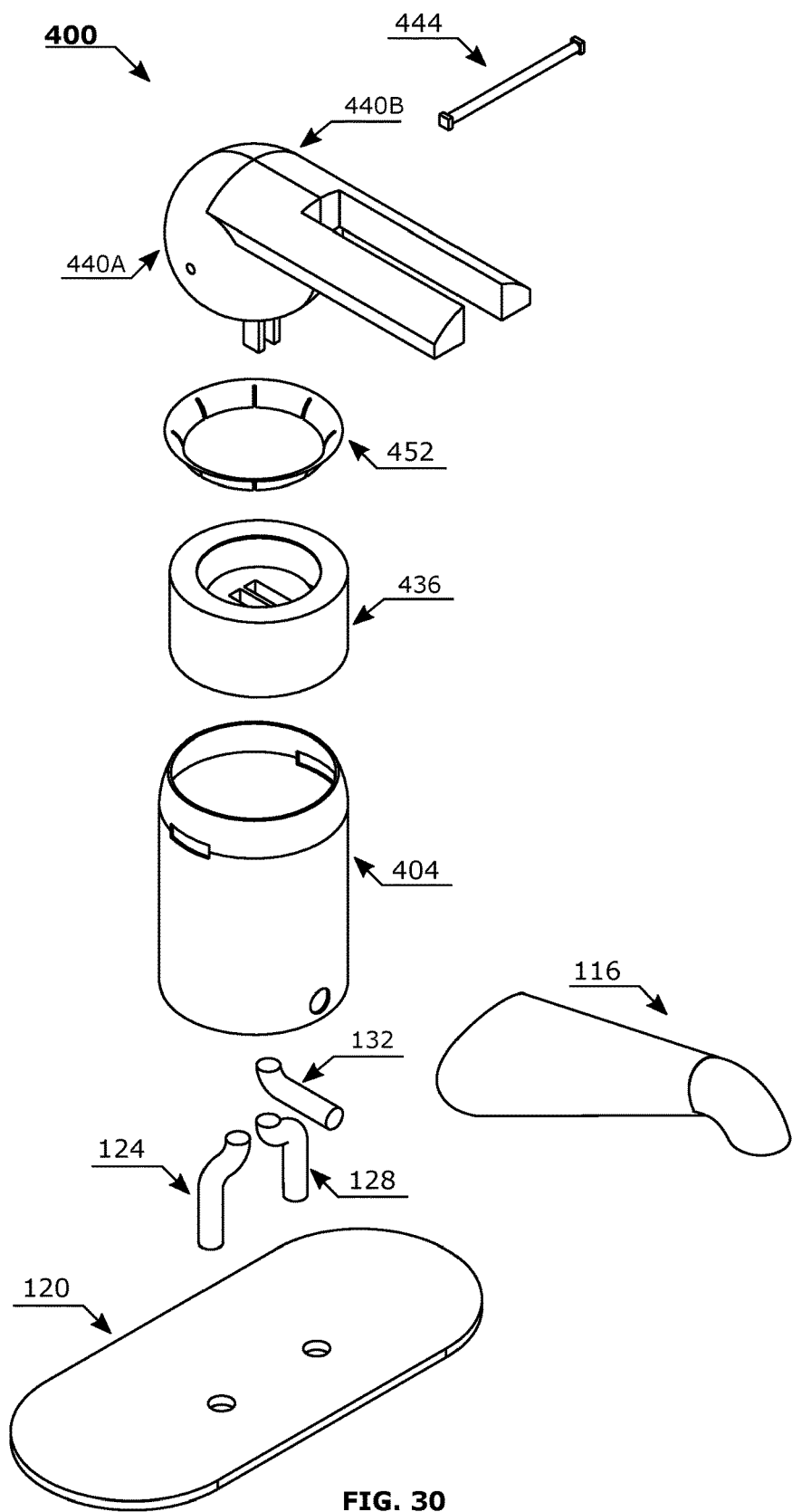

FIG. 30 shows exploded perspective view of faucet assembly 400 in general order of arrangement. As seen in FIG. 30, Dual-Lever Water-Saving faucet 400 has several components, including base-plate 120, inlet pipes 124, 128, outlet pipe 132, spout 116, a pin 444, a spring 452, a cartridge 436 and a body comprising casing 404, a two hemi-ball-levers 440A and 440B.

Similar to the first embodiment, inlet pipes 124, 128 receive fluids from external plumbing sources, usually cold and hot water and are connected to inlet holes at base of cartridge 436; outlet pipe 132 is connected at one end to outlet hole at base of cartridge 436 and at other end to spout 116; base-plate 120 provides foundational support.

Figure 31:
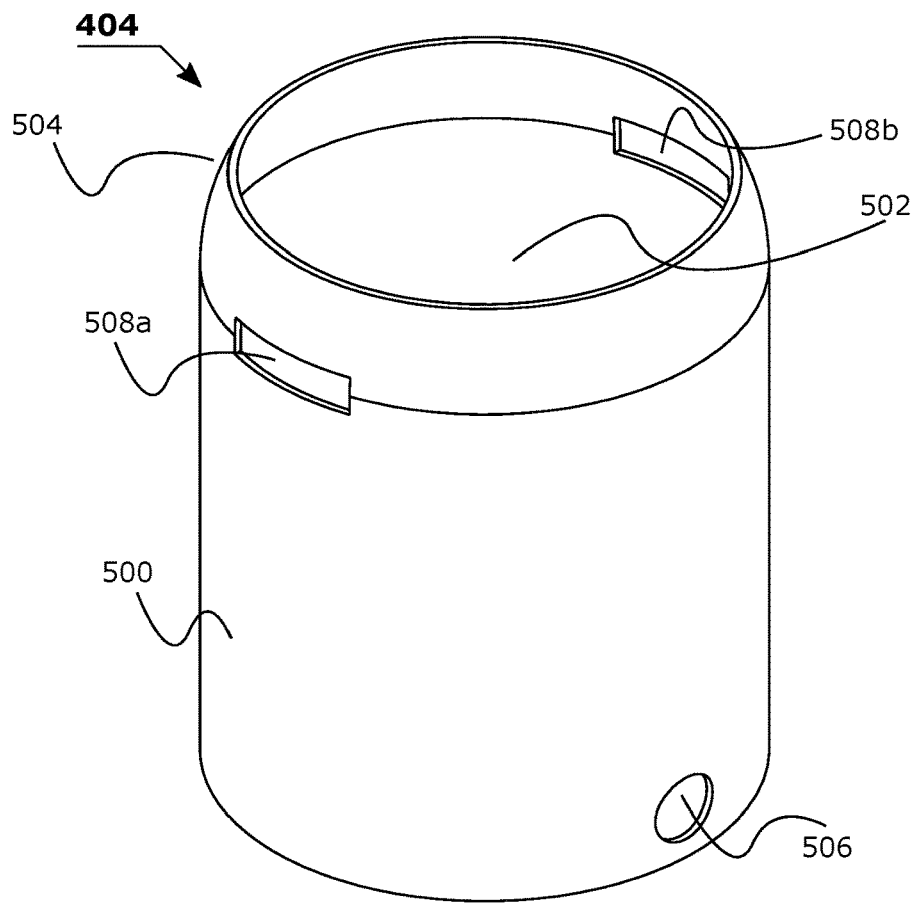

FIG. 31, shows perspective view of casing 404, as depicted here, is hollow, generally cylindrical in shape and houses various components of faucet assembly 400. The casing 404 has a portion 504 at upper side which has shape of hollow spherical section, narrowing toward the top. Two rectangular slots 508a, 508b of equal arc lengths near the top of casing 404 are positioned diametrically opposite. The casing 404 has an orifice 506 in bottom portion. The spout 116 is connected to casing 404 at orifice 506, where outlet pipe 132, orifice 506 and internal passageway of spout 116 are substantially aligned.

Figure 32:
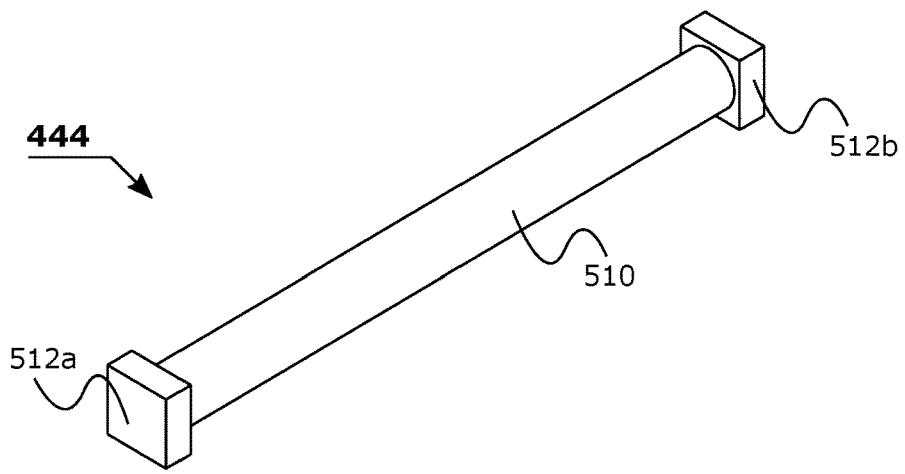

FIG. 32 shows perspective view of pin 444. The pin 444 has a cylindrical shaft portion 510, with square block portions 512a, 512b at its two ends. The pin 444 is sized to fit in casing 404 with square block portions 512a, 512b fitting in slots 508a, 508b respectively.

Figure 33A:
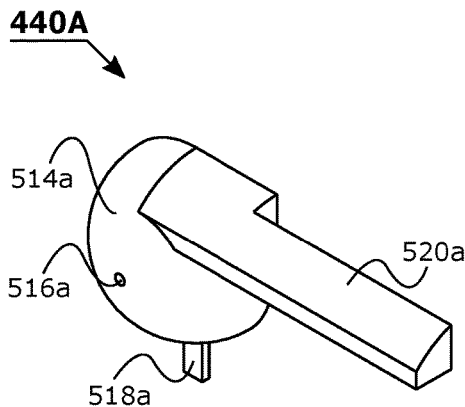
Figure 33B:
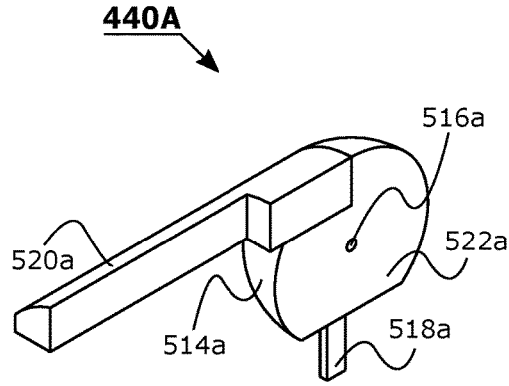
Figure 34A:
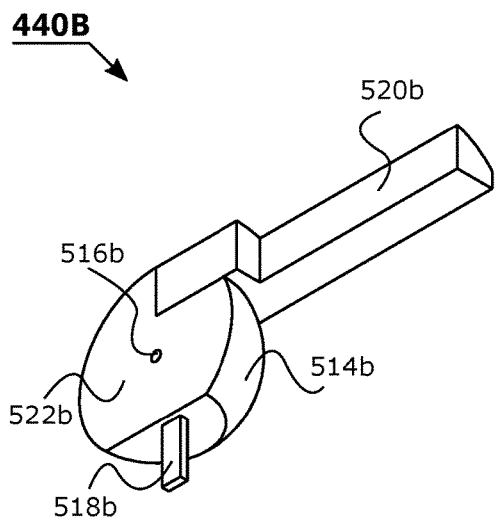
Figure 34B:
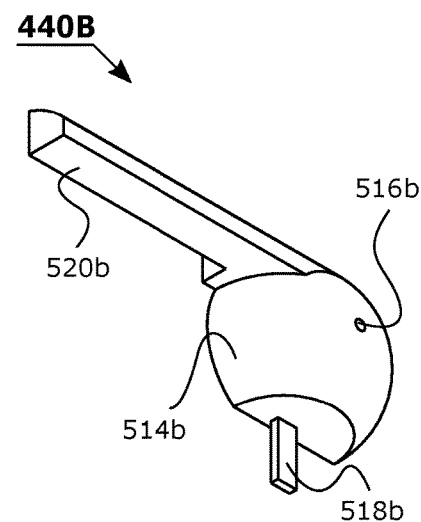

Moving on to FIGS. 33a, 33b showing two perspective views of hemi-ball-lever 440A, and FIGS. 34a, 34b show two perspective views of hemi-ball-lever 440B. The hemi-ball-lever 440A is mirror symmetry of hemi-ball-lever 440B. The hemi-ball-lever 440A comprises a hemispherical portion 514a, with a flat face 522a, and an elongated projection 518a. The hemispherical portion 514a is connected to lever 520a. The hemi-ball-lever 440B comprises a hemispherical portion 514b, with a flat face 522b, and an elongated projection 518b. The hemispherical portion 514b is connected to lever 520b. The hemispherical portions 514a, 514b have central holes 516a, 516b, respectively. The levers 520a, 520b have been can be integral part of hemi-ball-levers 440A, 440B respectively, or can be separate parts securely connected to respective hemispherical portions by various fastening means widely available in the art.

Figure 35:
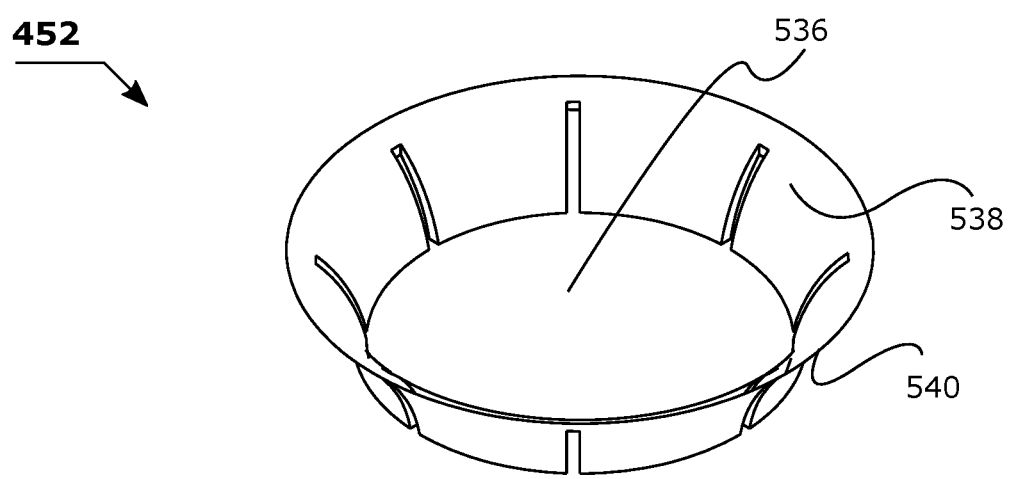

The spring 452, as seen in FIG. 35, is annular in shape with central opening 536 and multiple curved elastic flanges 538 along its annular periphery 540. The flanges 538 curve inward toward central opening 536. The spring 452 is securely fixed and supported inside casing 404 by elements (not shown) such as notch, ledge, etc.

The two hemi-ball-levers 440A, 440B are set adjacent with face 522a touching face 522b, and levers 520a, 520b aligned in same direction. The hemi-ball-levers 440A, 440B are arranged in casing 404 to have hemispherical portions 514a, 514b in contact with top portion 504. The shape of top portion 504 substantially matches the shape of hemispherical portions 514a, 514b and top portion 504 secures hemi-ball-levers 440A, 440B in place. The pin 444 is passed through holes 516a, 516b and square block portions 512A, 512B are in slots 508a, 508b of casing 404. The shaft 510 of pin 444 snugly fits holes 516a, 516b of hemispherical portions 514a, 514b. Each hemi-ball-lever 440A, 440B is independently able to rotate about pin 444 along an axis referenced in second embodiment as first axis. Further, both hemi-ball-levers 440A, 440B together along with pin 444 are able to rotate about a central vertical axis referenced in second embodiment as second axis. The motion about first axis is limited by burrs (not shown) on hemispherical portions 514a, 514b. The motion about the second axis is limited by length of arc of slots 508a, 508b.

The projections 518a, 518b and hemispherical portions 514a, 514b of two hemi-ball-levers 440A, 440B respectively extend through central opening 536 of spring 452. The spring 452 presses two hemi-ball-levers 440A, 440B against top portion 504 and keeps the members in a tight fit. This arrangement of hemi-ball-levers 440A, 440B, pin 444 in casing 404 is partially visible in FIG. 29.

Figures 36A, 36B:
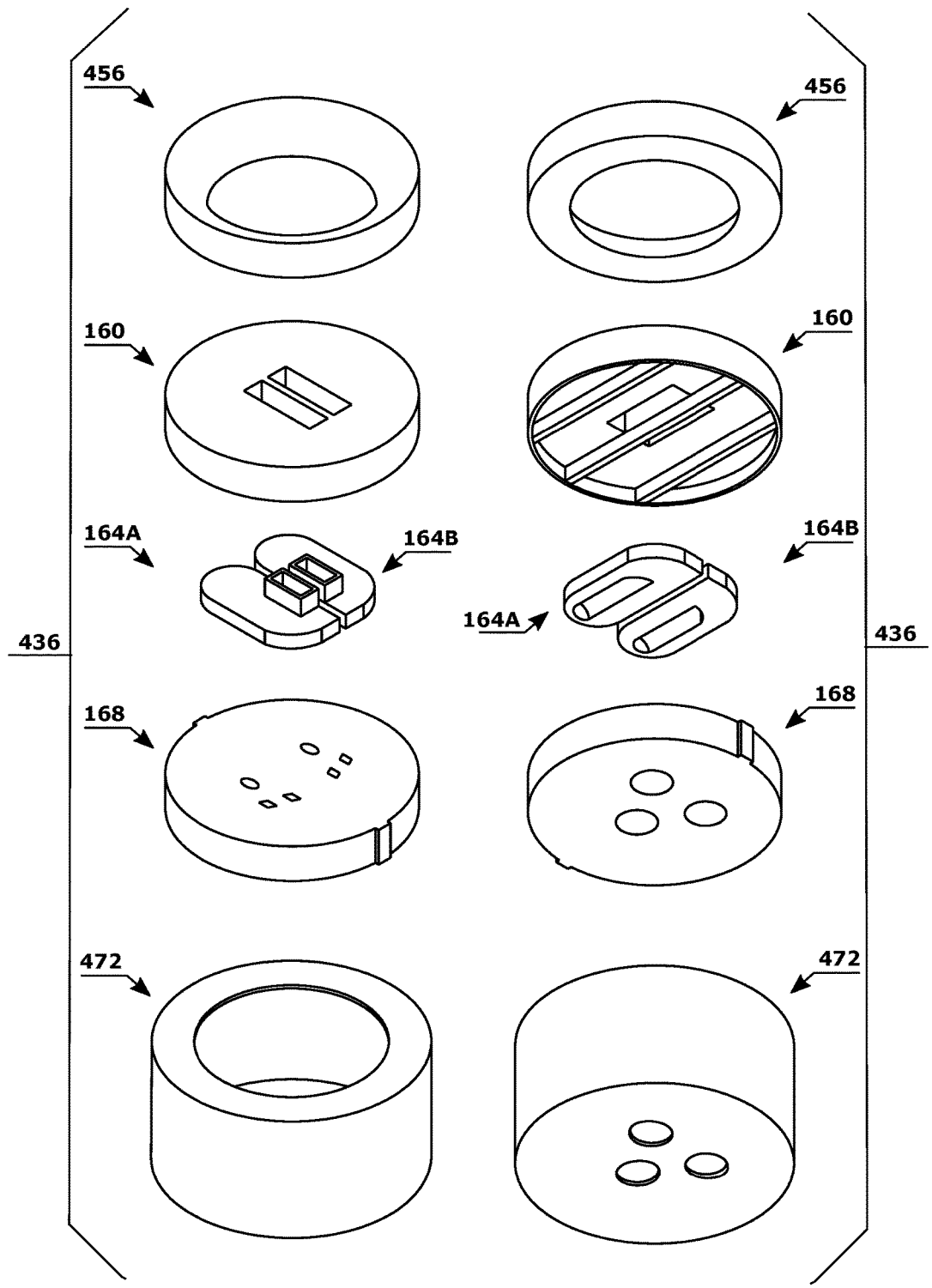

FIGS. 36a, 36b show two exploded perspective views of cartridge 436, depicting various members in general order of arrangement, including a bushing 456, guide-plate 160, movable-plates 164A, 164B, fixed-plate 168 and a housing 472.

Figure 37A:
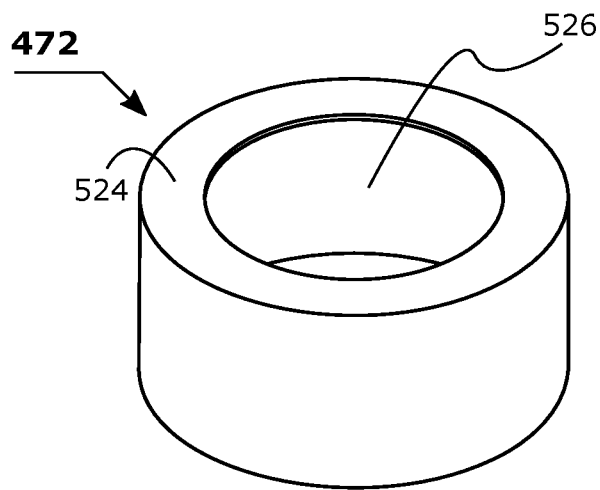
Figure 37B:
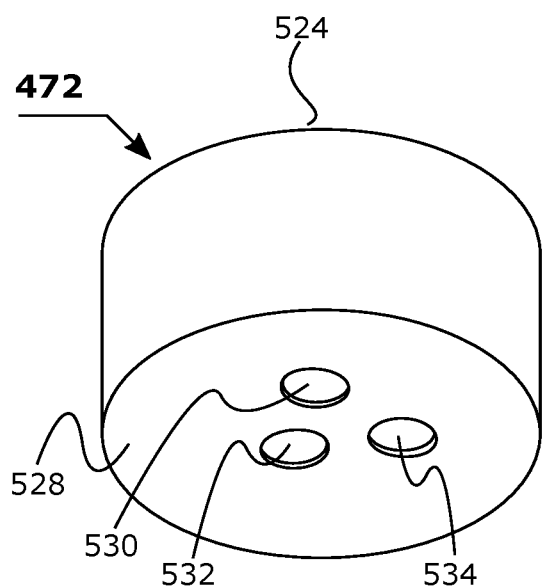

FIGS. 37a, 37b show two perspective views of housing 472. The housing 472 is hollow cylindrical in shape with an opening 526 at top end 524 and three holes 530, 532, 524 in bottom end 528. The housing 472 is securely fixed and supported inside the casing 404 by elements (not shown) such as notch, ledge etc.

Reference FIGS. 24a, 24b and related details of fixed-plate 168 of first embodiment. The fixed-plate 168 is positioned inside housing 472 to have apertures 324a, 326a, 322a align with three holes 530, 534, 532 in housing 472, respectively. The notches 320a, 320b of fixed-plate 168 have mating feature (not shown) inside housing 472 to prevent movement of fixed-plate 168.

Reference FIGS. 21a, 21b, 21c, 22 and related details of two movable-plates 164A, 164B of first embodiment.

Reference FIGS. 20a, 20b and related details of guide-plate 160 of first embodiment.

The arrangement of movable plates 164A, 164B and guide-plate 160 on fixed-plate 168 is identical to that in the first embodiment. In brief, movable-plates 164A, 164B are positioned in two channels formed by flanges 298a, 300, 298b of guide-plate 160 such that appendages 304a, 304b extend into slots 294a, 294b of guide-plate 160, respectively. The movable-plates 164A, 164B and guide-plate 160 are positioned on side 316 of fixed-plate 168. The movable-plates 164A, 164B and guide-plate 160 are able to rotate about second axis.

Figure 38A:
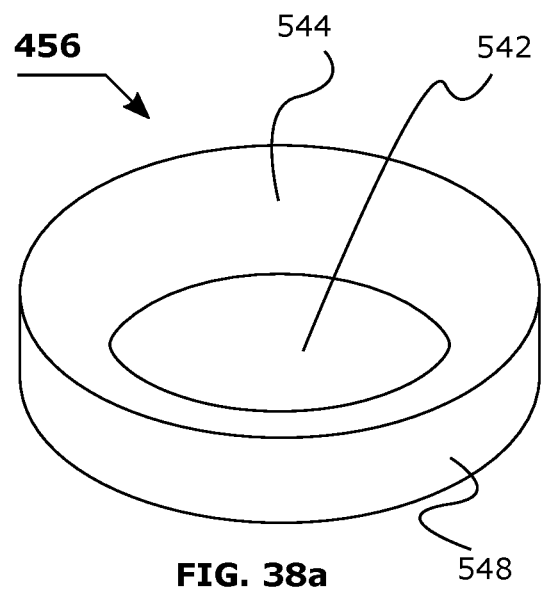
Figure 38B:
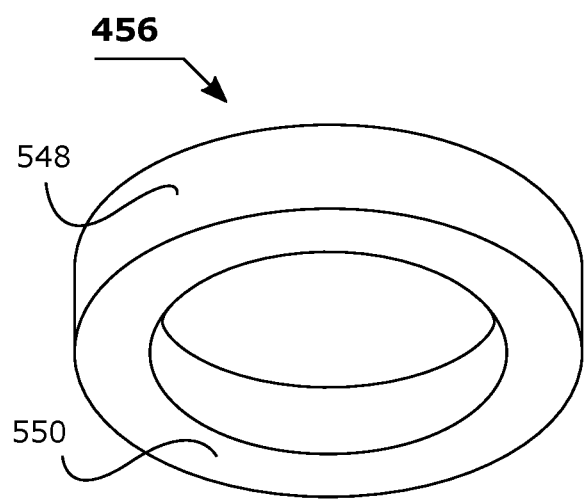

The bushing 456, as seen in FIG. 38a and FIG. 38b, has flat annular lower portion 550 and cylindrical outer periphery 548 with central opening 542. Inside surface portion 544 of bushing has curvature of a toroid-section. The bushing 456 is securely fixed and supported inside housing 472 by elements (not shown) such as notch, ledge, etc. The bushing 456 is concentrically positioned on guide-plate 160. The housing 472 has threads (not shown) to assemble members inside and to keep the bushing 456 pressed so that parts are in water-tight fit.

Figure 39:
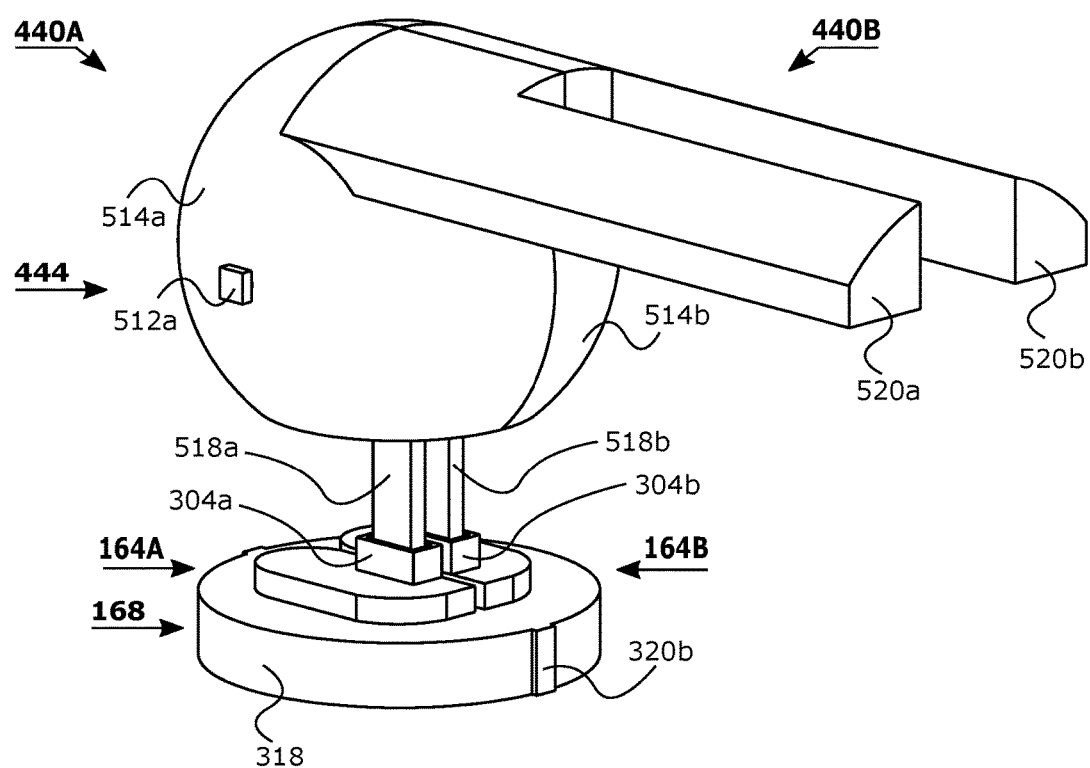

The projections 518a, 518b of hemi-ball-levers 440A, 440B extend into opening 526 of housing 472 of cartridge 436, and extend into central opening 282 of bushing 456. Referring now to FIG. 39, which shows sub-assembly for clarity. Appendages 304a, 304b of movable-plates 164A, 164B form recesses 306a, 306b (not labelled) which receive projections 518a, 518b of hemi-ball-levers 440A,440B, respectively. The projections 518a, 518b do not contact bottom of recess 306a, 306b. The hemi-ball-levers 440A, 440B serve as coupling mechanism, connecting levers 520a, 520b and having projections 518a, 518b engage moving plates 164A, 164B, respectively. Similar to the first embodiment, rectilinear movement of movable-plates 164A, 164B relative to fixed-plate 168 controls the flow rate, and rotational movement of movable-plates 164A, 164B about the second axis relative to fixed-plate 168 controls the ratio mixture, and thus temperature, of water.

Operation of the Second Embodiment to Control Flow Rate of Water

User can operate faucet 400 by manipulating levers 520a, 520b of hemi-ball-levers 440A, 440B. Each lever can be independently turned angularly upwards or downwards about the first axis of motion, to control the flow rate of water. The hemispherical portions 514a, 514b facilitate the movement of levers 520a, 520b about the first axis in such a way that each lever can be operated independently or both levers can be operated simultaneously or both levers can be operated sequentially to control flow rate of water. For example, as lever 520a is turned angularly upwards along a vertical arc about the first axis, hemi-ball-lever 440A pivots around pin 444, projection 518a pushes appendage 304a which slides movable-plate 164A rectilinearly over fixed-plate 168, which controls the flow rate of water. Upward angular movement of levers increases the flow rate, and downward angular movement of levers decreases the flow rate. As in the case of first embodiment, the user can reduce water usage by 50% while operating any one lever in preferred habitual way of single swift motion of hand. Both levers can be operated sequentially or simultaneously to obtain same flow rate as any conventional single-lever mixing faucet.

Operation of the Second Embodiment to Control Temperature of Water

Levers 520a, 520b of hemi-ball-levers 440A, 440B can be rotated angularly sideways, clockwise and anticlockwise, along horizontal arc, about the second axis to control the temperature of water flowing out. This angular movement of levers 520a, 520b about the second axis is constrained by hemispherical portions 514a, 514b in such a way that when any one lever is turned about the second axis, both hemispherical portions turn about the second axis, thus rotating the other lever about second axis. Note that several members of faucet 400 rotate together about the second axis by same angular distance to form a rotating group. This rotating group comprises hemi-ball-levers 440A, 440B, pin 444, guide-plate 160 and two movable-plates 164A, 164B. The pin 444 rotates about second axis with its square blocks 512a, 512b moving along the arc of slots 508a, 508b of casing 404. Both levers can be turned together simultaneously about the second axis in any direction. The coupling mechanism of hemi-ball-levers 440A, 440B conveys such movement of levers to guide-plate 160 and to movable-plates 164A, 164B as rotational movement about second axis, which controls the mixture ratio of water and thus the temperature. Moreover, this constrained motion of levers about the second axis is independent of their positions about the first axis. Thus, turning the levers about second axis only changes the temperature of water flowing out and does not change the amount of water flowing.

Aperture 326a of fixed-plate 168 substantially coincides with hole 534 in the base of housing 472. One end of inlet pipe 128 is attached to hole 534 and other end passes through hole 214 in base-plate 120 and is connected by external plumbing to hot water source.

Aperture 324a of fixed-plate 168 substantially coincides with hole 530 in the base of housing 172. One end of inlet pipe 124 is attached to hole 530 and other end passes through hole 218 in base-plate 120 and is connected by external plumbing to cold water source.

Aperture 322a of fixed-plate 168 substantially coincides with hole 532 in the base of housing 172. One end of outlet pipe 132 is attached to hole 532. The outlet pipe 132 then passes through orifice 506 in casing 404 and its other end is connected to passageway in spout 116 for mixed water to flow out of faucet assembly 400.

The second embodiment of present invention allows user to reduce water usage by 50% while operating the faucet in preferred habitual manner of using single swift motion of hand.

Third Preferred Embodiment—Non-Mixing Type

A third preferred embodiment of present invention is a faucet that can control flow rate of single fluid, usually water, with the same objective to save water by making it convenient for user to reduce water usage while retaining the habitual preference of operating in single swift motion of hand. The third embodiment bears operating characteristics similar to the first embodiment. Some members of third embodiment are identical to those of the first embodiment in form, arrangement and function, and thus will be referenced in foregoing section and thereby associated drawing and description for brevity. The third embodiment controls only flow rate of single fluid and does not involve mixing of two fluids.

Figure 40:
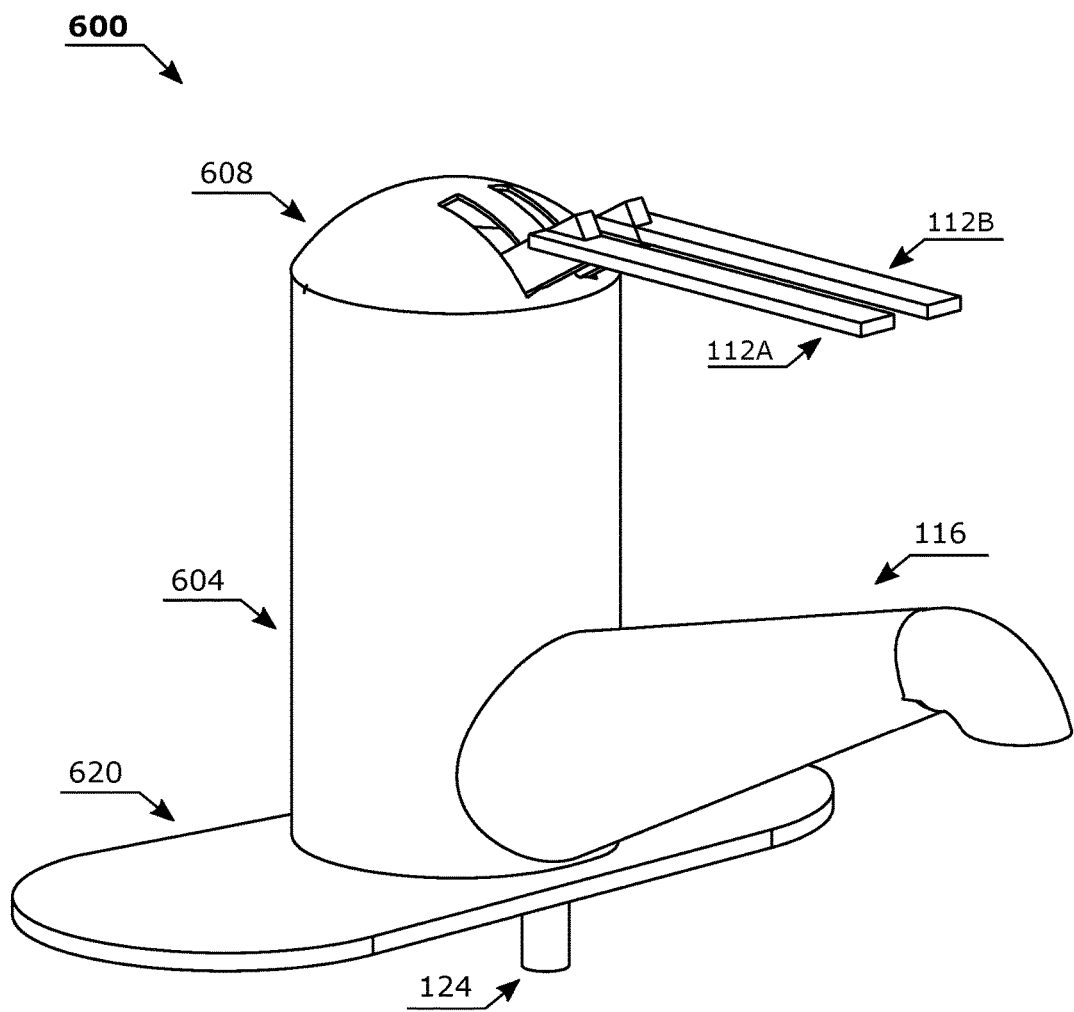
Figure 41:
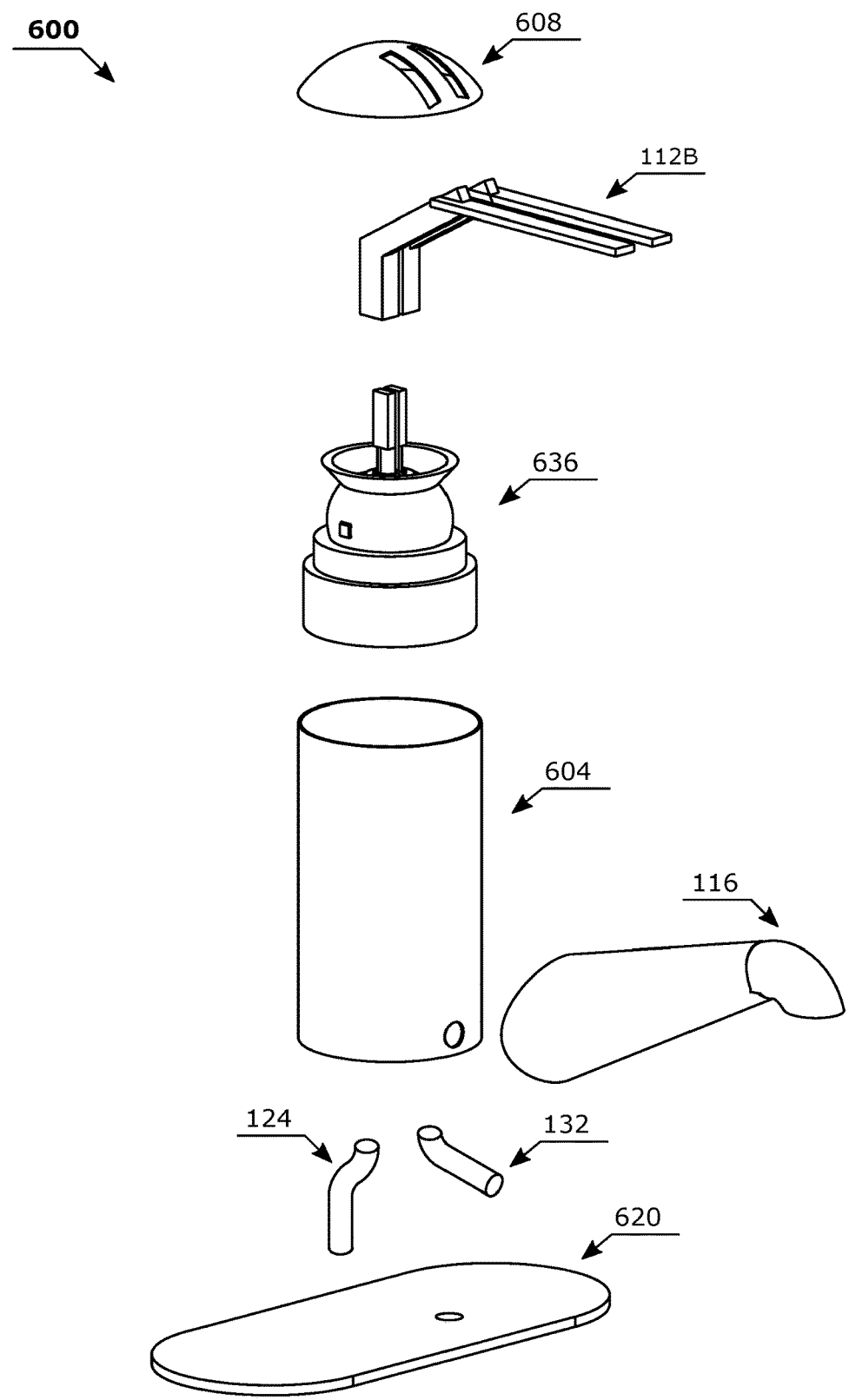

FIG. 40 shows faucet assembly 600 in accordance with the third embodiment of present invention. FIG. 41 shows the exploded perspective view of various members of faucet 600 in general order of arrangement, including inlet pipe 128, outlet pipe 132, a dual-stem-cartridge 636, and a body comprising a casing 604, a dome 608, a base-plate 620, spout 116 and two levers 112A, 112B.

The base-plate 620 is attached to casing 604 and provides foundational support. The inlet pipe 128 receives single fluid, usually plain water, and after passing through a hole in baseplate 620 it is connected at end 202 to an inlet hole at base of cartridge 636. The outlet pipe 132 is connected at end 210 to an outlet hole at base of cartridge 636 and at end 208 to spout 116 for outflow of water.

Figure 42:
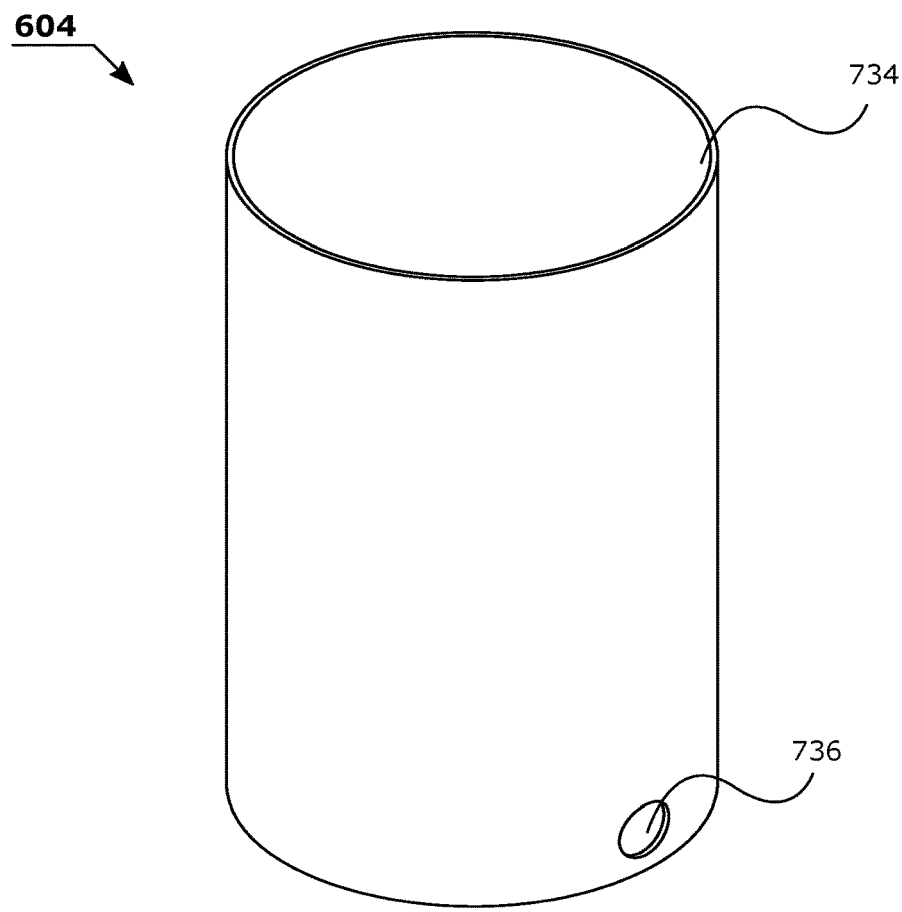

FIG. 42, shows perspective view of casing 604, as depicted here, is hollow, generally cylindrical in shape and houses various components of faucet assembly 600. The casing 604 has an orifice 736 in bottom portion. The spout 116 is connected to casing 604 at orifice 736, where outlet pipe 132, orifice 736 and internal passageway of spout 116 are substantially aligned.

Figure 43:
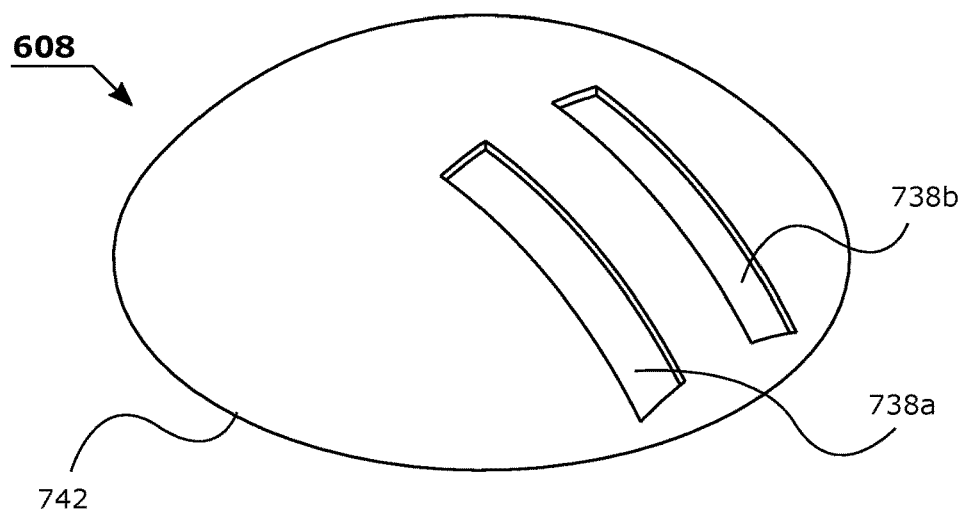

The dome 608, as seen in FIG. 43, is dome-shaped structure connected at upper end of casing 604, such that the dome-shape is extending outward from casing 604. The dome 608 has two parallel elongated slots 738a, 738b along surface sloping toward casing 604. Reference FIGS. 8a,8b and related details of levers 112A, 112B of first embodiment.

Figures 44A, 44B:
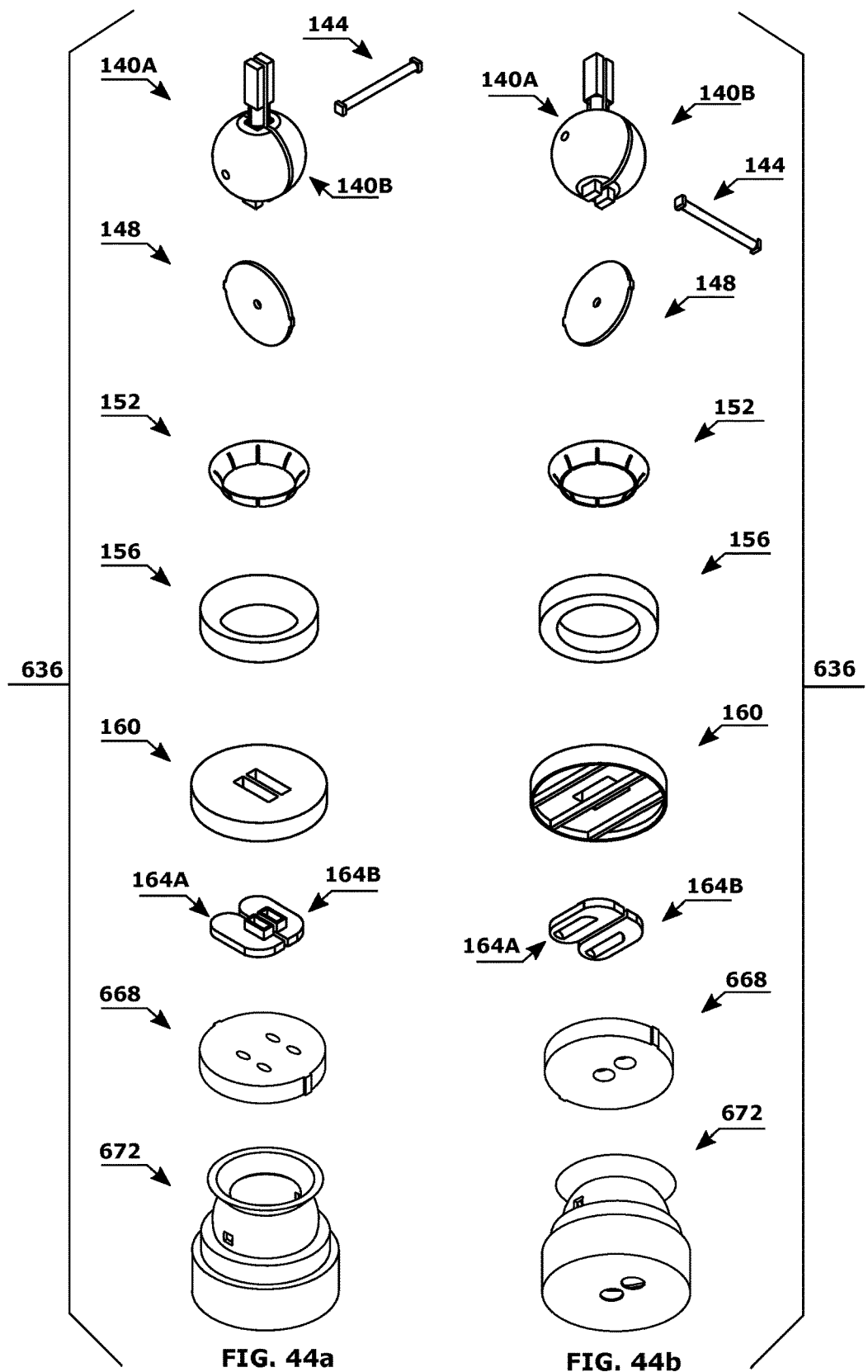

FIG. 44a and FIG. 44b show two exploded perspective views of dual-stem-cartridge 636 in general order of arrangement, depicting various members, including two hemi-ball-stems 140A, 140B, pin 144, separator-disc 148, spring 152, bushing 156, guide-plate 160, two movable-plates 164A, 164B, a fixed-plate 668 and a housing 672.

Figure 45A:
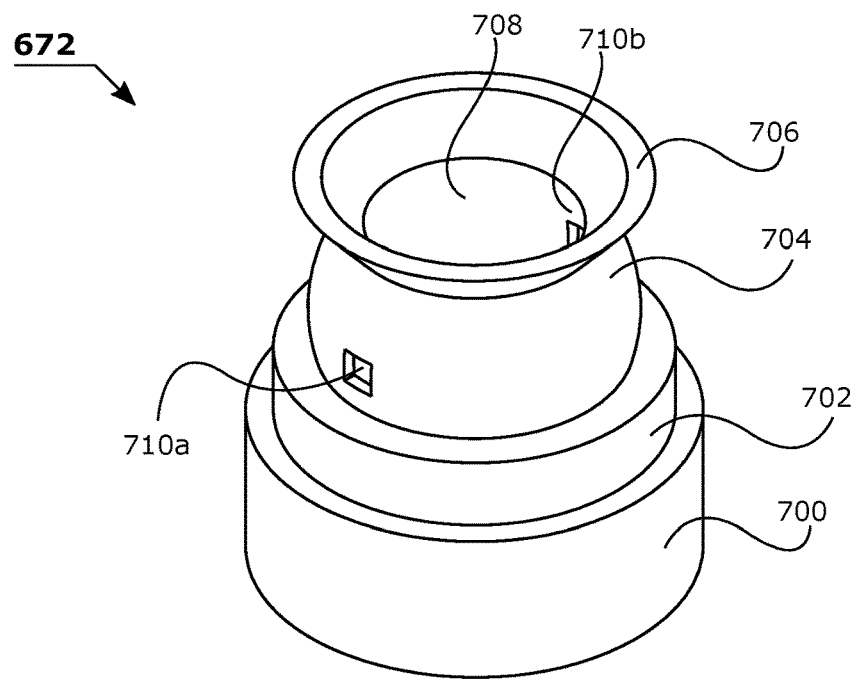
Figure 45B:
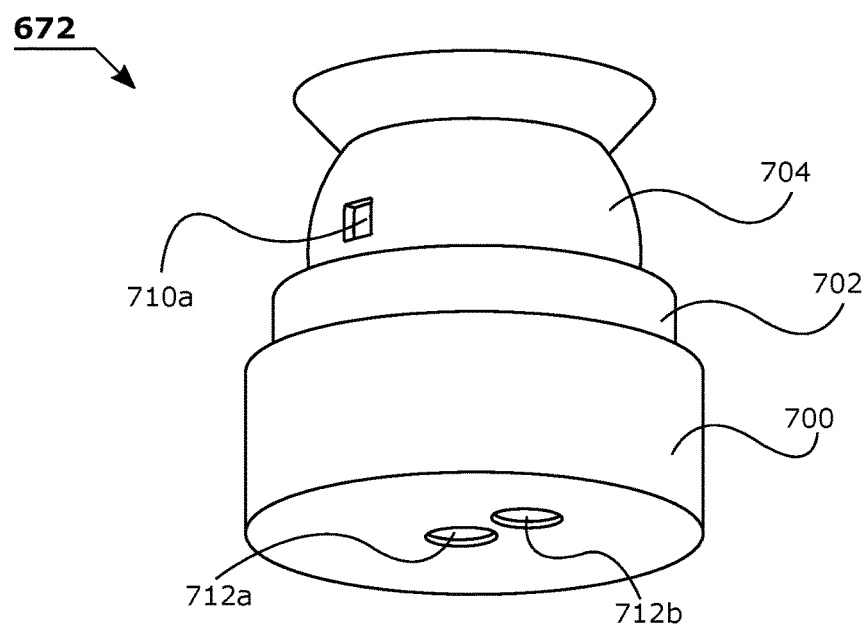

FIG. 45a and FIG. 45b show two perspective views of housing 672. The housing 672 has hollow cylindrical portions 700,702 and a hollow dome-shaped portion 704 forming an enclosed area with a conical opening 706. The dome-shaped portion 704 is between cylindrical portion 702 and conical opening 706. A central chamber 708 formed in conical opening 706 extends through dome-shaped portion 704 into cylindrical portions 702,700. The chamber 708 in dome-shaped portion is narrower toward conical opening 706 than toward cylindrical portion 702. The dome-shaped portion 704 has two square holes 710a, 710b which are positioned diametrically opposite to each other. The dome-shaped portion 704 also has two blind holes (not shown) on its inner surface to prevent separator-disc 148 from rotating. The cylindrical portion 700 and cylindrical portion 702 can be separated to aid assembly of components within. The cylindrical portion 700 has two holes 712a, 712b. The housing 672 is securely fixed and supported inside casing 604.

Refer FIGS. 14a, 14b, 14c, 14d and related details of hemi-ball-stems 140A, 140B of first embodiment. The levers 112A, 112B are connected to stem portions of hemi-ball-stems 140A, 140B, respectively.

Refer FIG. 15 and related details of pin 144 of first embodiment. The two square blocks 268a, 268b of pin 144 are positioned in two square holes 710a, 710b of housing 672. Each hemi-ball-stem 140A, 140B is able to pivot around pin 144 and this axis of motion is referenced in third embodiment as first axis.

Refer FIG. 16 and related details of separator-disc 148 of first embodiment.

Refer FIG. 18 and related details of spring 152 of first embodiment.

Refer FIGS. 19a, 19b and related details of bushing 156 of first embodiment.

Refer FIGS. 20a, 20b and related details of guide-plate 160 of first embodiment. The guide-plate 160 of the third embodiment has features (not shown), such as notches, so as to be securely fixed and supported inside housing 672 which has mating features (not shown in FIG. 45a,45b).

Refer FIGS. 21a, 21b, 22a, 22b and related details of movable-plates 164A, 164B of first embodiment.

Figure 46A:
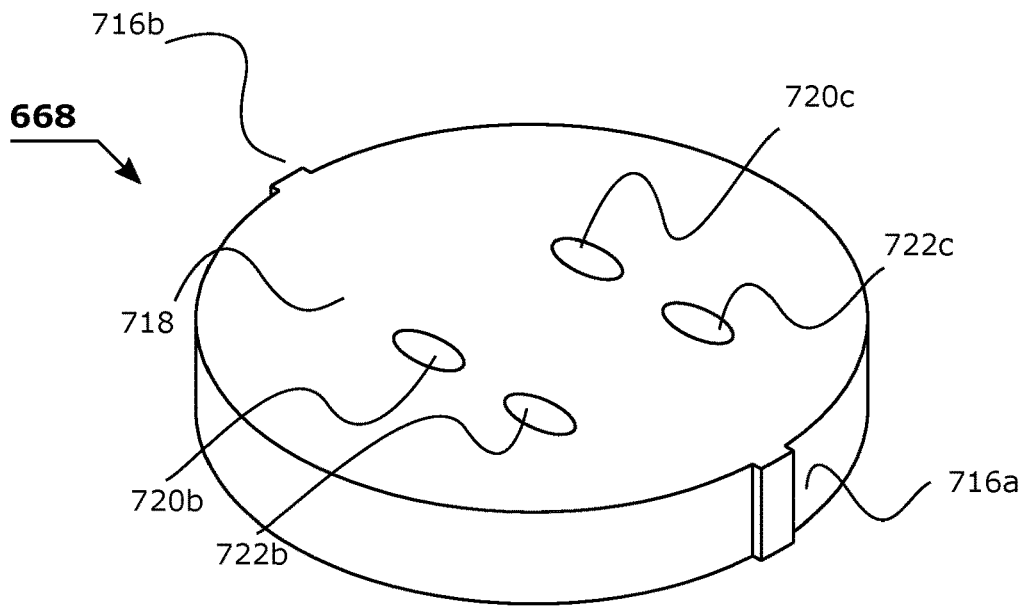
Figure 46B:
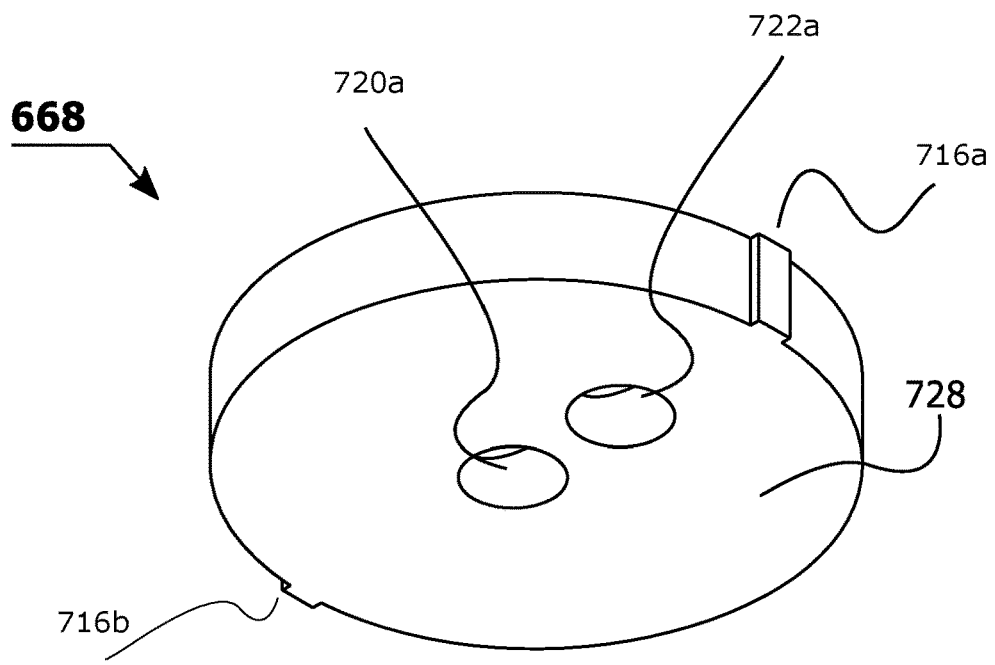

FIGS. 46a and 46b show two perspective views of fixed-plate 668. The fixed-plate 668 is a solid round disc, with two round sides 718, 728. The fixed-plate 668 is positioned in lower cylindrical section 700 of housing 672 and has notches 716a, 716b which have mating grooves in housing 672 to prevent movement. The side 728 has inlet aperture 722A which bifurcates along an internal inflow "Y" passageway into inlet apertures 722b, 722c at side 718. The side 718 has outlet apertures 720b, 720c which converge along an internal outflow "Y" passageway into outlet aperture 720a.

Aperture 722a of fixed-plate 668 substantially coincides with hole 712b in the base of housing 672. One end of inlet pipe 128 is attached to hole 712b in the base of housing 672 and other end passes through the hole in base-plate 620 and is connected by external plumbing to water source.

Aperture 720a of fixed-plate 668 substantially coincides hole 712a in the base of housing 672. One end of outlet pipe 132 is attached to hole 712a in the base of housing 672. The outlet pipe 132 then passes through orifice 736 in casing 604 and its other end is connected to passageway in spout 116 for mixed water to flow out of faucet assembly 600.

The arrangement of members of faucet is similar to that of the first embodiment. In brief, the levers are connected to the hemi-ball-stems; each hemi-ball-stem can independently pivot about the pin; the two movable-plates are positioned in two channels formed by flanges of guide-plate such that appendages of movable-plates extend into slots of guide-plate; the movable-plates and the guide-plate are positioned on fixed-plate; projections of hemi-ball-stems are received by recesses formed by appendages of movable-plates. The hemi-ball-stems serve as coupling mechanism, connecting to the levers and having projections engage the moving plates.

Operation of the Third Embodiment to Control Flow Rate of Water

Figure 47A:
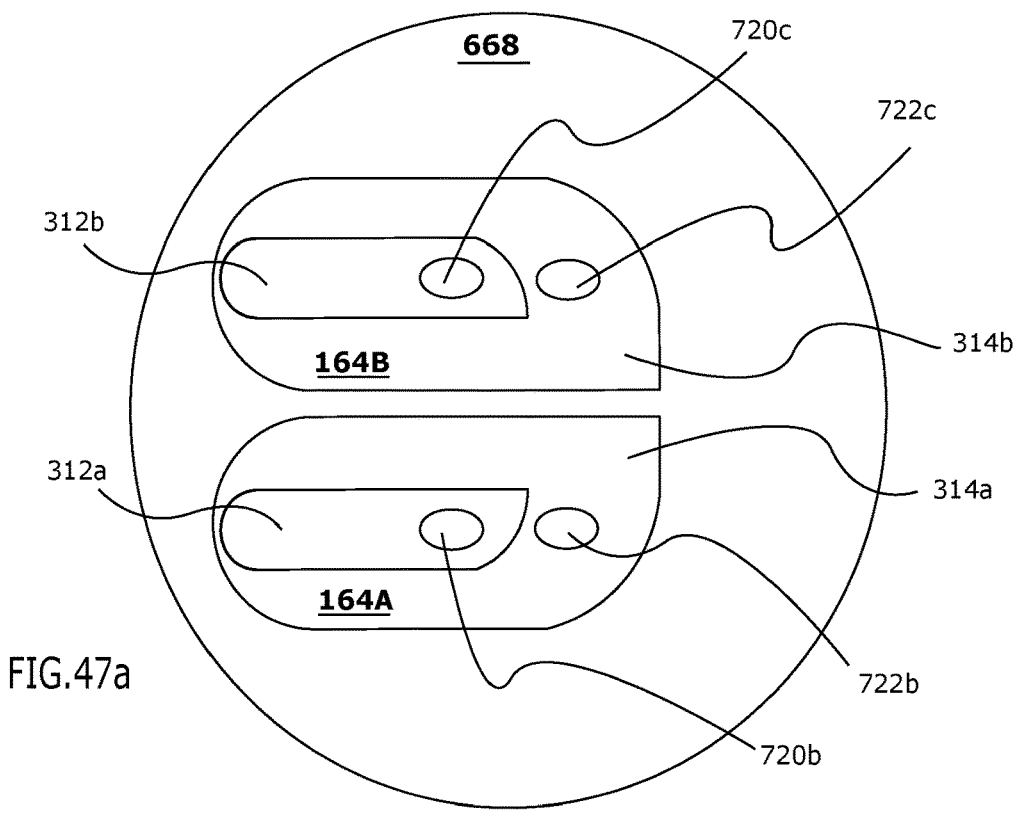
Figure 47B:
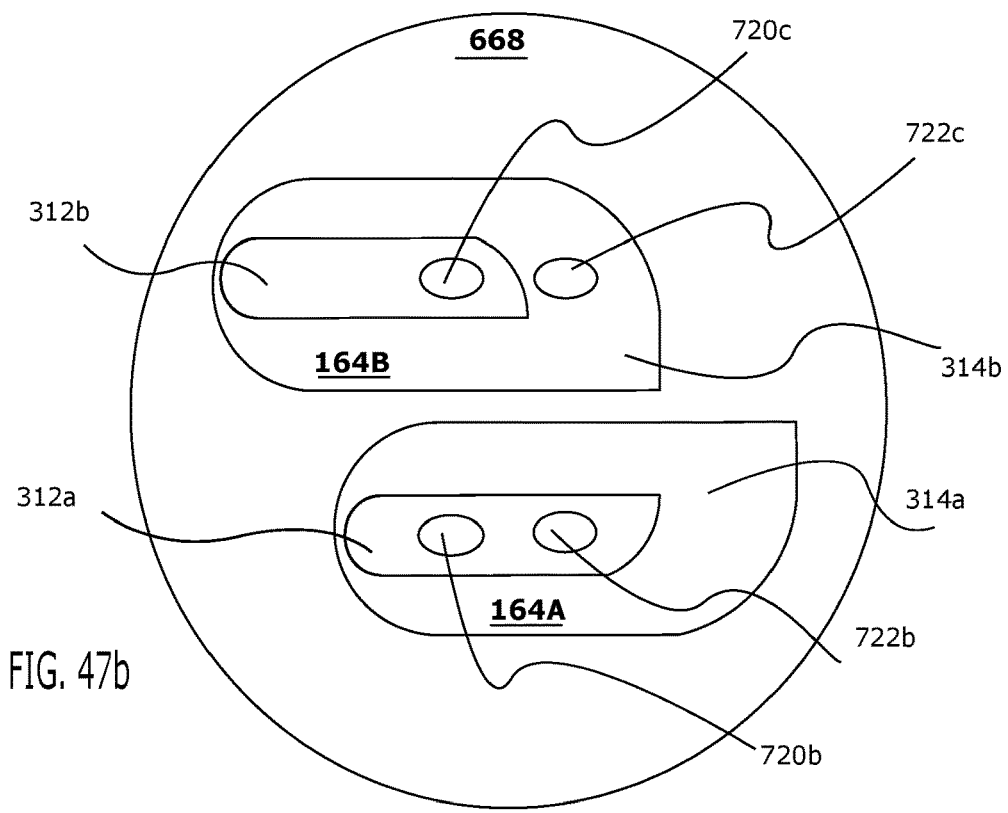
Figure 47C:
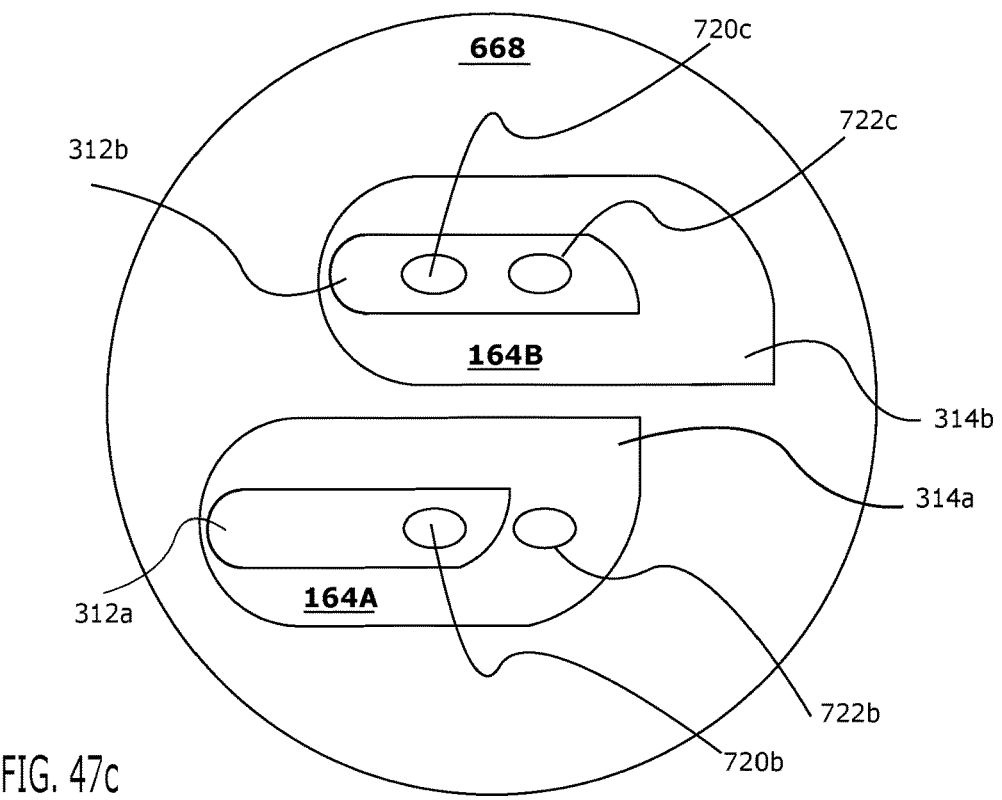
Figure 47D:
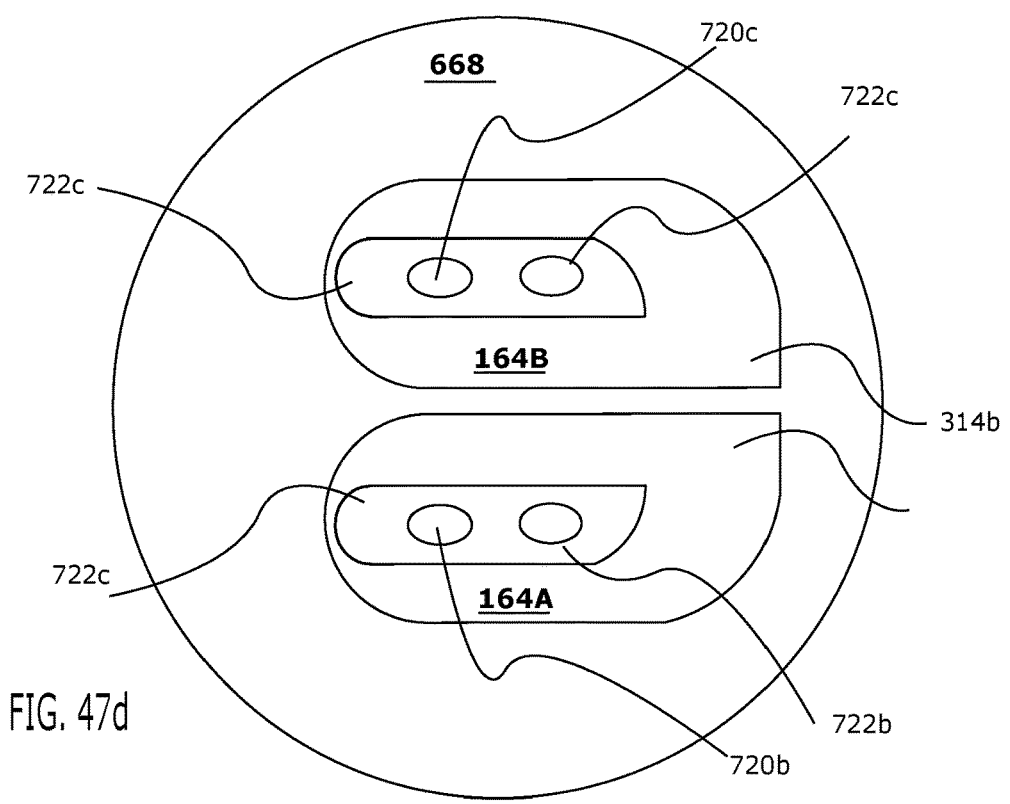

The movable-plates 164A, 164B are placed over side 718 of fixed-plate 668 to cover all apertures on side 718. Schematics in FIG. 47a to 47d show the positions of movable-plates relative to fixed-plate. The movable-plate 164A can rectilinearly slide over fixed-plate 668 in such a way that portion of chamber 312a is always over outlet aperture 720b, and movable-plate 164A always either seals or unseals inlet aperture 722b. The movable-plate 164A can seal inlet aperture 722b by sliding in position to have lip 314a over inlet aperture 722b completely to form sealing surface which prevents water from flowing out of inlet aperture 722b. This is seen in schematic of FIG. 47a. The movable-plate 164A can unseal inlet aperture 722b by sliding in position to have portion of chamber 312a over inlet aperture 722b, partially or fully covering said inlet aperture, which allows water to flow from inlet aperture 722b into chamber 312a and to outlet aperture 720b and through outflow "Y" passageway to outlet aperture 720a. The chamber 312a thus allows fluid communication between inlet aperture 722b and outlet aperture 720b. As more area of inlet aperture 722b is unsealed, more water flows out to outlet aperture 720a. When entire inlet aperture 722b is completely unsealed, water flowing out of outlet aperture 720a is 50% of inflow. This is seen in schematic of FIG. 47b. Similarly, movable-plate 164B can rectilinearly slide over fixed-plate 668 in such a way that portion of chamber 312b is always over outlet aperture 720c, and movable-plate 164B always either seals or unseals inlet aperture 722c. The chamber 312b allows fluid communication between inlet aperture 722c and outlet aperture 720c. Schematic in FIG. 47a shows how movable-plate 164B seals aperture 722c. Schematic in FIG. 47c shows how movable-plate 164B unseals aperture 722c. In this manner, rectilinear movement of movable-plates relative to the fixed-plate can control flow rate of water.

User can operate faucet 600 to control flow rate of water by turning levers 112A, 112B angularly upwards or downwards along a vertical arc, about the first axis, in same way as in the first embodiment. The levers 112A, 112B can independently move along slots 738a, 738b in dome 608 and in this manner dome facilitates movement of levers about the first axis. As lever 112A is turned angularly upwards about the first axis, hemi-ball-stem 140A pivots around pin 144, which slides movable-plate 164A rectilinearly over fixed-plate 168. Similarly, angular movement of lever 112B about the first axis slides movable-plate 164B rectilinearly over fixed disc 168. In this way, coupling mechanism conveys the movement of lever about first axis to corresponding movable-plate as rectilinear movement. Rectilinear movement of movable-plates 164A, 164B relative to fixed-plate 168 changes the flow rate of water. Thus, movement of levers 112A, 112B about the first axis controls the flow rate of water. When levers 112A, 112B are at lowest angular position (no-flow position) about the first axis, there is no water flow. When either lever 112A or lever 112B is raised to highest upward angular position (maximum-flow position), water flowing out is 50% of inflow. The user can reduce water usage by 50% while operating any one lever with habitual preferred manner of single swift motion of hand. When both levers 112A, 112B are raised to maximum-flow position, sequentially or simultaneously, water flowing out is 100% of inflow. This is seen in schematic of FIG. 47d. It should be noted that each lever can be positioned between the no-flow position and maximum-flow position to have commensurate water flow.

As evident from above description, faucet 600 of third embodiment involves making minor design changes in some members of faucet 100 of first embodiment, including dome, casing, housing and fixed-plate.

Fourth Preferred Embodiment—Non-Mixing Type

A fourth preferred embodiment of present invention is a faucet that can control flow rate of single fluid, usually water, with the same objective to save water by making it convenient for user to reduce water usage while retaining the habitual preference of operating in single swift motion of hand. The fourth embodiment bears operating characteristics similar to the second embodiment. Some members of fourth embodiment are identical to those of the first, second and third embodiments in form, arrangement and function, and thus will be referenced in foregoing section and thereby associated drawing and description for brevity. The fourth embodiment controls only flow rate of single fluid and does not involve mixing of two fluids.

Figure 48:
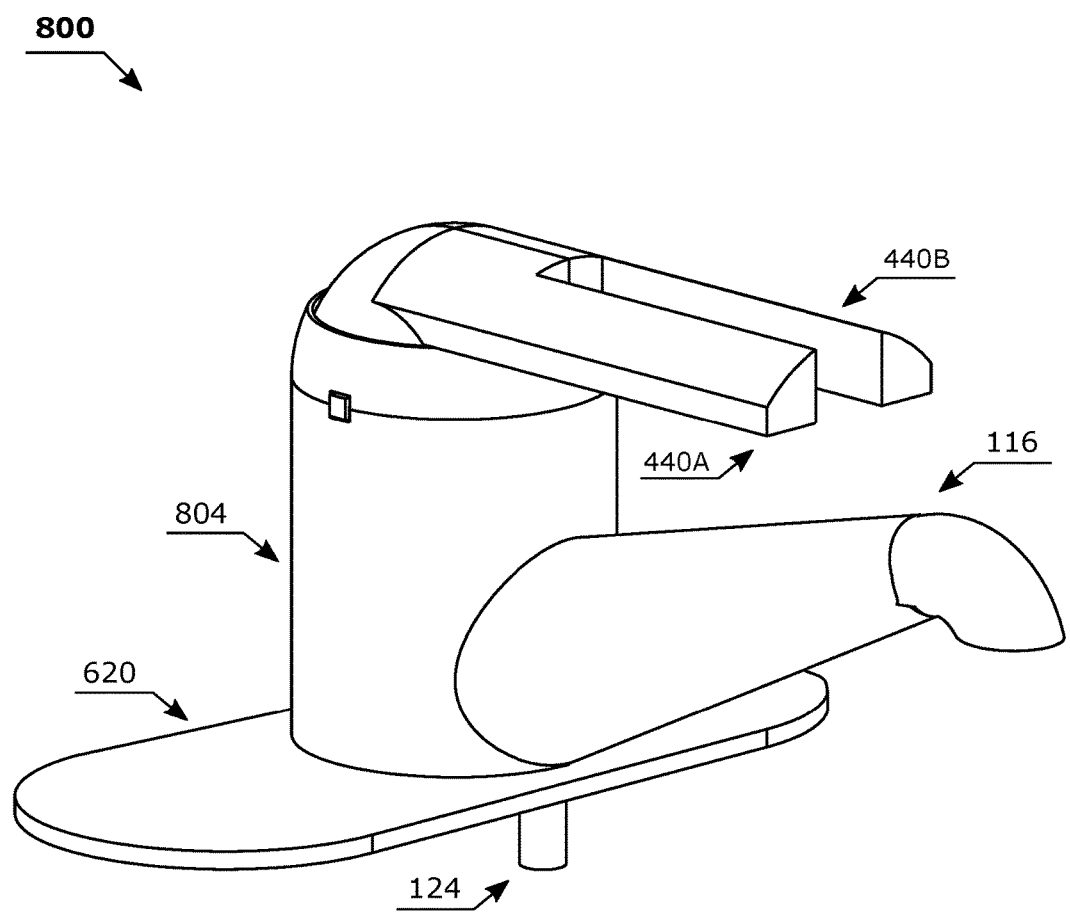
Figure 49:
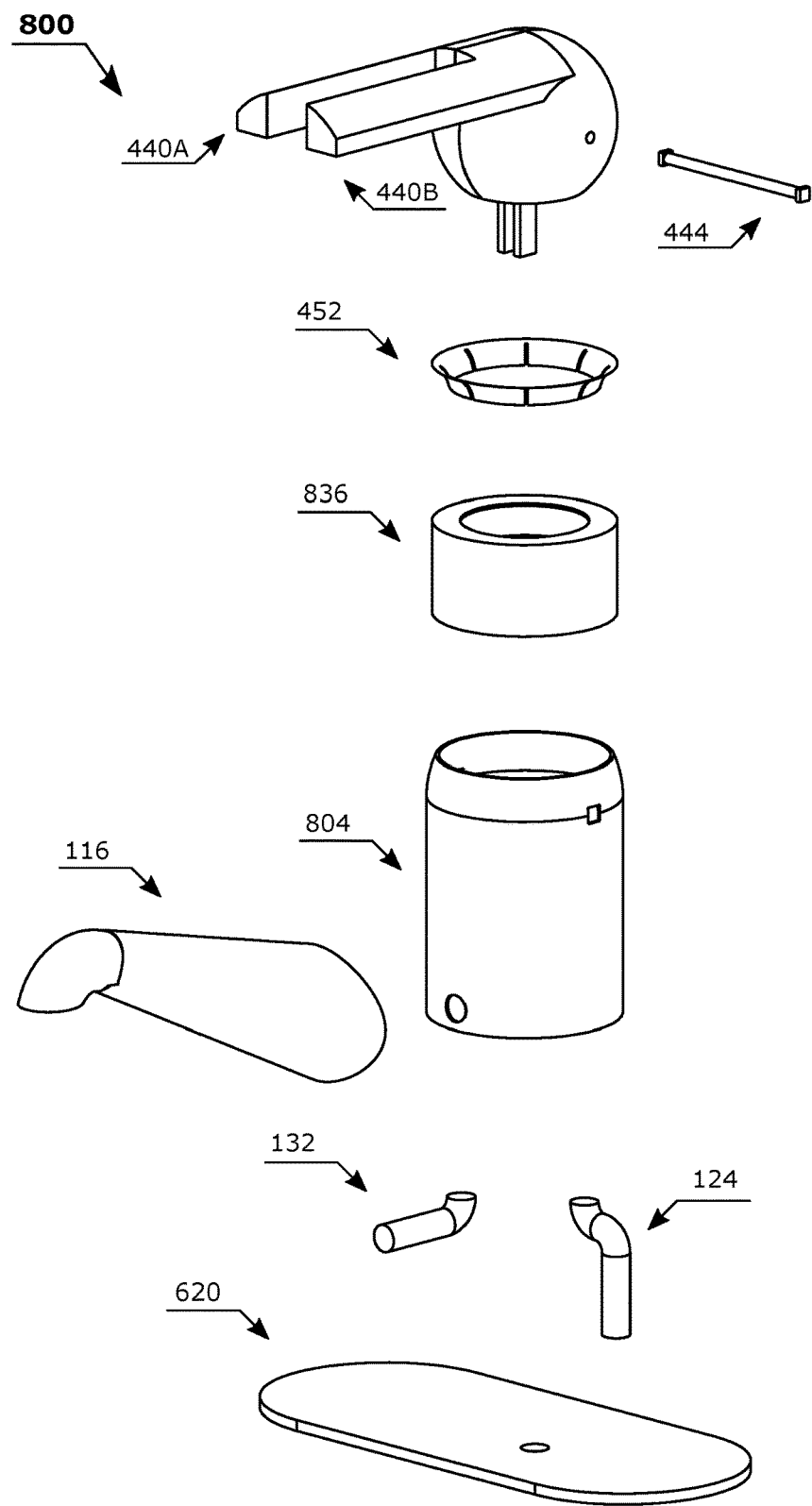

FIG. 48 shows faucet assembly 800 in accordance with the fourth embodiment of present invention. FIG. 49 shows the exploded perspective view of various members of faucet 800 in general order of arrangement, including base-plate 620, inlet pipe 124, outlet pipe 132, spout 116, pin 444, spring 452, a cartridge 836 and a body comprising casing 804, and two hemi-ball-levers 440A and 440B.

The base-plate 620 is attached to casing 804 and provides foundational support. The inlet pipe 128 receives single fluid, usually plain water, and after passing through a hole in baseplate 620 it is connected at end 202 to an inlet hole at base of cartridge 836. The outlet pipe 132 is connected at end 210 to an outlet hole at base of cartridge 836 and at end 208 to spout 116 for outflow of water.

Figure 50:
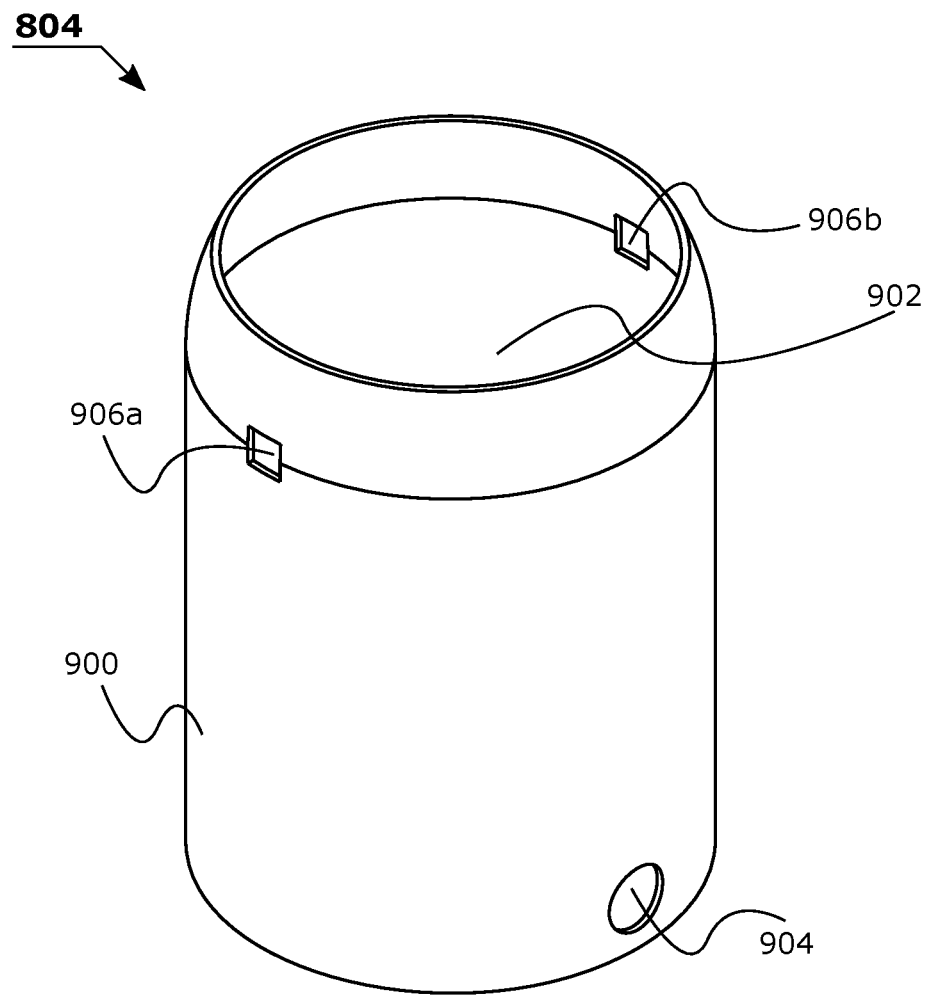

FIG. 50 shows perspective view of casing 804, as depicted here, is hollow, generally cylindrical in shape and houses various components of faucet assembly 800. The casing 804 has a portion 902 at upper side which has shape of hollow spherical section, narrowing toward the top. Two square holes 906a, 906b near the top of casing 804 are positioned diametrically opposite. The casing 804 has an orifice 904 in bottom portion. The spout 116 is connected to casing 804 at orifice 904, where outlet pipe 132, orifice 904 and internal passageway of spout 116 are substantially aligned.

Reference FIGS. 33a, 33b and related details of hemi-ball-lever 440A, and FIGS. 34a, 34b and related details of hemi-ball-lever 440B of second embodiment.

Reference FIG. 32 and related details of pin 444 of second embodiment. Each hemi-ball-lever 440A, 440B is independently able to rotate about pin 444 along an axis referenced in fourth embodiment as first axis.

Reference FIG. 35 and related details of spring 452 of second embodiment.

Figures 51A, 51B:
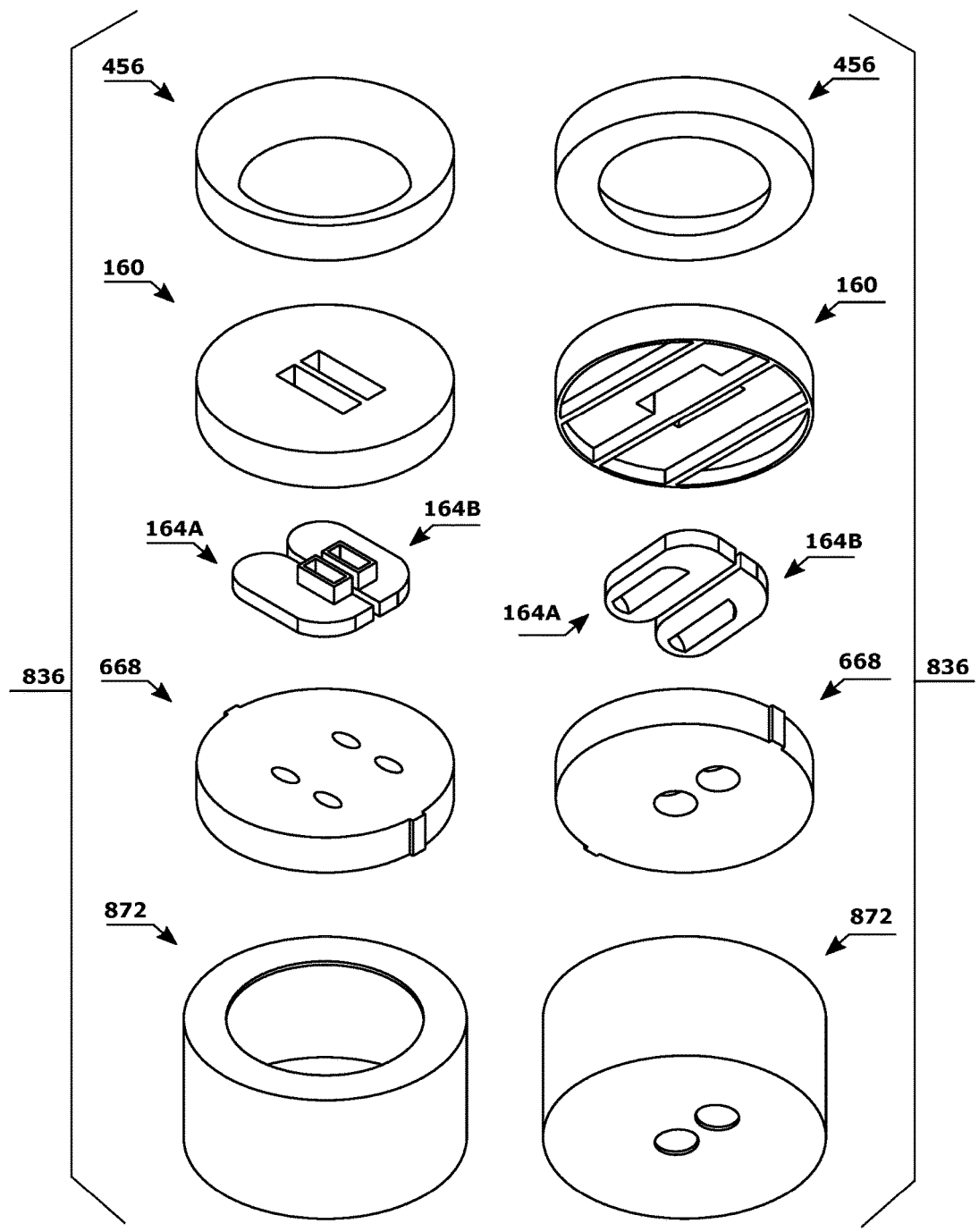

FIGS. 51a and 51b show two exploded perspective views of cartridge 836, depicting various members in general order of arrangement, including bushing 456, guide-plate 160, two movable-plates 164A, 164B, fixed-plate 668 and a housing 872.

Figure 52A:
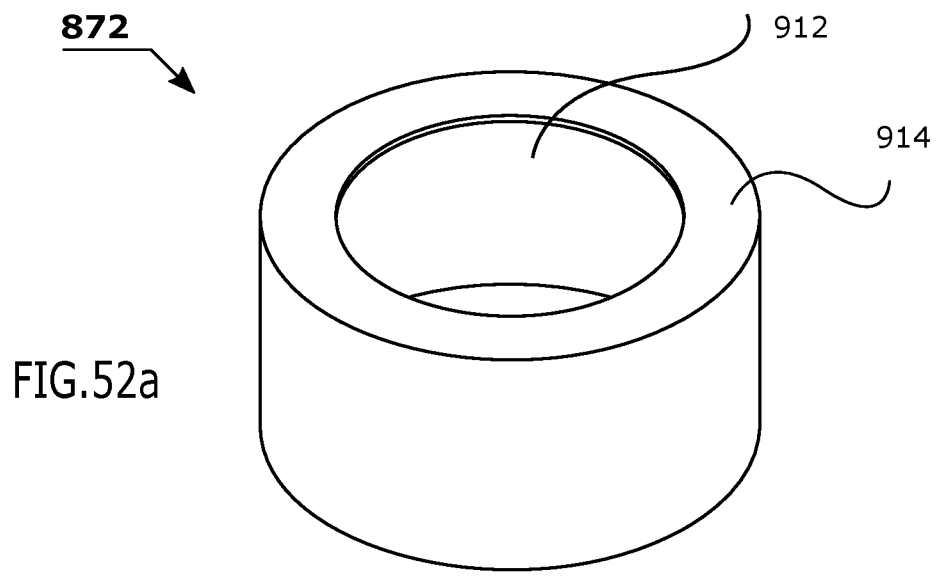
Figure 52B:
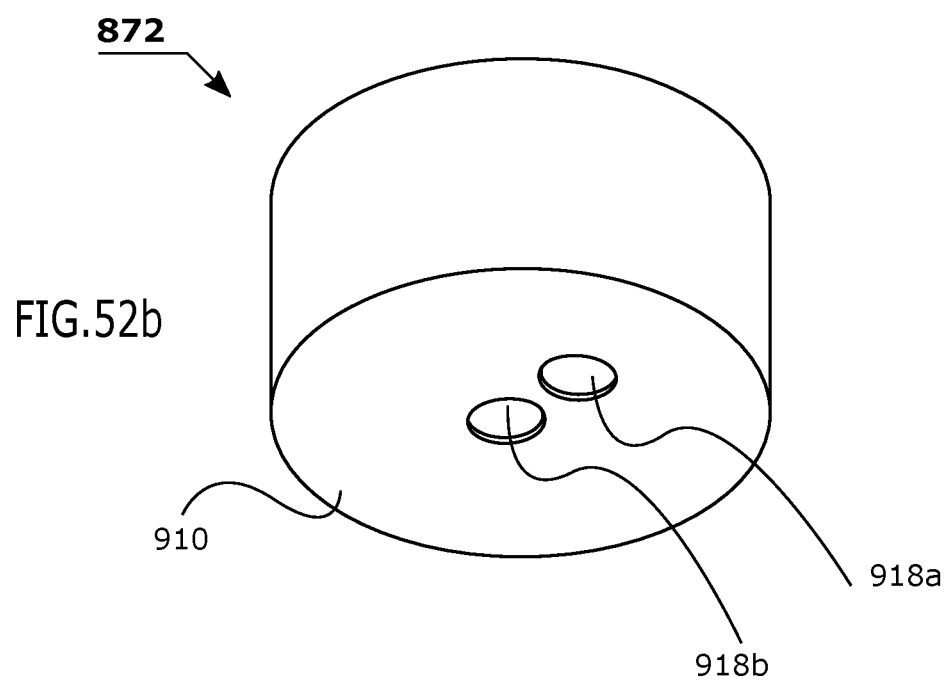

FIGS. 52a, 52b show two perspective views of housing 872. The housing 872 is hollow cylindrical in shape with an opening 912 surrounded by rim 914 at top end. The bottom end 910 has two holes 918a and 918b. The housing 872 is securely fixed and supported inside casing 804 by elements (not shown) such as notch, ledge etc.

Refer FIGS. 20a, 20b and related details of guide-plate 160 of first embodiment. The guide-plate 160 of the third embodiment has features (not shown), such as notches, so as to be securely fixed and supported inside housing 872 which has mating features (not shown in FIG. 52a,52b).

Reference FIGS. 21a, 21b, 22a, 22b and related details of two movable-plates 164A, 164B of first embodiment.

Reference FIG. 46a, 46b and related details of fixed-plate 668 of third embodiment.

Aperture 722a of fixed-plate 668 substantially coincides with hole 918a in the base of housing 872. One end of inlet pipe 128 is attached to hole 918a in the base of housing 872 and other end passes through hole 214 in base-plate 120 and is connected by external plumbing to water source.

Aperture 720a of fixed-plate 668 substantially coincides with hole 918b in the base of housing 872. One end of outlet pipe 132 is attached to hole 918b in the base of housing 872. The outlet pipe 132 then passes through orifice 904 in casing 804 and its other end is connected to passageway in spout 116 for mixed water to flow out of faucet assembly 800.

Operation of the Fourth Embodiment to Control Flow Rate of Water

Rectilinear movement of movable-plates 164A, 164B relative to fixed-plate 168 can control flow rate of water.

The arrangement of members of faucet 800 is similar to those of faucet 400 of second embodiment. In brief, each hemi-ball-lever can independently pivot about the pin; the two movable-plates are positioned in two channels formed by flanges of guide-plate such that appendages of movable-plates extend into slots of guide-plate; the movable-plates and the guide-plate are positioned on the fixed-plate; the projections of hemi-ball-levers are received by recesses formed by appendages of the movable-plates. The hemi-ball-levers serve as coupling mechanism, connecting to the levers and having projections engage the moving plates.

User can operate faucet 800 to control flow rate of water by turning levers 520a, 520b of hemi-ball-levers 440A, 440B angularly upwards or downwards along a vertical arc about the first axis, in same way as in the second embodiment. The hemispherical portions 514a, 514b facilitate the movement of levers 520a, 520b about the first axis in such a way that each lever can be operated independently or both levers can be operated simultaneously or both levers can be operated sequentially to control flow rate of water. As lever 520a is turned angularly upwards about the first axis, hemi-ball-lever 440A pivots around pin 444, which slides movable-plate 164A rectilinearly over fixed-plate 668. Similarly, angular movement of lever 520b about the first axis slides movable-plate 164B rectilinearly over fixed-plate 668. In this way, coupling mechanism conveys the movement of lever about first axis to corresponding movable-plate as rectilinear movement. Rectilinear movement of movable-plates 164A, 164B relative to fixed-plate 668 changes the flow rate of water. Thus, movement of levers 520a, 520b about the first axis controls the flow rate of water. When levers 520a, 520b are at lowest angular position (no-flow-position) about the first axis, there is no water flow and this is no-flow position. When either lever 520a or lever 520b is raised to highest upward angular position (maximum-flow position), water flowing out is 50% of inflow. The user can reduce water usage by 50% while operating any one lever with habitual preferred manner of single swift motion of hand. When both levers 520a, 520b are raised to maximum-flow position, water flowing out is 100% of inflow.

As evident from above description, faucet assembly 800 of fourth embodiment involves making minor design changes in some members of faucet assembly 400 of second embodiment, including the casing, the fixed-plate and the housing.

While the above description contains many specificities, these should not be construed as limitations on the scope, but rather as an exemplification of embodiments thereof. It is contemplated that various changes and modifications may be made to the previously disclosed embodiments without departing from the spirit and the scope. Furthermore, it is widely known in the art that to provide for water-tight sealing, the cartridge will require base seal and o-rings in suitable positions. The base-seal and o-rings have therefore not been included in the description.

Other Ramifications

Embodiments described above are operated by a pair of levers which is just one type of device that can operate the faucet. It should be appreciated that other devices could be designed which activate coupling mechanism, operate independently while imparting rectilinear movement via the coupling mechanism to movable-plates and operate together under constrain while imparting rotational movement via the coupling mechanism to movable-plates.

Different types of coupling mechanisms could be designed which receive activation from the operating devices and convey rectilinear and rotational movement to the movable-plates. For example, devices to operate the faucet can be a pair of knobs which are placed on a rotating carousel, and coupling mechanism can be projections in these knobs which engage the movable-plates. These knobs can slide forward or backward to impart independent rectilinear movement to movable plates. The carousel along with the knobs can be turned to impart rotational movement to movable plates.

For all embodiments described above, some members are shown to be mirror-symmetry of each other. These members can easily be designed to be identical instead of being mirror-symmetry.

From above description of third and fourth embodiments for Non-Mixing type faucet, since movement of levers and associated members is only about the first axis and that there is no rotational movement about the central vertical axis, this freedom allow many possibilities in design and few are mentioned below:

The separator-disc 148 of faucet assembly 400 can be eliminated and two hemi-ball-stems 140A, 140B of coupling mechanism can be positioned with a gap between them.

The hemi-ball-stem of faucet assembly 400 can be redesigned in shape of disc, or even just a rod, instead of hemispherical, which rotate around the pin about the first axis, with corresponding changes made in the housing for support.

The housing of faucet assembly 400 can be shaped as rectangular box instead of cylindrical, with fixed-plate and guide-plate can be rectangular instead of disc-shaped.

Accordingly, the scope should be determined not by the embodiments illustrated, but by the appended claims and their legal equivalents.

We claim:

1. A faucet assembly, comprising:
a body having at least one inlet for introduction of fluid into the faucet assembly and an outlet for releasing fluid;
a pair of devices to operate the faucet assembly, said pair of devices being operable by a first method and, selectively, a second method;
a fixed-plate being a flat plate having a bottom surface and a top surface, with said bottom surface having at least one inflow aperture, wherein each said inflow aperture bifurcates into two inflow apertures at said top surface for fluid communication, and wherein said top surface having two outflow apertures converging into one outflow aperture at said bottom surface for fluid communication;
a pair of movable-plates, positioned sealingly over the top surface of said fixed-plate, such that rectilinear movement of said pair of movable-plates varies flow rate of at least one fluid, and that rotational movement of said pair of movable-plates varies ratio mixture of the fluids;
a coupling mechanism comprising two parts, such that each said part receives activation from corresponding device of said pair of devices and engages corresponding movable-plate of said pair of movable-plates;
a housing positioned securely inside the body such that said housing sealingly encases members selected from a group consisting of the fixed-plate, the pair of movable-plates and the coupling mechanism, and
whereas in operation using the first method, said pair of devices operate independent of each other and wherein each device of said pair of devices activates corresponding part of said coupling mechanism, whereby said part of the coupling mechanism conveys rectilinear movement to corresponding movable-plate of said pair of movable-plates, and
whereas in operation using the second method, said faucet assembly has a means to constrain said pair of devices to operate together, and said pair of devices activates said coupling mechanism, whereby said coupling mechanism conveys rotational movement to said pair of movable-plates.

2. The faucet assembly of claim 1, wherein the pair of devices is a pair of levers, and the first method is operating said pair of levers about a first axis, and the second method is operating said pair of levers about a second axis.

3. The faucet assembly of claim 2 has a dome in top portion of said body, wherein said dome has a pair of slots with said pair of levers passing through said pair of slots, and wherein said dome facilitates independent movement of the levers about the first axis, and
wherein each part of said coupling mechanism has a hemispherical portion with a stem and a projection, wherein said stem is connected to corresponding lever of said pair of levers and said projection engages corresponding movable-plate of said pair of movable-plates, and
wherein said housing sealingly encases the fixed-plate, the pair of movable-plates and the coupling mechanism.

4. The faucet assembly of claim 3, wherein said dome is rotatable about the second axis, and said dome constrains said pair of levers to move together about the second axis, and wherein the bottom surface of said fixed-plate has two inflow apertures.

5. The faucet assembly of claim 3, wherein the bottom surface of said fixed-plate has one inflow aperture.

6. The faucet assembly of claim 2, wherein said coupling mechanism is positioned in top portion of said body, with each part of said coupling mechanism having a hemispherical portion and a projection, wherein said hemispherical portion is connected to corresponding lever of said pair of levers and said projection engages corresponding movable-plate of said pair of movable-plates, and
wherein said hemispherical portions facilitate independent movement of said pair of levers about the first axis, and
wherein said housing sealingly encases the fixed-plate and the pair of movable-plates.

7. The faucet assembly of claim 6, wherein said hemispherical portions constrain said pair of levers to move together about the second axis, and wherein the bottom surface of said fixed-plate has two inflow apertures.

8. The faucet assembly of claim 6, wherein the bottom surface of said fixed-plate has one inflow aperture.

9. The faucet assembly of claim 1 has a guide-plate which supports movement of said pair of movable-plates over said fixed-plate.

10. The faucet assembly of claim 9, wherein said guide-plate is a flat hollow member with one side open forming a chamber and other side having two slots to access the movable-plates, said chamber having three flanges with a central flange and two flanges disposed parallelly on either side of said central flange, said three flanges forming two channels, whereby said pair of movable-plates is positioned inside said channels to sealingly slidably move over the fixed-plate.

11. The faucet assembly of claim 1, said pair of movable-plates, each having a chamber in a bottom side and a means to be engaged with said coupling mechanism, said bottom side positioned sealingly over the top surface of said fixed-plate such that said chamber covers the outlet aperture on the top surface of said fixed-plate, whereas rectilinear movement of said movable-plate selectively seals or unseals, fully or partially, the inlet apertures on the top surface of said fixed-plate to vary flow rate of at least one fluid, and whereas rotational movement of said pair of movable-plates selectively seals or unseals, fully or partially, the inlet apertures on the top surface of said fixed-plate to vary ratio mixture of the fluids.

12. A faucet assembly, comprising:
 a body having at least one inlet for introduction of fluid into the faucet assembly and an outlet for releasing fluid;
 a pair of levers to operate the faucet assembly, said pair of levers being operable about a first axis and, selectively, a second axis;
 a fixed-plate being a flat plate having a bottom surface and a top surface, with said bottom surface having at least one inflow aperture, wherein each said inflow aperture bifurcates into two inflow apertures at said top surface for fluid communication, and wherein said top surface having two outflow apertures converging into one outflow aperture at said bottom surface for fluid communication;
 a pair of movable-plates, positioned sealingly over the top surface of said fixed-plate, such that rectilinear movement of said pair of movable-plates varies flow rate of at least one fluid, and that rotational movement of said pair of movable-plates varies ratio mixture of the fluids;
 a coupling mechanism comprising two parts, wherein each part is connected to corresponding lever of said pair of levers and said part engages corresponding movable-plate of said pair of movable-plates;
 a housing positioned securely inside the body such that said housing sealingly encases members selected from a group consisting of the fixed-plate, the pair of movable-plates and the coupling mechanism, and
 whereas in operation about the first axis, said pair of levers move independent of each other, wherein each lever of said pair of levers activates corresponding part of said coupling mechanism, whereby said part of the coupling mechanism conveys rectilinear movement to corresponding movable-plate of said pair of movable-plates, and
 whereas in operation about the second axis, said faucet assembly has means to constrain said pair of levers to move together about the second axis and said pair of levers activates said coupling mechanism, whereby said coupling mechanism conveys rotational movement to said pair of movable-plates.

13. The faucet assembly of claim 12, each part of said coupling mechanism has a hemispherical portion with a stem and a projection, wherein said stem is connected to corresponding lever of said pair of levers and said projection engages corresponding movable-plate of said pair of movable-plates, and
 said means to constrain said pair of levers comprises a dome, wherein said dome has a pair of slots with said pair of levers passing through said pair of slots whereby facilitating independent movement of said pair of levers about the first axis and constraining said pair of levers to move together about the second axis.

14. The faucet assembly of claim 12, each part of said coupling mechanism has a hemispherical portion and a projection, wherein said hemispherical portion is connected to corresponding lever of said pair of levers and said projection engages corresponding movable-plate of said pair of movable-plates, and
 said means to constrain said pair of levers comprises said hemispherical portions whereby facilitating independent movement of said pair of levers about the first axis and constraining said pair of levers to move together about the second axis.

\* \* \* \* \*